United States Patent [19]
Gante et al.

[11] 3,897,453
[45] July 29, 1975

[54] DIBENZOFURAN AND DIBENZOTHIOPHENE ACETIC ACID DERIVATIVES

[75] Inventors: Joachim Gante; Werner Mehrhof; Albrecht Wild, all of Darmstadt, Germany

[73] Assignee: Merck Patent Gesellschaft mit beschrankter Haftung, Darmstadt, Germany

[22] Filed: May 10, 1973

[21] Appl. No.: 358,872

[30] Foreign Application Priority Data
May 13, 1972  Germany.............................. 2223391
Dec. 16, 1972  Germany.............................. 2261745

[52] U.S. Cl. .... 260/329.3; 260/243 B; 260/247.1 P; 260/247.2 B; 260/247.2 R; 260/268 TR; 260/293.57; 260/293.58; 260/326.34; 260/327 M; 260/338; 260/340.7; 260/340.9; 260/346.2 M; 424/246; 424/248; 424/250; 424/267; 424/274; 424/275; 424/278
[51] Int. Cl............................................. C07d 63/24
[58] Field of Search .................. 260/329.3, 346.2 M

[56] References Cited
UNITED STATES PATENTS
3,506,688  4/1970  Wang................................ 260/346.2
3,567,742  3/1971  Cavalleri.......................... 260/346.2
3,655,697  4/1972  Shen................................ 260/346.2

OTHER PUBLICATIONS
Gilman, I, CA 49:6218 (1955).
Routier, CA 51:5076–5077 (1957).
Chatterjea, CA 52:3759–3761 (1958).
Gilman, II, CA 41:752–753 (1947).
Hogg, CA 40:4716–4717 (1946).
Gilman, III, CA 34:2366–2367 (1940).
Burger, CA 34:1654–1655 (1940).
Gilman, IV, CA 33:579–581 (1939).

Primary Examiner—John M. Ford
Assistant Examiner—C. M. S. Jaisle
Attorney, Agent, or Firm—Millen, Raptes & White

[57] ABSTRACT

Dibenzofuran and dibenzothiophene derivatives of the formula

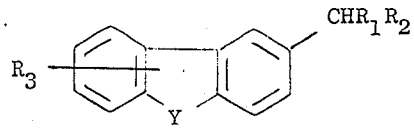

wherein $R_1$ is COOH, CHO, or $CH_2OH$, $R_2$ is H or alkyl of 1-4 carbon atoms, $R_3$ is H, alkyl, alkoxy, alkanoyl, monoalkylamino, dialkylamino, or acylamino of up to 4 carbon atoms, F, Cl, Br, I, OH, $NH_2$, $NO_2$, CN, or $CF_3$; and Y is O or S, with the proviso that at least one of $R_2$ and $R_3$ is other than H, and the physiologically acceptable salts thereof, possess antiinflammatory activity.

27 Claims, No Drawings

DIBENZOFURAN AND DIBENZOTHIOPHENE ACETIC ACID DERIVATIVES

BACKGROUND OF THE INVENTION

This invention relates to novel dibenzofuran and dibenzothiophene derivatives similar to the known 2-dibenzofurylacetic acid (cf. J. Amer. Chem. Soc. 68. 2104-05 (1946)).

SUMMARY OF THE INVENTION

The novel compounds of this invention are dibenzofuran and dibenzothiophene derivatives of the general Formula I $$Z-CHR_1R_2 \quad (I)$$

in which Z is

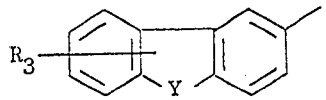

wherein $R_1$ is COOH, CHO, or $CH_2OH$ including functional derivatives thereof; $R_2$ is H or alkyl of 1-4 carbon atoms; $R_3$ is H, alkyl, alkoxy, alkanoyl, monoalkylamino, dialkylamino or acylamino, each of up to 4 carbon atoms, F, Cl, Br, I, OH, $NH_2$, $NO_2$, CN or $CF_3$; and Y is O or S; with the proviso that at least one of $R_2$ and $R_3$ is other than H; and the physiologically acceptable salts thereof.

DETAILED DISCUSSION

Compounds of Formula I possess, with good compatibility, excellent antiphlogistic activity. In particular, they exert a favorable influence on chronically progressive inflammation diseases involving the joints. They also possess analgesic and antipyretic activity. Therefore, the compounds of Formula I can be employed as drugs, especially for producing antiphlogistic, i.e., anti-inflammatory, effects in living beings. They are also useful as intermediates for the preparation of other medicines. In its composition aspect, this invention relates to pharmaceutical compositions comprising a compound of Formula I in admixture with a pharmaceutically acceptable carrier. In its method of use aspect, this invention relates to the treatment of inflammatory conditions with a compound of Formula I.

In its preferred aspects, this invention relates to the compounds of Formulae Ia - Ik below, and pharmaceutical compositions comprising them wherein any groups not otherwise defined have the values given in Formula I.

Ia $R_1$ is a free or esterified carboxyl group of 1-20 carbon atoms, optionally mono- or disubstituted $CONH_2$ group, CN, or $R_4$, wherein $R_4$ is —CHO, —CHOH—$SO_3M_1$, —CHOH—OA, —CH$(OA)_2$, —CH$(OAc)_2$, —CHOH—SA, —CH-$(SA)_2$, —CH=NOH, —$CH_2OH$, —$CH_2OAc$, —CH-$_2OA$, or =CHOA, =CHOAc or =CHOAr, $M_1$ is an equivalent of an alkali or alkaline earth metal, A is alkyl of 1-8, preferably 1-4 carbon atoms, e.g., methyl, ethyl, propyl, isopropyl, butyl, isobutyl, octyl, or, when two A groups are present, collectively alkylene of 2-5 carbon atoms, optionally interrupted by O, e.g., ethylene, propylene, trimethylene, ethyleneoxyethylene;

Ac is acyl of 1-18, preferably alkanoyl of 2-10, alkylsulfonyl of 1-6, arylsulfonyl of 6-10, or aroyl of 7-10 carbon atoms, and Ar is aryl of a total of 6-10 carbon atoms, optionally substituted, e.g., by $R_3$:

Ib $R_1$ is $COOR_5$, $CONHR_5$, $CON(A)_2$, CHO, or $CH_2OH$, wherein $R_5$ is H or an alkyl, cycloalkyl, cycloalkylalkyl, aryl, or aralkyl, respectively up to 20 carbon atoms which optionally can contain 1 or 2 C-C multiple bonds and/or whose carbon chain can be interrupted once or several times by Q and/or can be branched and/or can be mono- or poly-substituted by Cl, OH, SH, and/or $NH_2$, Q being O, S, NH, or optionally OH-substituted N-alkyl or 1-6 carbon atoms, N-Ar, or N-aralkyl of 7-10 carbon atoms;

Ic $R_1$ is $COOR_6$, CHO, or $CH_2OH$, wherein $R_6$ is H, A, or dialkylaminoalkyl of up to 10 carbon atoms;

Id $R_1$ is COOH, $COOCH_3$, or $COOC_2H_5$;

Ie $R_2$ is $CH_3$ or $C_2H_5$, especially those of Ia - Id;

If $R_2$ is $CH_3$, especially those of Ia - Id;

Ig $R_3$ is H, $CH_3$, $C_2H_5$, $CH_3O$, $CH_3CO$, F, Cl, Br, I, OH, $NH_2$ or $NO_2$, especially those of Ia - Id;

Ih $R_3$ is H, especially those of Ia - Id;

Ii $R_1$ is COOH, COOA, CHO, or $CH_2OH$,
$R_2$ is $CH_3$, and
$R_3$ is H, $C_2H_5$, F, Cl, Br, or I;

Ij $R_1$ is COOH, COOA, CHO, or $CH_2OH$,
$R_2$ is $CH_3$, and
$R_3$ is H or F;

Ik $R_1$ is COOH or COOA,
$R_2$ is $CH_3$, and
$R_3$ is H or 7-F.

Included in the compounds of Formula I and Ia are functional derivatives of aldehydes ($R_1$ = functionally modified CHO-group) derived from the enol form thereof and accordingly exhibiting an additional double bond, thus having the formula Z—$CR_2$=$R_1$, for example, the enol ethers ($R_1$ = =CHOA or =CHOAr, respectively) and the enol esters ($R_1$= =CHOAc).

$R_3$ is preferably at the 3-, 7-, or 8-position. However, this group can also be at the 1-, 4-, 6-, or 9-position. (The numbering of the individual positions is in accordance with the disclosure in "The Ring Index," Second Edition, 1960, No. 3011.)

Examples of compounds of Ia wherein $R_1$ is an esterified carboxyl group are those wherein the esterifying group is hydrocarbon including alkyl, arylalkyl, e.g., benzyl, p-methylbenzyl, phenethyl, aryl, e.g., phenyl; and wherein $R_1$ is mono- or disubstituted $CONH_2$ are CONHA and CONA$_2$ wherein A is as defined above, or cycloalkyl or cycloalkyl alkyl of 3-7 rings and a total of 3-12 carbon atoms, e.g., cyclopentyl, e.g., cyclohexyl, cyclopentylmethyl, -ethyl and -propyl, aryl, e.g., carbocyclic containing 1-3 separate or fused rings, and the corresponding aralkyl wherein the aryl portion is as defined herein and the alkyl portion contains 1-4 carbon atoms.

Aryl preferably in each instance is of 6-10 ring carbon atoms and more preferably is carbocyclic, e.g., phenyl, biphenyl and naphthyl, optionally substituted by $R_3$.

In its process aspect, this invention relates to a process for the preparation of compounds of general Formula I, which comprises converting, in a compound of general Formula II $$Z-X \quad (II)$$

wherein X is a group convertible into the group —$CHR_1R_2$ and Z, $R_1$, $R_2$, $R_3$, and Y have the values indicated in Formula I, X into the group -$CHR_1R_2$; or treating a compound of general Formula III

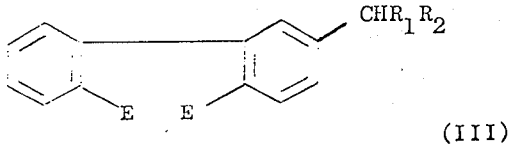

$$(III)$$

wherein one of the two groups E is the group $E_1$ and the other is the group Y-$E_2$, wherein $E_1$ is a group which can be split off with $E_2$ as $E_1E_2$, and $E_2$ is H or an equivalent of an alkali or alkaline earth metal, one of the two benzene rings is substituted by $R_3$, and $R_1$, $R_2$, $R_3$, and Y have the values given in Formula I, with an agent splitting off $E_1 - E_2$; or by treating a compound of general Formula IV

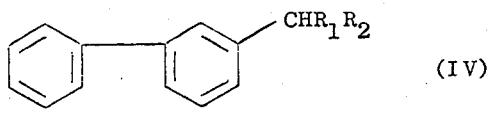

$$(IV)$$

wherein one of the two benzene rings is substituted by $R_3$ and $R_1$, $R_2$, and $R_3$ have the values given in Formula I, with sulfur in the presence of a catalyst; or by thermally cyclizing a compound of general Formula V

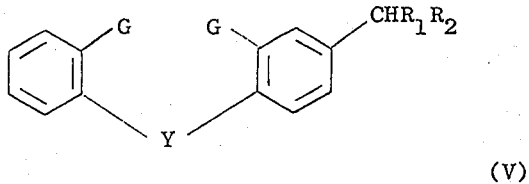

$$(V)$$

wherein one of the two G groups is OH or a diazonium salt group, and the other is H, and one of the two benzene rings is substituted by $R_3$, and $R_1$, $R_2$, $R_3$, and Y have the values given in Formula I; and optionally thereafter converting, in a thus-obtained product of Formula I, in one or several stages, one or both of the $R_1$ and/or $R_3$ groups into one or two other $R_1$ and/or $R_3$ groups having a different value.

In all of the above formulae, $R_1$ preferably is a free —COOH, CHO or $CH_2OH$ group. However, such groups can also be a functionally modified group. The term "functionally modified group" as used herein means a group that can be removed in vivo to regenerate the free group. Examples are esterified COOH—groups, wherein the alcohol portion is preferably of 1–14 carbon atoms, a free or acetalyzed CHO group or a free or esterified $CH_2OH$ group, e.g., as defined in Ia. Because the free carboxylic acids, aldehydes, and alcohols, of Formula I ($R_1$ = COOH, CHO and/or $CH_2OH$) are physiologically active compounds, it will be obvious that functional derivatives thereof which can be converted, e.g., hydrolyzed, thereto under physiological, i.e., in vivo, conditions, preferably at a pH of between 1 and 8, are the functional equivalents thereof. Therefore, the type of functional modification of the group $R_1$ is not critical, so long as it is removable under physiological conditions to the free acid, aldehyde or alcohol and is physiologically acceptable. Of course, it is also possible to modify the physiological effects obtained with the free forms by a suitable selection of the functional group, for example, depot effects can be achieved by the use of long-chain or difficult-to-saponify alcohol groups or acyl groups in esters. Improvements in solubility can be acheived by the incorporation of polar groups (O-atoms, N-atoms) into such functionally modified $R_1$ groups.

For example, $R_1$ can be $COOR_5$ or $COOR_6$, as defined above, preferably COOH, $COOCH_3$, or $COOC_2H_5$.

$R_5$ is preferably hydrogen; alkyl of 1-20, preferably 1-8, more preferably 1-4, carbon atoms, e.g., methyl, ethyl, n-proply, isopropyl, n-butyl, isobutyl, sec.-butyl, tert.-butyl, n-pentyl, isoamyl, n-hexyl, n-heptyl, n-octyl, 2-ethylhexyl, n-nonyl, n-decyl, n-undecyl, n-dodecyl, n-tridecyl, n-tetradecyl; alkenyl of 2-8, preferably 2-4, carbon atoms, e.g., vinyl, allyl, crotyl; alkinyl of 2-8, preferably 2-4-carbon atoms, e.g., propargyl; hydroxyalkyl of 2-8, preferably 2-4, carbon atoms, wherein the hydroxy group is preferably β or ω, e.g., 2-hydroxyethyl, 2-hydroxypropyl, 3-hydroxypropyl; alkoxyalkyl, wherein the alkoxy group is of 1-8, preferably 1-4, carbon atoms and alkyl is as defined above, e.g., 2-methoxyethyl, 2-ethoxyethyl; 3-oxa-5-hydroxypentyl, 3-oxa-5-methoxypentyl, 3-oxa-5-butoxyphenyl, 3,6-dioxa-8-hydroxyoctyl, 3,6-dioxa-8-methoxyoctyl, 3,6-dioxa-8-ethoxyoctyl, 3-oxa-5-ethoxypentyl; aminoalkyl, alkylaminoalkyl and dialkylaminoalkyl wherein alkyl in each instance contains up to 8, preferably up to 4 carbon atoms, e.g., 2-aminoethyl, 3-aminopropyl, 2-dimethylaminoethyl, 2-diethylaminoethyl, 2-di-n-propylaminoethyl, 3-dimethylaminopropyl, 3-diethylaminopropyl, 2-methyl-3-diethylaminopropyl; 4-dimethylaminobutyl, 4-diethylaminobutyl; cycloalkyl, preferably containing 5-8 ring carbon atoms, and 1-3 rings, e.g., cyclopentyl, cyclohexyl; cycloalkylalkyl, wherein cycloalkyl and alkyl are as defined above, e.g., 2-cyclohexylethyl, 3-cyclohexylpropyl; azacycloalkyl, e.g., N-methylpiperidyl(4); azacycloalkylalkyl and related cycloamino groups, e.g., containing in a total of 5–7 ring atoms and a ring N, O, or S atom β- to the amino group, e.g., (N-methylpiperidyl-3)-methyl, 2-(N-methylpiperidyl-2)-ethyl, 2-pyrrolidinoethyl, 2-piperidinoethyl, 2-homopiperidinoethyl, 2-morpholinoethyl, 2-thiomorpholinoethyl, 2-(N-methylpiperazino)-ethyl, 2-(N-ethylpiperazino)-ethyl, 2-(N-phenylpiperazino)-ethyl, 2-(N-2-hydroxyethylpiperazino)-ethyl, 2-(N-methylhomopiperazino)-ethyl, 2-(N-benzylpiperazino)-ethyl, 2-pyrrolidinopropyl, 3-pyrrolidinopropyl, 2-piperidinopropyl, 3-piperidinopropyl, 2-(N-methylpiperazino)-propyl, 3-(N-methylpiperazino)-propyl, 3-(N-ethylpiperazino)-propyl, 3-(N-phenylpiperazino)-propyl, 2-morpholinopropyl, 3-morpholinopropyl, 3-thiomorpholinopropyl, 2-methyl-3-pyrrolidinopropyl, 2-methyl-3-piperidinopropyl, 2-methyl-3-morpholinopropyl; mercaptoalkyl, e.g., 2-mercaptoethyl; alkylmercaptoalkyl, e.g., 2-methylmercaptoethyl, 2-ethylmercaptoethyl, 3-methylmercaptopropyl, 3-ethylmercaptopropyl; aryl as defined above, e.g., phenyl, o-tolyl, m-tolyl, p-tolyl, p-ethylphenyl, 1-naphthyl, 2-naphthyl; aralkyl, e.g., benzyl, p- methylbenzyl, 1-phenylethyl, 2-phenylethyl. $R_5$ can also be $Z-CHR_2-CH_2-$, wherein Z is as defined above.

$R_1$ can also represent other functionally modified carboxyl groups. Examples are acid halogenides ($R_1$ = COF, COCl, COBr); ortho esters ($R_1 = C(OA)_3$); acid anhydrides ($R_1$ = COOAcyl, wherein Acyl is the acyl group of a carboxylic acid of up to 28 carbon atoms, e.g., as defined herein above, preferably the residue $Z-CHR_2-CO-$); nitriles ($R_1 = CN$); acid amides ($R_1 = CONH_2$, CONHA, $CON(A)_2$, or CONHAr); hydroxamic acids ($R_1$ = CONHOH); acid hydrazides ($R_1$ = $CONHNH_2$ or CONHNHA); acid azides ($R_1 = CON_3$); imino ethers ($R_1 = C(OA)=NH$); acid amidines ($R_1 = C(=NH)NH_2$); acid hydrazidines ($R_1 = C(NH_2)=NNH_2$ or $C(NHNH_2)=NH$); thio acids ($R_1$ = CSOH or COSH); thio acid esters ($R_1$ = CSOA or COSA); and thio acid amides ($R_1 = CSHN_2$, CSNHA, or $CSN(A)_2$), wherein the A groups, which can be the same or different when more than one is present, have the values given above.

Examples of the preferred substituted amides groups are N-monoalkylamides, -dibenzofuryl)-propionamide methylamides, ethylamides, n-propylamides, isopropylamides, n-butylamides, isobutylamides; N,N-dialkylamides, e.g., dimethylamides, methylethylamides, diethylamides, di-n-propylamides, diisopropylamides, di-n-butylamides, diisobutylamides; N-monoaryl- and N-monoaralkylamides, e.g., anilides, N-benzylamides; N-hydroxyalkylamides, e.g., N-2-hydroxyethylamides; N,N-bis-hydroxyalkyl-amides, e.g., N,N-bis-2-hydroxyethylamides; heterocyclic amides, e.g., pyrrolidides, piperidides, morpholides, thiomorpholides, piperazides, N'-alkyl-piperazides, e.g., N'-methylpiperazides, N'-ethylpiperazides, N'-hydroxyalkyl-piperizides, e.g., N'-2-hydroxyethylpiperazides.

The compounds of Formula I include aldehydes of the formula $Z-CHR_2-CHO$, and also derived therefrom, the metal, particularly the alkali metal and/or alkaline earth metal bisulfite, especially sodium bisulfite, addition compounds of the formula $Z-CHR_2-CHOH-SO_3M_1$, hemiacetals of the formula $Z-CHR_2-CHOH-OA$, acetals of the formula $Z-CHR_2-CH(OA)_2$, acylates of the formula $Z-CHR_2-CH(OAc)_2$, hemimercaptals of the formula $Z-CHR_2-CHOA-SA$, mercaptals of the formula $Z-CHR_2-CH(SA)_2$, oximes of the formula $Z-CHR_2-CH=NOH$, enol ethers of the formula $Z-CR_2=CHOA$ or $Z-CR_2=CHOAr$, enol esters of the formula $Z-CR_2=CHOAc$, and Schiff bases of the formula $Z-CHR_2-CH=NAr$, hydrazones of the formula $Z-CHR_2-CH=N-NH-R'$ wherein $R'$ preferably is H, Ar, $CONH_2$, CONHAr, COOA, $CSNH_2$ or the residue of a Girard reagent) and azines of the formula $Z-CHR_2-CH=N-N=CH-CHR_2-Z$, wherein in each instance $Z, M_1, A, Ac, Ar$ and $R_2$ have the values given above.

These functional derivatives, among which the bisulfite compounds and the acetals are preferred, are normally more stable than the free aldehydes, which are in most cases very reactive, and thus can be more readily processed into stable pharmaceutical preparations than the free aldehydes.

Among the compounds of Formula I are those wherein $R_1$ is $CH_2OH$. Here, also the OH-group can be functionally modified, e.g., esterified with a saturated or unsaturated aliphatic, cycloaliphatic, aromatic, or heterocyclic substituted or unsubstituted carboxylic acid or sulfonic acid. Preferred carboxylic acids are fatty acids of 1–18, preferably 1–6, carbon atoms, e.g., formic acid, acetic acid, propionic acid, butyric acid, isobutyric acid, valeric acid, isovaleric acid, caproic acid, isocaproic acid, enanthic acid, caprylic acid, pelargonic acid, capric acid, lauric acid, myristic acid, palmitic acid, stearic acid. Others are crotonic acid, oleic acid, cyclohexanecarboxylic acid, cyclohexylacetic and -propionic acid, benzoic acid, phenylacetic and -propionic acid, picolinic acid, nicotinic acid, isonicotinic acid and furan-2-carboxylic acid. Of special importance are those esters which contain a group rendering the compound water-soluble, e.g., a carboxyl, hydroxyl, or amino group, since they can be used -- particularly in the form of their ester salts -- of the preparation of aqueous solutions. The thus-obtainable monoesters and/or dydroxy or amino esters are derived, for example, from dicarboxylic acids, e.g., oxalic, malonic, succinic, maleic, glutaric, dimethylglutaric, adipic, pimelic, acetonedicarboxylic, phthalic, tetrahydrophthalic, hexahydrophthalic, or diglycolic acid, hydroxycarboxylic acids, such as glycolic acid, or aminocarboxylic acids, such as diethylaminoacetic acid or aspartic acid. Preferred sulfonic acid esters are those derived from alkylsulfonic acids of 1–6 carbon atoms, e.g., methane- and ethanesulfonic acid and arylsulfonic acids of 6–10 carbon atoms, e.g., benzene-, p-toluene- and 1- and 2-naphthalenesulfonic acids. The OH-group in Formula I ($R_1 = CH_2OH$) can also be esterified with an inorganic acid, such as sulfuric acid or phosphoric acid, and can also represent an ester salt (e.g., sodium salt) group derived from such an ester.

$R_1$ can also represent an etherified $CH_2OH$—group, preferably alkoxy of 1–12, preferably 1–4 carbon atoms, e.g., methoxy, ethoxy, propoxy, isopropoxy, n-butoxy, isobutoxy, sec.-butoxy, or tert.-butoxy, as well as amyloxy, isoamyloxy, n-heptyloxy, n-hexyloxy, n-octyloxy, n-decyloxy, n-dodecyloxy. Examples of other etherified groups are alkenyloxy or alkinyloxy of preferably up to 12, especially up to 4 carbon atoms, e.g., vinyloxy, allyloxy, propargyloxy, or butenyloxy, aryloxy of preferably 6–12 carbon atoms, e.g., phenoxy, o-, m- or p-tolyloxy, 1- and 2-naphthyloxy, and aralkoxy of preferably 7–12 carbon atoms, e.g., benzyloxy, p-methylbenzyloxy, 1- and 2-phenylethoxy and 1- and 2-naphthylmethoxy. These alkoxy, alkenyloxy, alkinyloxy, aryloxy and aralkoxy groups can be unsubstituted or mono- or polysubstituted, especially by hydroxy, lower alkoxy of 1-4carbon atoms, e.g., methoxy, ethoxy or n-butoxy, halogen, e.g., F, Cl, Br or I, amino, substituted amino, e.g., monoalkylamino or dialkylamino, wherein the alkyl groups contain preferably 1–4 carbon atoms, heterocyclic groups, e.g., pyrrolidino, piperidino, homopiperidino, morpholino, thiomorpholino, N-alkylpiperazino, wherein the alkyl group contains 1–4 carbon atoms, N-phenylpiperazino, N-(hydroxyalkyl)-piperazino, mercapto and alkylmercapto of 1-4 carbon atoms.

A preferably is methyl or ethyl but can also be, for example, propyl, isopropyl, n-butyl, sec.-butyl, isobutyl, tert.-butyl, n-amyl, isoamyl, hexyl, isohexyl, heptyl, isoheptyl, octyl and isooctyl.

In the acetals, hemi-mercaptals, mercaptals, acid amides and thio acid amides of Formula I, in which two A groups are present in the formula, the two A groups can )—CH(CH collectively be, for example, —CH$_2$—, —(CH$_2$)$_3$—, —(CH$_2$)$_4$—, —(CH$_2$)$_5$— or —CH$_2$CH$_2$—O—CH$_2$CH$_2$—, and, less preferably —CH$_2$CH(CH$_3$)—, —CH(CH$_3$)-CH(CH$_3$)— and —CH$_2$CH(C$_2$H$_5$)—.

In the compounds described above having an Ac group, Ac preferably is acetyl, or less preferably propionyl, butyryl or isobutyryl. Ac can also be, for example, formyl, valeryl, isovaleryl, caproyl, trimethylacetyl, heptanoyl, octanoyl, decanoyl, methanesulfonyl, hexanesulfonyl, benzenesulfonyl, p-toluenesulfonyl, 1- or 2-naphthalenesulfonyl, benzoyl, toluyl and 1- or 2-naphthoyl.

Ar is preferably phenyl, but can also be phenyl substituted by 1-3 substituents, e.g., methyl, ethyl, methoxy, ethoxy, F, Cl, Br, for example o-, m- and especially p-tolyl, o-, m- and p-ethylphenyl, o-, m- and p-methoxyphenyl, o-, m- and p-ethoxyphenyl, o-, m- and p-fluorophenyl, o-, m- and p-chlorophenyl, o-, m- and p-bromophenyl and 1- and 2-naphthyl.

M$_1$ preferably is Na, but can also be, for example, K or an equivalent of Ca or Mg.

R$_2$ preferably contains 1-3 carbon atoms and, in particular, is CH$_3$ and C$_2$H$_5$, and when R$_3$ is other than H, also H.

R$_3$ preferably is H or F and can also be, for example, methyl, ethyl, n-propyl, isopropyl, n-butyl, isobutyl, sec.-butyl, tert.-butyl, methoxy, ethoxy, n-propoxy, isopropoxy, n-butoxy, isobutoxy, sec.-butoxy, tert.-butoxy, formyl, acetyl, butyryl, isobutyryl, methylamino, ethylamino, n-propylamino, isopropylamino, n-butylamino, isobutylamino, sec.-butylamino, tert.-butylamino, dimethylamino, methylethylamino, diethylamino, formamido, acetamido, propionamido, butyramido, isobutyramido, Cl, Br, I, OH, NH$_2$, NO$_2$, CN and CF$_3$. R$_3$ preferably a 7- or 8-position substituent.

The dibenzofuran and dibenzothiophene derivatives of Formulae I and Ia-Ik can be produced by:

a. i. reacting a compound of the Formula IIaa (II, X = H or M), wherein M is MgHal or an equivalent of a metallic atom or an organometallic group and Hal is Cl, Br, or I, with a compound of Formula VIa.

X$_1$—CHR$_1$R$_2$  VIa wherein X$_1$ is Hal or an hydroxy or amino group, which optionally can be in reactively functionally modified form, or with a des-HX$_1$ derivative thereof, or ii. reacting a compound of the Formula IIab (II, X = X$_1$) with a compound of the formula M—CHR$_1$R$_2$ (VIb), or iii. reacting a compound of the Formula IIac (II, X = CHR$_1$M) with a compound of the formula X$_1$R$_2$ (VIc) or with a des-HX$_1$ derivative thereof, or iv. reacting a compound of the Formula IIad (II, X = —CHR$_1$X$_1$) or a des-HX$_1$ derivative thereof with a compound of the formula M—R$_2$ (VId), or v. reacting a compound of the Formula IIae (II, X = —CHR$_2$M) with a compound of the formula X$_1$R$_1$ (VIe) or with a des-HX$_1$ derivative thereof, or vi. reacting a compound of the Formula IIaf (II, X = —CHR$_2$X$_1$) or a des-HX$_1$ derivative thereof with a compound of the formula M—R$_1$ (VIf), under conditions wherein HX$_1$ and/or MX$_1$ are split off; or b. treating a compound of the Formula IIb (II, X = X$_2$) wherein X$_2$ is a group oxidizable to the group —CHR$_1$R$_2$, and preferably is a group otherwise corresponding to —CHR$_1$R$_2$ but which contains in place of R$_1$ a group oxidizable to R$_1$, with a dehydrogenating and/or oxidizing agent; or c. treating a compound of the Formula IIc (II, X = X$_3$) wherein X$_3$ is a group reducible to the group —CHR$_1$R$_2$, and preferably is a group otherwise corresponding to —CHR$_1$R$_2$ but additionally contains at least one reducible group and/or multiple bond, with a reducing agent; or d. treating a compound of the Formula IId (II, X = X$_4$) wherein X$_4$ otherwise corresponds to the group —CHR$_1$R$_2$ but additionally contains a group removable by thermolysis or solvolysis, with a thermolyzing or solvolyzing agent; or e. reacting a compound of the Formula IIe (II, X = CHR$_2$X$_1$), or a des-HX$_1$ derivative thereof, with CO and/or a metal carbonly, optionally in the presence of a reducing agent and/or a reaction catalyst; or f. treating a halogenide of the Formula IIf (II, X = CO—CHR$_2$Hal) with a strong base; or g. rearranging a compound of the Formula IIg (II, X = —CHR$_2$—X$_5$) wherein X$_5$ is —CO—R$_5$ or —C(=NOH)—R$_5$, with HN$_3$ or an acidic catalyst, respectively; or h. catalytically or thermally splitting an epoxide of the Formula IIh

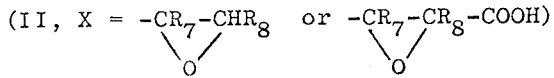

wherein
one of R$_7$ and R$_8$ is R$_2$ and the other is H; or i. treating a compound of the Formula IIi (II, X = —CR$_7$X$_1$—CHR$_8$—OR$_9$) wherein R$_9$ is H, A, or Ac, with an agent which splits off HX$_1$; or j. reacting a compound of the Formula IIj (II, X = —CO—R$_2$) with a compound of the Formula VII Ar$_3$P=CH—OR$_{10}$ l (VII) R$_{10}$ is A or Ar; or k. reacting a compound of the Formula IIk (II, X = —CHR$_2$—CH$_2$X$_6$) wherein X$_6$ is Hal or a diazonium group, with a compound of the Formula R$_9$OH and/or ArOH or with a metallic derivative of such a compound; or l. reacting a compound of the Formula III (II, X = —COCH$_3$) with ammonium polysulfide or with a primary or secondary amine in the presence of sulfur.

The above-mentioned Formulae IIaa – IIaf, as well as IIb – III, all correspond to Formula II, except X in each case has the values given for the individual formula.

In the aforementioned compounds, in addition to MgCl, MgBr, or MgI, M can especially be an equivalent of an alkali metal atom (e.g., Li, Na, K), an alkaline earth metal atom (e.g., Mg, Ca), or a Cu, Cd or Zn atom, or an organometallic radical, e.g., Mg-Z, Cd-Z, or Zn-Z. The term "organometallic residue" includes organoboron groups, for example, 9 -borabicyclo[3,3,1]nonyl-(9). When X$_1$ optionally is a hydroxy or amino group in reactively functionally modified form, included especially are those groups which can be split off, under the selected reaction conditions, in a manner analogously to Cl, Br, or I, as Hx$_1$, for example NH$_2$, NHA, NHAr, OH, ASO$_2$)— (e.g., methanesulfonyloxy), ArSO$_2$O— (e.g., benzenesulfonyloxy, p-toluenesulfonyloxy, 1- or 2-naphthalenesulfonyloxy), AcO (e.g., acetoxy, benzoyloxy), or an etherified OH-group of preferably 1–7 carbon atoms (e.g., methoxy, benzyloxy).

The individual variants of the process are more specifically described as follows:

a. Compounds of Formula I can be obtained, for example, by the reaction of dibenzofurans and/or -thiophenes (II, X = H), optionally substituted in the 2-position, with compounds (VIa) wherein $X_1$ preferably is Cl or Br, under Friedel-Crafts alkylation conditions. Especially suitable as the starting compounds are, on the one hand, dibenzofuran, dibenzothiophene, 2-alkyldibenzofurans, such as 2-methyldibenzofuran, 2-alkyl-dibenzothiophenes, e.g., 2-methyldibenzothiophene, 2-alkoxy-dibenzofurans, e.g., 2-methoxydibenzofuran, 2-alkoxy-dibenzothiophenes, e.g., 2-methoxydibenzothiophene and, on the other hand, 2-halocarboxylic acids of the formula $R_2$-CHHal-COOH, e.g., 2-chloro and 2-bromopropionic acid and the functional derivatives thereof, e.g., the corresponding esters, nitriles and amides, and also 2-haloalcohols of the formula $R_2$-CHHal-$CH_2$OH, e.g., 2-chloro-and by 2-bromopropanol and/or esters and ethers thereof. Also suitable are the des-$HX_1$ derivatives of the compounds of Formula VIa, for example, the corresponding unsaturated compounds, e.g., allyl alcohol and/or esters and ethers thereof, or epoxides, e.g., propylene oxide. The reaction takes place generally according to procedures disclosed in the literature. Examples of suitable catalysts are Lewis acids, e.g., $AlCl_3$, $AlBr_3$, $BF_3$, and the etherate of the latter, $BCl_3$, $BBr_3$, $ZnCl_2$, $ZnBr_2$, $FeCl_3$, $SbCl_5$, a mineral acid, e.g., HF, $H_2SO_4$, $H_3PO_4$, or an anhydride thereof, e.g., $P_2O_5$. Preferably, an inert solvent is employed, e.g., hexane, 1,2-dichloroethane, 1,1,2-trichloroethane, trichloroethylene, $CS_2$, or nitrobenzene. Normally, the reaction is first conducted with cooling and terminated at a temperature of about 0° to 100° C., suitably at room temperature. Reaction times of about 1 hour to 100 hours are usually required.

A variant of this method comprises heating a compound of Formula II (X = H) with a halofatty acid to a temperature of about 100°–250° C., in the presence of a heavy metal oxide, e.g., $Fe_2O_3$, and a metallic halide, e.g., KBr.

Compounds of Formula I can also be obtained by the reaction of an organometallic compound of Formula IIaa (X = M), VIb, IIac, VId, IIae or VIf, respectively, with a halogen compound or an analog thereof of Formula VIa, IIab, VIc, IIad, VIe or IIaf, respectively, or with the corresponding des-$HX_1$ derivative, especially the dehydrohalogen derivative thereof, under conditions wherein $MX_1$ is split off and which correspond to the conditions for organometallic syntheses known in the literature.

Starting compounds for this reaction are, for example:

Z—M (IIaa, X = M): 2-dibenzofuryllithium, 2-dibenzofurylmagnesium chloride, bromide and iodide, bis(2-dibenzofuryl)cadmium, 2-dibenzothienyllithium, 2-dibenzothienylmagnesium chloride, bromide and iodide, bis(2-dibenzothienyl)cadmium;

Z—$X_1$ (IIab): 2-chloro-, 2-bromo- and 2-hydroxydibenzofuran;

Z—$CHR_1$M (IIac): derivatives metallized in the α-position, for example, by Na or an $MgX_1$ group, of 2-dibenzofurylacetic acid, 2-dibenzofurylacetaldehyde, 2-(2-dibenzofuryl)-ethanol, 2-dibenzothienylacetic acid, 2-dibenzothienylacetaldehyde, or 2-(2-dibenzothienyl)-ethanol and/or the functional derivatives thereof;

Z—$CHR_1X_1$ (IIad): derivatives of the above-named compounds halogenated in the α-position, e.g., 2-dibenzofurylchloro-, -bromo-, or -iodoacetic acid, 2-dibenzothienylchloro-, -bromo-, and -iodoacetic acid, and the functional derivatives thereof, and derivatives of 2-dibenzofurylbromoethanol and of 2-dibenzothienylbromoethanol, 2-(2-dibenzofuryl)-2-bromoethanol and 2-(2-dibenzothienyl)-2-bromoethanol and the ethers and esters thereof;

Z—$CHR_2$M (IIae): 1-(2-dibenzofuryl)-ethyllithium, -magnesium chloride or -magnesium bromide, 1-(2-dibenzothienyl)-ethyllithium, -magnesium chloride, and -magnesium bromide;

Z—$CHR_2X_1$ (IIaf): 2-(1-chloroethyl)-dibenzofuran, 2-(1-bromoethyl)-dibenzofuran, 2-(1-hydroxyethyl)-dibenzofuran, 2-vinyldibenzofuran, 2-(1-chloroethyl)-dibenzothiophene, 2-(1-bromoethyl)-dibenzothiophene, 2-(1-hydroxyethyl)-dibenzothiophene, 2-vinyldibenzothiophene;

$X_1$—$CHR_1R_2$ (VIa): 2-halocarboxylic acids, 2-haloalkanals, 2-haloalkanols and the functional derivatives thereof, preferably the bromine and iodine compounds, e.g., 2-chloropropionic acid, 2-bromopropionic acid ethyl ester, 2-bromopropionitrile, 2-bromopropionaldehyde diethylacetal, 2-chloropropanol, 2-bromopropylmethyl ether, and the des-$HX_1$ derivatives of these compounds, e.g., propylene oxide, allyl alcohol;

M—$CHR_1R_2$ (VIb): the Grignard compounds and organolithium compounds derived from 2-halocarboxylic acids and/or the salts and functional derivatives thereof, from 2-haloaldehyde derivatives, or from 2-haloalcohol derivatives, e.g., the lithium salt of 2-lithiumpropionic acid;

$X_1R_2$ (VIc): alkyl halides, e.g., methyl chloride, bromide, or iodide, ethyl chloride, bromide or iodide, n-propyl chloride, bromide or iodide, n-butyl chloride, bromide or iodide, and also the corresponding alcohols and the reactive esters thereof, e.g., the sulfuric acid and sulfonic acid esters, e.g., the p-toluenesulfonates, e.g., dimethyl sulfate and p-toluenesulfonic acid ethyl ester;

$MR_2$ (VId): the Grignard and organolithium compounds derived from the aforementioned halides VIc, e.g., methyllithium, methylmagnesium chloride, bromide or iodide, butyllithium;

$X_1R_1$ (VIe): carbonic acid derivatives, e.g., orthocarbonic acid tetraethyl ester, $CO_2$, diethyl carbonate, ethyl chloroformate; formic acid derivatives, e.g., ethyl formate, ethyl orthoformate; derivatives of formaldehyde, e.g., methylal, chloromethyl methyl ether; bromomethyl benzyl ether;

$MR_1$ (VIf): salts of hydrocyanic acid, e.g., NaCN, KCN; $Cu_2(CN)_2$.

These starting compounds for the most part are known or can be prepared in a conventional manner. Thus, the halogen compounds are obtained, for example, by the direct halogenation of the halogen-free basic members, or by reacting the corresponding hydroxy compounds with $SOCl_2$, HBr or $PBr_3$. The iodine compounds can also be produced, for example, by reaction of the bromine compounds with KI. The organometallic compounds can be obtained, for example, by metallizing the corresponding hydrogen or halogen compounds, e.g., with metallic Na, Li, or Mg, NaH, NaNH$_2$, alkyllithium or aryllithium compounds, e.g., butyllithium or phenyllithium.

Suitable solvents for these reactions are, for example, ethers, e.g., diethyl ether, diisopropyl ether, 1,2-dimethoxyethane, tetrahydrofuran (THF), dioxane and mixtures thereof with each other or with hydrocarbons, e.g., hexane, benzene, toluene or xylene, amides, e.g., dimethylformamide (DMF), hexamethylphosphoric acid triamide, sulfoxides, e.g., dimethyl sulfoxide (DMSO). The reaction temperatures are normally about $-20°$ to $180°$ C., preferably $0°$ to $70°$ C. The reaction times usually range from 0.5 to 72 hours. It is possible to add a Lewis acid to the reaction mixtures, e.g., AlCl$_3$, FeCl$_3$, ZnCl$_2$. Furthermore, the reaction can be started in a low-boiling solvent, e.g., diethyl ether, and this solvent then replaced by a higher boiling one, e.g., benzene, and the reaction can then be terminated in the latter solvent, for example by refluxing.

Several variants of these organometallic reactions are specifically:

Carboxylic acids of Formula I ($R_1$ = COOH) are obtained by reacting a compound IIae with CO$_2$. For this purpose, a dry stream of CO$_2$ can be introduced into the cooled solution of the organometallic compound, or this solution can be poured onto solid CO$_2$. Preferably, Grignard compounds of the formula Z—CHR$_2$—MgHal are employed, which can be produced with a large excess of a mixture of magnesium filings and pulverized magnesium, and a vigorous steam of CO$_2$ is passed through the reaction mixture during the Grignardization.

In addition to employing an organometallic compound of Formula IIaa, there can also be employed compounds of Formulae VIb, IIac, VId, IIae and/or Vif, wherein M is an organoboron residue, particularly 9-borabicyclo[3,3,1]nonyl-(9). These starting compounds can be obtained, for example, by reacting the corresponding organolithium compounds with 9-borabicyclo[3,3,1]nonane in an ether at a temperature of about $-10°$ to $+20°$ C. and subsequent acidification. They normally are not isolated. The actual reaction of these organoboron compounds with the compounds of Formula VIa or of Formulae IIab, VIc, IIad, VIe and/or IIaf, takes place suitably with the addition of a lower tert.-alkanol and an excess of a lower alkali metal tert.-alkoxide, preferably potassium tert.-butylate or -pentylate, at a temperature of about $-10°$ to $+20°$ C.

Aldehydes and/or the derivatives thereof of Formula I ($R_1$ = optionally functionally modified aldehyde group) can be obtained by reacting the organometallic compounds of Formula IIae with formic acid derivatives.

The reaction of compounds IIae with formic acid esters of the formula HCOOA leads directly to aldehydes of the formula Z—CHR$_2$—CHO. However, since the reaction readily goes beyond the aldehyde stage, it is advantageous to work with an excess of the ester and at a temperature, e.g., $-100°$ to $-50°$ C.

Orthoformic acid esters of the formula HC(OA)$_3$ react with the compounds IIae with the formation of acetals of the formula Z—CHR$_2$—CH(OA)$_2$. By working up the reaction mixture in an acidic medium, the free aldehydes of the formula Z—CHR$_2$—CHO are obtained. The reaction is most advantageously effected with equimolar amounts of reactants. First, the reaction mixture is allowed to react for several hours under cold conditions and then the mixture is heated to $50°$–$80°$ C., optionally while replacing a low-boiling inert solvent, e.g., ether, by a higher-boiling solvent, e.g., benzene.

Schiff bases of the formula Z—CHR$_2$—CH=NAr are obtained by reacting the organometallic reagents IIae with N-(alkoxymethylene)-arylamines of the formula AO—CH=NAr, e.g., ethoxymethylene aniline. This reaction takes place under very gentle conditions and is usually terminated after boiling the components for one-half hour in an ether solution. By decomposing the reaction mixture with ice and hydrochloric acid, the aldehydes (Z—CHR$_2$—CHO) are directly obtained.

Also, substituted formamides, usually formyl monoalkylanilines of the formula CHO—NAAr or formyl diarylamines of the formula CHO—NAr$_2$, can be reacted with organometallic reagents of the Formula IIae. Ordinarily, the reaction is conducted at room temperature. The formamides are employed in excess and the aldehyde ammonias formed as an intermediate are decomposed by working up the reaction mixture in an acidic medium, with the formation of the desired aldehydes. Preferred formamides are N-methylformanilide and N-phenylformanilide.

b. To produce the compounds of Formula I, it is also possible to treat compounds of the formula Z—X$_2$ (IIb) with a dehydrogenating and/or oxidizing agent.

Suitable starting compounds of Formula IIb are, for example, those wherein X$_2$ is —CHR$_2$—CH=CHR$_{11}$, —CHR$_2$—CHOH—CHOH—R$_{11}$, —CHR$_2$—CHOH—CO—R$_{11}$, —CHR$_2$—CHOH—COOR$_{11}$, —CHR$_2$—CHOH—CHNH$_2$R$_{11}$, —CHR$_2$—C≡C—R$_{11}$, —CHR$_2$—CO—R$_{11}$, wherein R$_{11}$ is H or any desired organic radical, preferably A, Ar, CN or COOH, since the part of the molecule carrying the R$_{11}$ group is removed by oxidation so that the exact nature of the R$_{11}$ group is not critical, —CHR$_2$—CH$_2$—R$_{12}$, wherein R$_{12}$ is a hydroboron, boroalkyl, or aluminum alkyl group, an alkali metal or an alkaline earth metal halide group, or —CR$_2$=R$_{13}$, wherein R$_{13}$ is =CH$_2$, (OH, CH$_3$), or the group —O—CH$_2$—.

According to the oxidation conditions described in the literature, suitable oxidizing agents are, for example, air or oxygen, preferably with the addition of a catalyst, e.g., Mn, Co, Fe, Ag or V$_2$O$_5$; silver oxide, optionally also together with copper oxide; H$_2$O$_2$, preferably in the presence of an alkaline agent; organic peracids, e.g., peracetic acid, perbenzoic acid, perphthalic acid; potassium permanganate in an aqueous or acetonic solution and/or an acidic, neutral, or alkaline medium, optionally with the addition of MgSO$_4$; chromic acid or CrO$_3$, e.g., in acetic acid or acetone, or in an aqueous-acetonic solution in the presence of sulfuric acid; HNO$_2$ and the salts thereof; HNO$_3$ and the salts thereof, for example 2-68% strength nitric acid, optionally under pressure (up to 100 atmospheres); nitrogen oxides; HClO or the salts thereof, e.g., NaClO; MnO$_2$, e.g., in dilute sulfuric acid or in a suspension in inert organic solvents, for example petroleum ether; PbO$_2$; lead tetraacetate, e.g., in acetic acid or benzene, optionally with the addition of some pyridine; SeO$_2$; N-haloamides, e.g., N-bromo-succinimide, for example in acetic acid/sodium acetate or in pyridine; m-nitrobenzenesulfonic acid; H$_5$IO$_6$ and the salts thereof; ozone;

NaBiO$_3$; and a mixture of sulfur and an anhydrous primary or secondary amine, e.g., morpholine.

Examples of suitable solvents for these oxidations are water or aqueous alkali solutions; carboxylic acids, e.g., acetic acid; alcohols, e.g., methanol, ethanol, isopropanol, or tert.-butanol; ethers, e.g., diethyl ether, THF, dioxane; ketones, e.g., acetone; hydrocarbons, e.g., benzene; amides, e.g., DMF or hexamethylphosphoric triamide; and sulfoxides, e.g., DMSO. Also suitable are mixtures of these solvents, especially mixtures of water with an organic solvent. The temperatures during the oxidation step range from −30° to 300° C., depending on the method employed.

Characteristic oxidation methods are, for example: 2-Oxocarboxylic acids of the formula Z—CHR$_2$—CO—COOH can be decarbonylated by oxidation, for example with aqueous-alkaline H$_2$O$_2$, to carboxylic acids of the formula Z—CHR$_2$—COOH. A decarbonylation is likewise possible in a sulfuric acid or hydrochloric acid solution in the presence of an oxidation agent. In an alkaline solution, the reaction is advantageously conducted at a temperature from 0° to 25° C. The 2-oxocarboxylic acids are obtainable, for example, by the reaction of 2-acyldibenzofurans and/or -dibenzothiophenes of the formual Z—CO—R$_2$ with acetylglycine to the corresponding azlactone and alkaline hydrolysis.

Unsaturated compounds of the formula Z—CHR$_2$—CH=CH—R$_{11}$, e.g., wherein R$_{11}$ = CN, which are obtainable by reacting a carbonyl compound Z—CO—R$_2$ with acrylonitrile in the presence of triphenylphosphine in cyclohexanol, and/or of the formula Z—CHR$_2$—C≡CR$_{11}$ can be converted, for example, by oxidation into aldehydes of the formula Z—CHR$_2$—CHO or into carboxylic acids of the formula Z—CHR$_2$—COOH, depending on the choice of the oxidation agent and the conditions. An oxidation with KMnO$_4$ or OsO$_4$ leads, first of all, to the 1,2-glycols Z—CHR$_2$—CHOH—CHOH—R$_{11}$ which can be split, for example with H$_5$IO$_6$, to form the corresponding aldehydes.

An oxidation of the olefinic double bond with ozone, e.g., in CH$_2$Cl$_2$ or ethyl acetate, leads to ozonides which can be split reductively by means of zinc in acetic acid, or by catalytic hydrogenation on palladium/calcium carbonate to aldehydes (I, R$_1$ = CHO). On the other hand, they can be converted, with stronger oxidation agents, into carboxylic acids (I, R$_1$ = COOH).

Compounds of Formula IIc carrying groups with functional groups on adjacent carbon atoms, e.g., 1,2-diols, 1,2-ketols, 2-hydroxy-carboxylic acids, or 1,2-hydroxy-amines can be split, for example, with lead tetraacetate, with NaBiO$_3$, or with H$_5$IO$_6$ between the carbon atoms carrying the functional groups, to form an aldehyde function. The lead tetraacetate oxidation is suitably accomplished with the stoichiometric amount of oxidation agent in an inert solvent, such as acetic acid, chloroform, tetrachloroethane, benzene, or nitrobenzene at temperatures of between 0° and 60° C.

When conducting the oxidation with periodic acid, an aqueous medium is suitably utilized. Advantageous solubilizers for the glycol are emulsifiers, dioxane, acetic acid or tert.butanol. The reaction temperature ranges suitably from 0° to 15° C.

Compounds of the formula Z—CHR$_2$—CH$_2$—R$_{12}$ can be converted into the corresponding compounds of Formula I by oxidation. For this purpose, it is unnecessary to isolate the organoboron or organometallic compounds required as the starting materials in the pure form. Instead, they can be oxidized directly in the reaction mixture in which they were produced.

In one mode of operation of this reaction, an ethylene derivative of the formula Z—CR$_2$=CH$_2$ is first reacted with diborane. For this purpose, a B$_2$H$_6$-solution or a complex boron hydride, e.g., NaBH$_4$, and a Lewis acid, e.g., BF$_3$-etherate, are added, for example, to a solution of the olefin in, e.g., THF or di- or triethylene glycol dimethyl ether at a temperature from about −80°C. to the boiling point of the solvent, and the thus-produced trisubstituted borane is then oxidized, optionally after decomposing the excess complex hydride with water. Depending on the oxidation agent employed and the oxidation conditions, various products of Formula I can be obtained. For example, by oxidizing with H$_2$O$_2$ with the addition of a base, e.g., NaOH, preferably at a temperature of from 20° to 60° C., alcohols (I, R$_1$ = CH$_2$OH) are produced, whereas oxidation with an excess of CrO$_3$, preferably in aqueous acetic acid at about 0°–40° C., and after a reaction time of about 1–48 hours, leads to the carboxylic acids (I, R$_1$ = COOH). Alkylaluminum compounds can be used in place of the diborane, which former compounds can be added and split by oxidation in an analogous manner.

Furthermore, the dibenzofuryl- or dibenzothienylethyl metal and metal halide compounds of the formula Z—CHR$_2$—CH$_2$M, obtainable from the halogenides of the formula Z—CHR$_2$—CH$_2$—Hal with alkali metals, preferably Li, or alkaline earth metals, preferably Mg, can be treated with an oxidation agent for conversion into compounds of Formula I (R$_1$ = optionally functionally modified CH$_2$OH-group). In a preferred embodiment of this method, oxygen is passed through a solution of the corresponding Grignard compound of the formula Z—CHR$_2$—CH$_2$—MgHal in an inert solvent, e.g., ether, THF, or dioxane, at a temperature of about 40° to 100° C. After the usual working-up procedure, alcohols of the formula Z—CHR$_2$—CH$_2$-OH are obtained.

In a modification of this variant of the process, a compound of the formula Z—CR$_2$=R$_{13}$ is treated with sulfur and an anhydrous amine at an elevated temperature, preferably at at least 100° C., until a thioamide has been formed. The reaction mixture should contain at least 2, preferably at least 3 molar equivalents of sulfur in finely divided form. At least 2 molar equivalents of amine should be employed. Any primary or secondary aliphatic or alicyclic amine can be used in this reaction, e.g., primary or secondary hydrocarbon amines of up to 12 carbon atoms, e.g., methylamine, dimethylamine, ethylamine, diethylamine, n-butylamine, n-hexylamine, n-octylamine, etc. Also suitable are cyclic amines, which can be substituted by alkyl groups and can contain oxygen in the ring structure, e.g., piperidine, morpholine, etc. Morpholine is preferred, since this compound makes possible conducting the reaction at ambient pressure. No solvent is necessary in the reaction mixture. However, if desired, pyridine or an excess amine, DMF, etc., can be used. The reaction time depends primarily on the reaction temperature; ordinarily, 4–48 hours are sufficient. The thus-obtained thioamide of the formula Z—CHR$_2$—CSNR$_{14}$, wherein the R$_{14}$N group corresponds to the starting amine R$_{14}$NH, can optionally be hydrolyzed to the corresponding carboxylic acid (I; R$_1$ = COOH). It is not necessary to isolate the thioamide from the reaction mixture.

c. Compounds of Formula I can also be obtained by the reduction of compounds of Formula IIc.

Typical compounds of the Formula IIc are those of Formula IIca, IIcb or IIcc, for example:

$$Z-CR_1=R_{15}$$ IIca wherein $R_{15}$ is an alkylidene of up to 4 carbon atoms, corresponding to $R_2$;

$$Z-CR_2=R_{16}$$ IIcb wherein $R_{16}$ is $=CHR_{17}$,

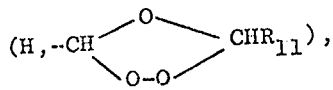

or $-O-CH_2-$ and $R_{17}$ is an esterified or etherified OH-group;

$$Z-CR_1R_2-R_{18}$$ IIcc wherein $R_{18}$ is a group removable by hydrogenolysis, especially OH, OAc, Hal, SH, $NH_2$, aralkyloxy or aralkylamino, each of up to 10 carbon atoms.

The reduction of these starting substances can be suitably effected by catalytic hydrogenation or by chemical methods.

The starting materials can be treated with hydrogen, for example in the presence of a catalyst, at pressures of about 1 to about 200 atmospheres and at temperatures of about $-80°$ to $200°$ C., preferably $20°$ to $100°$ C. The hydrogenation is advantageously accomplished in the presence of an inert solvent, e.g., water, aqueous sodium hydroxide solution, lower alcohols, e.g., methanol, ethanol, isopropanol, n-butanol, esters, e.g., ethyl acetate, ethers, e.g., THF or dioxane or carboxylic acids, e.g., acetic or propionic acid. It is also possible to utilize solvent mixtures. For the hydrogenation, the free compounds IIc can be employed, or also the corresponding salts, e.g., the hydrochlorides or sodium salts. Suitable catalysts are, for example, noble metal, nickel and cobalt catalysts. The noble metal catalysts can be provided on supports, e.g., on charcoal, calcium carbonate, or strontium carbonate, as oxide catalysts, or as finely divided metallic catalysts, e.g., platinum and palladium, which are preferred, and ruthenium or rhodium. Nickel and cobalt catalysts are suitably employed as Raney metals. Nickel can also be used on kieselguhr or pumice as the support. Another suitable catalyst is copper-chromium oxide. With this catalyst, it is simultaneously possible to effect a reduction of any ester groups present in the molecule to alcohols.

Preferably, normal pressure is utilized during the hydrogenation of multiple bonds, and the reaction is carried out so that the hydrogenation is terminated after absorption of the stoichiometric amount of hydrogen. It is basically possible to operate in an acidic, neutral or basic range.

Also suitable as a reducing method for the compounds of Formula IIc is the reaction with nascent hydrogen. The latter can be produced, for example, by treating metals with acids or bases, e.g., the systems zinc/acid, zinc/alkaline solution, iron/acid and tin/acid.

Advantageous acids are, for example, hydrochloric acid or acetic acid. A mixture of zinc with acetic acid, for example, can be advantageously employed for the reduction of ozonides IIcb

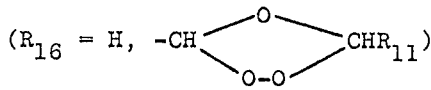

to aldehydes (I, $R_1 = CHO$). Also suitable for the production of the nascent hydrogen is sodium or another alkali metal in a lower alcohol, e.g., ethanol, isopropanol, n-butanol, amyl alcohol and isoamyl alcohol, or in phenol. An aluminum-nickel alloy in an alkaline-aqueous solution, optionally with the addition of methanol, can likewise be used for this purpose. Sodium or aluminum amalgam in an aqueous-alcoholic or aqueous solution can also be employed for producing the nascent hydrogen. The reaction can also be effected in a heterogeneous phase, wherein an aqueous phase and a benzene or toluene phase are advantageously utilized. In this reducing method, temperatures of about $0°$ to about $150°$ C., preferably $20°$ C. to the boiling point of the solvent employed, are employed.

Other suitable reducing agents are metal hydrides, particularly complex metal hydrides. This is especially advantageous when it is desired to simultaneously a reduction of the group $R_1$ to the aldehyde or alcohol stage. Suitable hydrides of this type are, for example, lithium aluminum hydride, sodium borohydride, e.g., in the presence of aluminum chloride or lithium bromide, calcium borohydride, magnesium borohydride, sodium aluminum hydride, lithium and sodium alkoxyaluminum hydrides, e.g., $LiAl(OC_2H_5)_2H_2$, $LiAl(OC_2H_5)_3H$, $LiAl(O-tert.-C_4H_9)_3H$, $NaAl(OC_2H_5)_3H$ and sodium trialkoxy borohydrides, e.g., sodium trimethoxyborohydride. Additionally suitable reducing agents are dialkylaluminum hydrides, e.g., diisobutylaluminum hydride. These reductions are advantageously conducted in the presence of an inert solvent, for example, an ether, e.g., diethyl ether, THF, dioxane, 1,2-dimethoxyethane, or diglyme. Sodium borohydride can also be used in an aqueous or aqueous-alcoholic solution. The reaction takes place preferably at temperatures of from $-80°$ to $+100°$ C., especially from $20°$ C. to the boiling point of the solvent employed. An inert gas atmosphere, e.g., $N_2$ or argon, can be used in this reaction. The thus-formed metal complexes can also be decomposed in the usual manner, e.g., with moist ether or with an aqueous ammonium chloride solution. As is known in the art, depending on the conditions employed, reduction of unsaturated esters of the type $Z-C(=R_{15})-COOA$ with $LiAlH_4$ results in various products, for example, in aldehydes (I, $R_1 = CHO$) or alcohols (I, $R_1 = CH_2OH$).

Another preferred reducing agent especially suitable for the removal of a tertiary OH-group in a starting compound of the formula $Z-CR_1R_2-OH$ is tin(II) chloride, which is preferably utilized in the form of the dihydrate thereof in an aqueous, aqueous-alcoholic, or aqueous-acidic solution, e.g., in the presence of acetic acid and/or hydrochloric acid. This reagent is suitably used at temperatures of between about $0°$ and $120°$ C. This reagent is usable as a reducing agent in the preferred method of synthesizing the acids and esters of Formula I described below.

A dibenzofuran or dibenzothiophene of the formula $Z-H$ is reacted, in a Friedel-Crafts reaction, with ethoxalyl chloride to the corresponding 2-(2-dibenzofuryl)- or 2-(2-dibenzothienyl)glyoxylic acid ethyl ester, respectively, which are converted, with an organometallic compound of the formula $R_2M$, into the corresponding tertiary hydroxy ester of the formula $Z—CR_2(OH)—COOC_2H_5$, which can be reduced, with tin(II) chloride, to the desired ester $Z—CHR_2—COOC_2H_5$. When operation under hydrolyzing conditions, carboxylic acids of the formula $Z—CHR_2—COOH$ are obtained.

Another reducing agent is hydriodic acid, optionally with the addition of phosphorus and//or solvents, e.g., acetic acid, preferably at a temperature of from 100° C. to the boiling temperature. Oxo groups, in particular, can thus be reduced to $CH_2$-groups.

Additional suitable reducing agents are, for example, sodium dithionite in an alkaline or ammoniacal solution; iron(II) hydroxide; hydrogen sulfide and the derivatives thereof, especially metal hydrogen sulfides, metal sulfides and polysulfides; $SO_2$ and the derivatives thereof, e.g., bisulfites and sulfites.

It is also possible to reduce, in compounds of the Formula IIc, one or more carbonyl groups to $CH_2$-groups in accordance with the methods of Clemmensen or Wolff-Kishner known in the literature.

The Clemmensen reduction can be conducted, for example, by treating the carbonyl compound with a mixture of zinc and hydrochloric acid, amalgamated zinc and hydrochloric acid, or tin and hydrochloric acid. This reaction is conducted, for example, either in an aqueous-alcoholic solution or in a heterogeneous phase with a mixture of water and benzene or toluene. The reaction is preferably effected at a temperature of from 20° to 130° C., especially at the boiling temperature of the reaction mixture. The metal can either be supplied first and the acid added thereto dropwise, or conversely, the acid can be supplied first and the metal can be added in batches.

The Wolff-Kishner reduction is accomplished, for example, by treatment of the carbonyl compounds with hydrazine in an autoclave and/or in a bomb tube at reaction temperatures of from 100° to 250° C. An advantageous catalyst in this reaction is sodium alcoholate. The reduction can also be modified by using hydrazine hydrate as the reducing agent and executing the reaction in an alcohol or in a high-boiling water-miscible solvent, e.g., diethylene glycol or triethylene glycol and/or in the presence of a strong base, e.g., NaOH, KOH, or K-tert.butylate. The reaction mixture is normally refluxed for about 3–4 hours. Thereafter, the water is distilled off and the residue heated for a period of time to a temperature of up to about 200° C. During this step, the formed hydrazone is decomposed and the CO-group is converted into a $CH_2$-group.

It is also possible to replace Hal-atoms by hydrogen by converting the corresponding Hal-compounds into the associated organometal, e.g., Grignard, compounds, and hydrolyzing the latter with water or dilute acids.

By the above-described methods, it is possible to reduce several reducible groups in a given starting compound, wherein the compounds of Formula IIC are passed through an intermediate stages of the reaction, but need not be isolated. Furthermore, an $R_1$ and/or $R_3$ group in the starting compound can be reduced to another group $R_1$ and/or $R_3$.

Thus, for example, one obtains 2-(7-ethyl-2-dibenzofuryl)valeric acid from 2-(7-acetyl-2-dibenzofuryl)-4oxopentanoic acid, according to Wolff-Kishner or Clemmensen, or 2-(7-amino-2-dibenzofuryl)-propionic acid from 2-(7-nitro-2-dibenzofuryl)-2-hydroxypropionic acid by reaction with $SnCl_2$.

d. Compounds of Formula I can also be produced from compounds of Formula IId by thermolysis or solvolysis.

Additional functional groups in the $X_4$ groups which can be removed by thermolysis or solvolysis are, for example, carboxyl groups, which can be removed by decarboxylation.

Acyl groups, particularly acetyl groups, can be split off by treatment with a strong alkali (acid cleavage). It is also possible, for example, to remove the oxo group of 2-oxocarboxylic acids in the form of carbon monoxide or to split off $CO_2$ from these acids with the formation of the basic aldehyde and/or aldehyde derivative.

Starting compounds suitable for the decarboxylation are, for example, compounds of the formula $Z—CR_1R_2—COOH$ wherein $R_1$ preferably is an optionally functionally modified COOH-group. Such malonic acid derivatives can be obtained, for example, by the condensation of a 2-dibenzofuryl- or 2-dibenzothienylacetic acid ester of the formula $Z—CH_2—COOA$ with an oxalic acid dialkyl ester to the corresponding 2-(2-dibenzofuryl)- or 2-(2-dibenzothienyl)-3-oxosuccinic acid diester. The decarbonylation of these compounds results in 2-(2-dibenzofuryl)- or 2-dibenzothienyl)-malonic esters which, in the form of their sodium derivatives, can be alkylated with a compound of the formula $R_2$-Hal. The thus-produced diesters of the formula $Z—CR_2(COOA)_2$ can subsequently be saponified, optionally partially.

A decarboxylation of these starting substances can, as described in the literature, be accomplished, for example, by dry heating or by warming in a solvent, e.g., water, ethanol, dioxane or xylene, to a temperature of from 50° to 300° C. Suitably, the reaction mixture is heated until the evolution of $CO_2$ has stopped. It is possible to conduct the reaction under reduced pressure. $CO_2$ can also be split off by heating with acids, e.g., a mixture of aqueous hydrochloric acid and acetic acid. This reaction can be conducted under an inert gas, e.g., nitrogen.

For acid cleavage, especially suitable are keto esters of the formula $Z—CR_2—Ac—COOA$, wherein Ac preferably is acetyl or benzoyl. These keto esters can be obtained, for example, by the condensation of esters of the formula AcOA, especially alkyl esters of acetic and/or benzoic acid, with esters of the formula $Z—CH_2—COOA$ and/or with cyanides of the formula $Z—CH_2CN$. The thus-produced keto esters or ketonitriles of the formulae $Z—CH(COOA)—Ac$ and $Z—CH(CN)—Ac$, respectively, can thereafter be alkylated as described above, thus obtaining compounds of the formulae $Z—CR_2(COOA)—Ac$ and $Z—CR_2(CN)—Ac$, respectively. If desired, additional functional modifications can be effected on the ester or nitrile groups. The acid cleavage of the thus produced compounds of the formula $Z—CR_1R_2—Ac$ takes place normally by treatment with a strong base, e.g., NaOH, KOH, or $Ca(OH)_2$, in a solvent, e.g., water, lower alcohols, e.g., methanol or ethanol, ethers, e.g., diethyl ether, THF, dioxane, hydrocarbons, e.g., benzene and mixtures thereof. The reaction temperatures range from about −10° to 200° C. If it is intended to obtain the free carboxylic acids of Formula I ($R_1 =$ COOH), the reaction mixture is preferably heated for several hours to a temperature of about 60° to 100° C., optionally under an inert gas, e.g., nitrogen.

It is furthermore possible to produce compounds of Formula I by the decarbonylation of correspondingly substituted 2-oxocarboxylic acids of the formula Z—$CHR_2$—CO—COOH, which can be obtained by treating glycidic esters of the formula

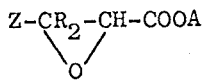

with Lewis acids, e.g., $BF_3$, followed by saponification. Thus, it is possible, for example to decarbonylate such a 2-oxo acid to an acid of the Formula I ($R_1 =$ COOH, by heating in concentrated sulfuric acid.

The 2-oxocarboxylic acids split off $CO_2$ at temperatures of from 100° to 300° C., with the formation of an aldehyde. The decarboxylation is enhanced by the addition of an amine. Colloidal platinum, osmium and ruthenium likewise catalyzes the dissociation. Thus, the decarboxylation can be conducted in the presence of a primary, secondary, or tertiary base, normally at the boiling point thereof. When a primary amine, e.g., aniline, is employed, a Schiff base of the aldehyde is produced with splitting off of $H_2O$ and $CO_2$. When the reaction mixture is worked up in an acidic fashion, the aldehyde is then liberated. In another embodiment, the bisulfite compounds of the 2-oxocarboxylic acids Z—$CHR_2$—CO—COOH can be decarboxylated at temperatures of about 100° to 300° C., thus obtaining a bisulfite of the corresponding aldehyde.

e. Compounds of Formula I are also produced by the carbonylation of compounds of the Formula IIe or the des-$HX_1$ derivatives thereof, optionally in the presence of a reducing agent and/or a catalyst.

Suitable starting compounds for the carbonylation are, for example, compounds of the formulae Z—$CHR_2$—Cl, Z—$CHR_2$—Br, Z—$CHR_2$—I, Z—$CHR_2$—OH, as well as Z—$CR_2$=$CH_2$, e.g., 1-(2-dibenzofuryl)-ethyl chloride, bromide or iodide; 1-(2-dibenzofuryl)ethanol; 2-vinyldibenzofuran; 1-(2-dibenzothienyl)-ethyl chloride, bromide or iodide; 1-(2-dibenzothienyl)-ethanol; and 2-vinyldibenzothiophene.

The carbonylation can be effected, as described in the literature, by treatment with gaseous CO, preferably under a pressure of up to 700 atmospheres and at a temperature of up to 300+ C., with the addition of a heavy metal catalyst. It is also possible to contact the starting compound of Formula IIe to CO in the form of a heavy metal carbonyl. The CO required for the carbonylation can also be produced directly in situ from a mixture of formic acid and a mineral acid, preferably concentrated sulfuric acid. When operating in the presence of a reducing agent, e.g., gaseous hydrogen, aldehydes of Formula I ($R_1 =$ CHO) are obtained.

Several typical variants of the carbonylation process are the following:

Compounds of the formulae Z—$CHR_2$—Hal, $ZCHR_2$—OH or Z—CH=$R_{15}$ can be reacted with a heavy metal carbonyl, e.g., nickel carbonyl. One embodiment advantageously uses the halogen derivatives z—$CHR_2$—Hal as the starting compounds, wherein an alkali metal tert.-alcoholate is added as the catalyst and a lower tert.-alkanol is used as the solvent. At least one and preferably 3–20 molar equivalents of the heavy metal carbonyl are employed. Preferred solvents in this reaction are, for example, tert.-butanol, tert.-pentanol, 2-methyl-2pentanol and 3-methyl-3-pentanol. Especially suitable alkali metal alcoholates are the sodium, potassium and lithium derivatives of the aforementioned tert.-alkanols, e.g., sodium, potassium and lithium tert.-butylate. The reaction mixture should contain at least one and preferably 2–5 molar equivaients of the alkali metal alcoholate. Reaction temperatures can range from about 0° to about 120° C., preferably between 30° and 100° C. Reaction times of one hour up to about 4 days are required for the reaction. Under these conditions, the tert.-alkyl esters of the corresponding carboxylic acids of Formula I ($R_1 =$ COOH) are obtained, which need not be isolated, but instead can be saponified in situ to the free acids.

In another embodiment, a compound of the Formula IIe, preferably Z—CH=$R_{15}$ or Z—$CHR_2$OH, is reacted with the heavy metal carbonyl, preferably nickel carbonyl, suitably in an inert solvent, such as THF, dioxane, acetone, in the presence of water. An inorganic acid, e.g., HCl, $H_2SO_4$, HBr, HI, $H_3PO_4$, can be present in the reaction mixture. The reaction temperatures range, for example, from about 20° to about 100° C. The reaction can be accelerated by irradiation, for example, with a mercury-vapor lamp. Depending on the conditions, the reaction usually requires about 2 hours to 2 days to go to completion.

When using formic acid-/sulfuric acid as the cabonylation reagent, suitable starting compounds are the 2-vinyldibenzofurans or -dibenzothiophenes and the carbinols of the formula Z—$CHR_2$—OH. The starting compounds are reacted, for example, at temperatures of about 0°–40° C., with a mixture of formic acid and a concentrated sulfuric acid, which can contain 0–50% acetic acid or trifluoroacetic acid. Ordinarily, reaction times of about one minute to 4 hours are required. The reaction mixture should contain at least 2 and preferably 5–20 molar equivalents of formic acid.

Carbonylation with gaseous CO is advantageously conducted under a pressure of 100–700 atmospheres in an inert solvent, suitably a lower alcohol, e.g., methanol, ethanol, propanol, isopropanol, n-butanol, n-pentanol, n-hexanol or a cycloalkanol, e.g., cyclohexanol. Examples of suitable catalysts are nickel or cobalt carbonyls or halogenides, palladium dichloride, rhodium trichloride (preferably in the form of the trihydrate), or a compound of the formula [($R_{19}$)$_3$P]$_2$PdCl$_2$, wherein $R_{19}$ is an alkyl, cycloalkyl, aryl or aralkyl group, preferably of up to 10 carbon atoms, e.g., (bis (triphenylphosphine) palladium dichloride. During this reaction, up to 10% by weight of an organic or inorganic, preferably strong, acid can be present, e.g., HCl, HBr, $H_2SO_4$, p-toluenesulfonic acid and methanesulfonic acid.

It is also possible to react compounds of Formula IIe, especially unsaturated compounds of the type Z—CH=$R_{15}$, and halogenides of the formula Z—$CHR_2$—Hal, with a mixture of CO and $H_2$, in the presence of a heavy metal catalyst, especially a cobalt catalyst, e.g., cobalt (II) acetate, pulverized cobalt, or preferably dicobalt octacarbonyl, to obtain aldehydes of Formula I ($R_1 =$ CHO). In this reaction, pressures of about 10 to about 250 atmospheres and temperatures of about 0° to 200° C., and optionally an inert solvent, for example, an ether, e.g., diethyl ether, THF, 1,2-dimethoxyethane and/or a ketone, e.g., acetone, are employed.

f. Haloketones of the formula Z—CO—CHR$_2$Hal, obtainable by the halogenation of ketones of the formula Z—CO—CH$_2$R$_2$ or from diazoketones of the formula Z—CO—CR$_2$N$_2$ by reaction with hydrogen halide in ether or by a Friedel-Crafts acylation of dibenzofurans or dibezothiophenes of the formula Z—H, respectively, with haloacyl halides CHR$_2$Hal—COHal, e.g., 2-chloropropionyl chloride, can be rearranged into acids of the formula Z—CHR$_2$—COOH in accordance with the Faworskii method described in the literature, for example, in boiling toluene or xylene in the presence of a strong base, e.g., NaOH, or by heating in an aqueous-ethanolic silver nitrate solution.

g. Amides of Formula I (R$_1$ = CONHR$_5$) can be obtained by subjecting a carbonyl compound of Formula IIg (X$_5$ = COR$_5$) to a Schmidt degradation according to methods disclosed in the literature with HN$_3$, preferably in an inert solvent, e.g., benzene or chloroform, and in the presence of an acidic catalyst, e.g., concentrated sulfuric acid, at a temperature of about −40° to +100° C.

Amides of Formula I can also be produced by subjecting an oxime of the Formula IIg (X$_5$ = C(=NOH)—R$_5$) to a Beckmann rearrangement, as described in detail in the literature, with an acidic agent, e.g., concentrated sulfuric acid, polyphosphoric acid, phosphorus pentachloride, or benzenesulfochloride, preferably at a temperature of from 80° to 180° C.

h. The conversion of epoxides of Formula IIh, especially those of formulae IIha — IIhd:

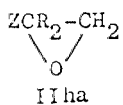 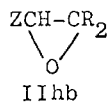 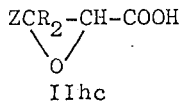 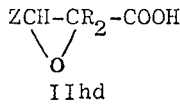

IIha     IIhb     IIhc     IIhd into compounds of Formula I (R$_1$ = CHO) can be accomplished basically according to the rearrangement reactions described in the literature under catalytic or thermal conditions, thus splitting off CO$_2$ from the carboxylic acids IIhc or IIhd, respectively. For catalytically controlled rearrangements, the epoxide is caused to react with the catalyst in a suitable solvent. Suitable solvents for the rearrangement reactions are inert solvents, e.g., benzene, toluene, xylene, CCl$_4$, acetonitrile, ether, THF, dioxane, alcohols, e.g., ethanol, propanol, butanol or acids, e.g., formic acid, acetic acid, both as anhydrous solvents and in mixture with water. The rearrangement can also be effected on the interphase of two solvents immiscible with each other, wherein one phase contains the catalyst and the other the compound to be rearranged. Preferred catalysts are mineral acids, e.g., H$_2$SO$_4$, HCl, HBr, HF, HClO$_4$; organic acids, e.g., formic acid, acetic acid, oxalic acid, p-toluenesulfonic acid; Lewis acids, e.g., BF$_3$, AlCl$_3$, ZnCl$_2$, MgBr$_2$, FeCl$_3$ and SnCl$_2$. The rearrangement can be accomplished, for example, by heating a solution of the epoxide in THF with 25% strength sulfuric acid or with BF$_3$, p-toluenesulfonic acid, or ZnCl$_2$ as the catalyst in anhydrous benzene. The rearrangement can also be conducted with the aid of agents which split off water, e.g., polyphosphoric acid, which can simultaneously serve as the reaction solvent.

The epoxides can also be thermally rearranged, for example, by distillation or by heating in a sealed apparatus. In this connection, the glass surface of the apparatus can function as the catalyst. The rearrangement can also be accelerated by adding small amounts of a catalyst, e.g., ZnCl$_2$. For the rearrangement of the epoxides, it is also possible to employ solid catalysts, e.g., copper, copper bromide, magnesium silicates, aluminum oxides and chromium oxide - tungsten oxide contact catalysts. In these reactions, temperatures of from 100° to 300° C. and pressures between reduced pressure and 200 atmospheres are employed. The carboxylic acids IIhc and IIhd, respectively, are suitably split thermally under reduced pressure with the addition of copper or copper bromide as catalyst. The rearrangement can be conducted in the gaseous or liquid phase, depending on the stability of the epoxide and the type of catalyst. A brief heating of the epoxides with concentrated NaHSO$_3$ solution yields directly the corresponding sodium bisulfite addition compounds of Formula I (R$_1$ = CHOH—SO$_3$Na).

The epoxides of Formula IIha or IIhb can be obtained for example, by reacting ketones of the formula Z—CO—R$_2$ with alkyl-magnesium halides, hydrolysis to the carbinols, dehydration to ethylene derivatives of the formula Z—CR$_7$=CHR$_8$, and epoxidation with per-acids, e.g., perbenzoic acids. The epoxides can also be produced from the chlorohydrins of the formula Z—CR$_7$(OH)—CHR$_8$—Cl by treatment with a base, thus splitting off HCl. These chlorohydrins can be obtained, in turn, from chloroketones of the formula Z—CO—CH$_2$—Cl by reaction with methyl- or ethylmagnesium iodide, or by reduction. It is also possible to react chloromethyl ketones of the formula R$_2$—COCH$_2$Cl with organometallic compounds Z—M, with the epoxide not normally being isolated. Thus, 2-(2-dibenzofuryl)-butanal is produced from 2-dibenzofurylmagnesium bromide by reaction with chloromethyl ethyl ketone. In other cases, the isolation of the epoxides IIh often is unnecessary. Thus, for example, the corresponding epoxide can be prepared from 2-chloro-2-(2-dibenzofuryl)-propanol by treatment with a base, and this epoxide is rearranged in situ without isolation into 2-(2-dibenzofuryl)-propanal by treatment with an acid.

The epoxy acids IIhc and IIhd are advantageously obtained by condensation of ketones of the formula Z—CO—R$_2$ with ethyl chloroformate and subsequent alkaline saponification. It is advantageous not to isolate these epoxy acids but instead the alkaline saponification mixture is acidified and heated until termination of the decarboxylation, thus obtaining the desired aldehydes (I, R$_1$ = CHO). The epoxy acids, and/or the esters thereof, can also be prepared by expoxidation of the acrylic acids Z—CR$_2$=CH-COOH and/or the esters thereof.

i. Aldehydes of Formula I (R$_1$ = CHO) can be produced by splitting off HX$_1$ from compounds of the Formula IIi, especially by dehydrating glycols of the formula Z—CR$_7$(OH)—CHR$_8$—OH, preferably Z—CR$_2$(OH)—CH$_2$OH, but also Z—CHOH-CHR$_2$—OH, which process takes place by a rearrangement which is catalyzed by acids, metal halides, Lewis acids or solid catalysts. Advantageous acids are HCl, HBr, H$_2$SO$_4$, H$_3$PO$_4$, H$_2$SO$_3$, HClO$_4$, HCOOH, CH$_3$COOH, oxalic acid and p-toluenesulfonic acid. Suitable Lewis acids are, for example, $ZnCl_2$, $BCl_3$, $BF_3$, $AlCl_3$ and $SnCl_2$ and solid catalysts are, for example, activated alumina, lithium phosphates, chromium oxide catalysts and chromium oxide-tungsten oxide contact catalysts. In place of acids, acidic ion exchange resins can likewise be utilized, wherein the rearrangement reaction can be accomplished on the surface thereof. The removal of water from the molecule can be effected with or without an inert solvent. It is also feasible to employ an excess of the acid as the solvent, e.g., formic acid, acetic acid, trifluoroacetic acid, sulfuric acid, or polyphosphoric acid. Additional suitable solvents are, e.g., hydrocarbons, e.g., toluene, benzene, xylene, tetrahydronaphthalene, decahydronaphthalene; halogenated hydrocarbons, e.g., chlorobenzene; ethers, e.g., anisole, THF, dioxane, diethyl ether, diisopropyl ether, 1,2-dimethoxyethane, diethylene glycol dimethyl ether; alcohols, e.g., ethanol, propanol, butanol; also DMF, dimethylsulfone, DMSO, hexamethylphosphoric triamide; N-ethylmorpholine, water and mixtures thereof. The reaction can be accomplished in anhydrous solvents or in the presence of water. In some cases, the addition of water is advantageous in order to dissolve the catalyst. When anhydrous conditions are employed, the water produced during the reaction can be bound by suitable additives, e.g., molecular sieves (such as surface-active aluminum silicates), or it can be removed, for example, by a water trap when using toluene as the solvent. Preferably, the reaction is carried out in a temperature range of from $-10°$ to $200°$ C., especially advantageously at the boiling point of the selected solvent. In addition to the desired aldehyde, the rearrangement can also yield the corresponding isomeric ketone as a by-product. No difficulties are encountered in the separation of the aldehyde, which can be effected, for example, via the bisulfite compound.

In addition to the glycols of Formula IIi ($X_1 = OH$, $R_9 = H$), the monoesters or monoethers of the Formula IIi ($X_1 = OH$, $R_9 = Ac$ and $A$, respectively) thereof can likewise be converted into the corresponding aldehydes (I, $R_1 = CHO$) by an acid-catalyzed rearrangement. The monoethers can readily be obtained from the ketones of the formula $Z—CO—R_2$ by Grignard synthesis with chloromethyl alkyl ethers of the formula $ClCH_2—O—A$. Thus, for example, 2-(2-dibenzofuryl)-propanal is produced from 2-methoxy-1-methyl-1-(2-dibenzofuryl)-ethanol by refluxing with formic acid or anhydrous oxalic acid. The conversion of the esters or ethers IIi ($X_1 = OH$, $R_9 = Ac$ and $A$, respectively) into the aldehydes I ($R_1 = CHO$) can basically be conducted in accordance with the methods described for the diols IIi ($X_1 = OH$, $R_9 = H$).

Enol ethers of the formula $Z—CR_2=CHOA$ can be produced by splitting off water from the compounds of the formula $Z—CR_2(OH)—CH_2OA$. The dehydration is accomplished, for example, with $P_2O_5$ in pyridine, with polyphosphoric acid, molecular sieves, dehydrating oxides, or by azeotropic dehydration.

Also, compounds of the general Formula IIi ($X_1 = $ Hal) can be converted into compounds of the general Formula I by dehydrohalogenation. Suitable reagents splitting off hydrogen halide or organic or inorganic bases, which are generally employed for this purpose, e.g., triethylamine, tributylamine, pyridine, lutidine, quinoline, N-methylpiperidine, tert.-butylamine, collidine, 1,5-diazabicyclo[3,4,0]nonene-(5), dimethylaniline, tetraethylammonium chloride, 1,4-diazabicyclo[2,2,2]octane, DMF, potassium tert.-butylate in DMSO, $NaHCO_3$, $Li_2CO_3$, LiBr, LiCl, $MgBr_2$, NaI, KOH, NaOH, $NaNH_2$, $Ag_2O$, $CH_3COONa$, $C_2H_5Na$ and $Al_2O_3$. A suitable solvent is either an excess of the selected base, if liquid, or a solvent described in the literature for dehydrohalogenation reactions, e.g., DMSO; acetone; ether, e.g., diethyl ether, THF, dioxane; acetonitrile; alcohols, e.g., methanol, ethanol or tert.-butanol; water; or mixtures of the above-mentioned solvents. Thus, for example, 2-(2-dibenzofuryl)-propanal is obtained from 2-(2-dibenzofuryl)-2-chloro-1-propanol by treatment with pyridine or 1,5-diazabicyclo[3,4,0]nonene-(5) under heating, or from 2-(2-dibenzofuryl)-2-bromo-1-propanol by treatment with dimethylaniline. As by-products, the corresponding epoxides are partially obtained, which can be converted into the aldehydes by treatment with an acid, as described above.

j. Compounds of Formula I can also be obtained by reacting ketones of Formula IIj with triphenylphosphine alkoxymethylenes of the formula $Ar_3P=CH-OA$, which can be produced, normally in situ, from a triphenylphosphine and alkyl- or aryl-halogen methyl ethers by the addition of a base thereto. In this reaction, the product is not isolated. Instead, the reaction mixture is directly reacted with the ketones IIj. Inert anhydrous solvents are suitably employed, e.g., ether, THF, dioxane, benzene. Strong bases, such as organometals and alkali metal alkoxides, e.g., $C_6H_5Li$, $n-C_4H_9Li$, K-tert.-butylate, $NaOC_2H_5$, are advantageously used for liberating the triphenylphosphine alkoxy- or aryloxymethylenes. The reaction is conducted at temperatures of between about $-60°$ and $100°$ C. Thus, for example, 1-methoxy-2-(2-dibenzofuryl)-propene is produced from 2-acetyl-dibenzofuran by reaction with triphenylphosphine methoxymethylene.

k. Compounds of Formula I ($R_1 = $ optionally functionally modified $CH_2OH$-group) can also be obtained by subjecting a halogen compound of the formula $Z—CHR_2—CH_2Hal$ (IIk, $X_6 = $ Hal) to hydrolysis, alcoholysis or acidolysis, or by reaction with a metallic salt and/or metallic alcoholate of the formula $R_9OM_1$.

Thus, for example, alcohols of Formula I ($R_1 = CH_2OH$) are produced by saponifying a halogen compound of the formula $Z—CHR_2—CH_2Hal$ in an aqueous or aqueous-alcoholic solution or suspension, optionally with the addition of a solubilizer, e.g., an alcohol, glycol or polyglycol ether. Preferred saponifying agents are alkalis, e.g., NaOH and KOH, but slurries of $Ca(OH)_2$, $Pb(OH)_2$ and AgOH can also be employed. The saponification is normally effected at an elevated temperature, e.g., at the boiling temperature of the solvent. The halogenide IIk can, however, also be reacted in a non-aqueous medium, by agitating the solution thereof in an inert solvent, e.g., acetone, ether, THF, acetonitrile, or benzene, with suspended AgOH or $Pb(OH)_2$ under boiling.

Ethers of Formula I ($R_1 = $ etherified $CH_2OH$-group) are obtained by reacting a compound of the formula $Z—CHR_2—CH_2Hal$ with an alkali metal alcoholate or phenolate. Advantageously, the sodium alcoholate is produced by dissolving the required amount of sodium in the respective alcohol, using an excess thereof as the solvent. When using the less reactive chlorides or bromides of Formula IIk ($X_6 = Cl$ or Br), a small amount of KI can be added thereto. The reaction mixture is then suitable refluxed until it has become neutral. Aryl ethers are obtained, for example, by mixing an alcoholic alkali metal alcoholate solution with an equivalent of the respective phenol, and further processing the mixture as described for the alkyl ethers. In the production of the aryl ethers, water or aqueous alcohols are additionally suitable as the solvents. The alkali metal alcoholates or phenolates can also be reacted in a suspension with halogen compounds of the formula Z—$CHR_2$—$CH_2$—Hal, in which case an inert solvent is employed, e.g., ether, THF, acetone or benzene.

Esters of Formula I ($R_1$ = esterified $CH_2OH$-group) are obtained in an analogous manner by refluxing a compound of Formula IIk in an aqueous, aqueous-alcoholic, or alcoholic solution with an alkali metal salt of the carboxylic acid or sulfonic acid to be esterified. The addition of triethylamine accelerates the reaction. A preferred method for obtaining acetates of the formula Z—$CHR_2$—$CH_2OCOCH_3$ resides in refluxing a halogenide of the formula Z—$CHR_2$—$CH_2$Hal with anhydrous sodium acetate in acetic acid. For the preparation of esters of Formula I ($R_1$ = esterified $CH_2OH$-group), it is also possible to reflux a halogen compound of the formula Z—$CHR_2$—$CH_2$Hal in an inert solvent, e.g., ether, acetone, chloroform, THF or benzene, with a suspension of the silver salt or lead salt of the acid to be esterified. Diazonium compounds of Formula IIk ($X_6$ = a diazonium group) are produced when treating amines of the formula Z—$CHR_2$—$CH_2NH_2$ with nitrous acid or the derivatives thereof, such as, for example, alkyl nitrites and NOCl. They are split in the presence of water in accordance with methods known in the literature, to alcohols of the Formula I ($R_1 = CH_2OH$). In this case, the reaction is conducted especially advantageously by combining an aqueous solution of $NaNO_2$ with a mineral acid or acetic acid solution of the amine at a temperature of 0°–100° C., and terminating the reaction by heating. The amines are reacted with alkyl nitrites preferably in an inert solvent, e.g., ether, benzene, THF, an absolute alcohol, e.g., methanol or ethanol, or in a water-alcohol mixtures. When using alcohols, ethers, of the Formula I ($R_1$ = etherified OH-group) can also be produced. When conducting the reaction in the presence of an acid, e.g., acetic acid, the reaction product is also an ester of Formula I ($R_1$ = esterified OH-group).

1. In accordance with the methods of the Willgerodt reaction described in the literature, ketones of Formula III can be converted into amides of the formula Z—$CH_2$—$CONH_2$ with ammonium polysulfides, which can also be formed in situ in an aqueous solution from ammonia and hydrogen sulfide and/or sulfur. During the reaction of the ketones III with a primary or secondary amine (preferably morpholine) in the presence of sulfur, the corresponding substituted thioamides (preferably thiomorpholides) are produced. Suitably, an excess, e.g., up to 1 mole, of sulfur and amines is utilized. In these reactions, an inert solvent can be added, e.g., dioxane or THF. The preferred reaction temperatures range from 100° to 200° C., especially from 120° to 160° C. When using volatile solvents, the reaction is advantageously carried out under pressure.

The compounds of Formula I can also be obtained by splitting $E_1$-$E_2$ from a compound (III) wherein one of the two E groups is a phenolic hydroxy or a mercapto group or a metallic salt derived therefrom (A phenolate or thiophenolate), preferably in the form of a sodium salt. The other of the two E groups can be identical to the first or can be, e.g., a halogen atom, preferably Cl or Br, an amino group or a functionalized, e.g., etherified or esterified, OH— or SH—group. The $E_1$-$E_2$ compound to be split off accordingly depends on the nature of the E group and can be, for example, water, ammonia, hydrogen halide, e.g., HCl or HBr or hydrogen sulfide. The various reagents employed as the media for splitting off $E_1$-$E_2$ will depend on the nature of the starting compound, as will be apparent to those skilled in the art. For example, if water is to be split off, duitable dehydration agents are, e.g., $ZnCl_2$, $P_2O_5$ and polyphosphoric acid.

Hydrogen halide is suitably split off employing a base, e.g., NaOH, KOH, or $Ca(OH)_2$, optionally in the presence of a catalyst, e.g., a heavy metal, e.g., copper, preferably in pulverized form. The splitting-off step can be accomplished in the presence of an additional inert, preferably high-boiling solvent, e.g., in the presence of xylene or "Tetralin" (tetrahydronaphthalene). However, the reaction is preferably conducted in the absence of a solvent. The reaction temperatures range from about 0° to about 250° C. preferably from 80° to 220° C.

It is also possible to proceed in such a manner that the starting material (III) is not isolated but rather is formed in situ in the reaction mixture. Thus, a compound can be the starting substance, for example, which otherwise corresponds to Formula III, but wherein both groups E represent amino groups which are thereafter diazotized and decomposed by boiling. As the intermediate product, which is not isolated, a diphenyl is produced (III, both groups E = OH), which is dehydrated by heating in an acidic solution. It is also possible, for example, to heat pyrocatechol together with a p-hydroxyphenyl-fatty acid or a p-mercaptophenyl-fatty acid, wherein, as the intermediate product, the aforementioned diphenol or the corresponding 2-hydroxy-2'-mercaptodiphenyl derivative, or a compound V (one of the groups G = OH; see below) is most likely formed.

The dibenzothiophenes (I, Y = S) are also obtained by treating corresponding diphenyl derivatives (IV) with sulfur in the presence of a catalyst. Especially suitable catalysts are Lewis acid, e.g., $AlCl_3$. The reaction takes place suitably at higher temperatures, especially from 100° to 250° C.

Compounds of Formula I are also obtained by heating a hydroxy or diazonium compound (V), thus closing the five-membered ring with liberation of nitrogen. Advantageously, the acidic, e.g., hydrochloric or sulfuric, solution in which the diazonium salt is produced is heated to a temperature of from 80° to 150° C. A hydroxy compound (V, wherein one group G = OH) can also be produced as an intermediate product in the reaction of 4-$R_3$-pyrocatechol with a p-HY-phenyl-fatty acid, e.g., in the reaction of pyrocatechol with 2-(p-hydroxyphenyl)-propionic acid.

Optionally, one or both of the $R_1$ and $R_3$ groups in a thus-obtained product of Formula I, can be converted into other $R_1$ and $R_3$ groups.

For example, an $R_1$ group can be converted into another $R_1$ group by treating the product with a solvolyzing, thermolyzing, esterifying, interesterifying, amidating, dehydrating, acetalizing, acylating, etherifying, reducing, oxidizing, or salt-forming agent.

Functional derivatives of the carboxylic acids of the Formula I ($R_1 =$ COOH) and functional derivatives of the alcohols of the Formula I ($R_1 =$ CH$_2$OH), especially the esters of these compounds ($R_1 =$ esterified COOH— or CH$_2$OH—group, especially $R_1 =$ COOA or CH$_2$OAc), can be solvolyzed, particularly hydrolyzed or thermolyzed, to the free carboxylic acids or the free alcohols, respectively, according to methods described in the literature. Hydrolysis can be conducted in an acidic or alkaline medium at temperatures of about $-20°$ to about 200° C., preferably about room temperature to the boiling temperature of the selected solvent. Examples of suitable acidic catalysts are hydrochloric, sulfuric, phosphoric or hydrobromic acid. Suitable basic catalysts are, for example, sodium, potassium and calcium hydroxide and sodium and potassium carbonate. Water is preferably the solvent. Other advantageous solvents are lower alcohols; ethers, e.g., THF, dioxane; amides, e.g., DMF; sulfones, e.g., tetramethylenesulfone; and mixtures thereof, especially mixtures containing water. For saponification purposes, the esters are treated preferably for about 1–48 hours with $K_2CO_3$ in methanol, ethanol or isopropanol at temperatures of about 20° to 80° C. If the saponification is effected in an acidic medium, acetic acid can also be used as the solvent. The acid or alcohol derivatives can also be converted into carboxylic acids or alcohols of Formula I ($R_1 =$ COOH or CH$_2$OH), for example, in ether or benzene with the addition of a strong base, e.g., potassium carbonate, or in the absence of solvent by melting together with an alkali, e.g., KOH and/or NaOH or alkaline earths, or by heating with water under pressure to temperatures of 150°–200° C.

A further embodiment of this invention resides in the saponification of amides of Formula I ($R_1 =$ CONH$_2$, CONHA or CON(A)$_2$) and thioamides of Formula I ($R_1 =$ CSN(A)$_2$). The thioamides or amides are preferably hydrolyzed by heating with an aqueous mineral acid, e.g., hydrochloric acid or with an alcoholic alkali. A partial hydrolysis of the thioamides, for example by heating with a mixture of a lower alcohol and water, results in the production of the corresponding amide. For the synthesis of 2-dibenzofurylacetic acids, it is preferred to hydrolyze the thiomorpholines, which can be obtained by the Willgerodt-Kindler method.

By dry heating of especially tertiary alkyl esters of Formula I ($R_1 =$ COO-tert.-alkyl) to temperatures of between about 50° and 350° C., acids of Formula I ($R_1 =$ COOH) are produced. The thermolysis can also be conducted in an inert solvent, e.g., benzene, water, DMF, ethylene glycol, glycerin, DMSO, cyclohexanol, preferably with the addition of a catalytic amount of an acid, e.g., p-toluenesulfonic acid.

Another embodiment of the invention is the hydrolysis of nitriles of Formula I ($R_1 =$ CN), which can be effected in an acidic medium, e.g., HCl or H$_2$SO$_4$ in water, a lower alcohol, aqueous dioxane or acetic acid, or in an alkaline medium, e.g., KOH in an aqueous lower alcohol or in cyclohexanol. Partial hydrolysis of the nitriles, for example treating same with concentrated sulfuric acid at room temperature or with H$_2$O$_2$ in an alkaline solution, results in the production of an amide of Formula I ($R_1 =$ CONH$_2$).

In a compound of Formula I wherein $R_1$ is a functionally modified aldehyde group, the aldehyde group can be liberated by treatment with a solvolyzing agent.

Thus, the free aldehydes can be obtained from hemiacetals or acetals by means of hydrolysis. The hemiacetals, e.g., those of the formula Z—CHR$_2$—CHOH-OA, and acetals, e.g., those of the formula Z—CHR$_2$—CH(OA)$_2$, are normally hydrolyzed very easily with water in the presence of an acid. For the cleavage step, dilute or concentrated mineral acid generally is used, e.g., sulfuric acid, hydrochloric acid, phosphoric acid, or an organic acid, e.g., oxalic acid, tartaric acid, citric acid. The cleavage can be accomplished at temperatures of about $-20°$ to $+100°$ C., preferably $+20°$ to $+80°$ C., in the absence or presence of an additional solvent. Thus, the acetals can be dissolved by adding acetone, ethanol, THF or acetic acid, before they are split. The acetals can also be reacted with acids in the presence of anhydrides. Suitable acid anhydrides, which are employed preferably in an equivalent molar ratio, are, for example, acetic anhydride, benzoic acid anhydride, and phthalic acid anhydride. It is also possible to utilize acetyl bromide. The hydrolysis of the acetals with an aqueous NaHSO$_3$ solution results, by way of the aldehydes, in the bisulfite addition compounds thereof, Z—CHR$_2$—CHOH—SO$_3$Na.

Aldehydes of Formula I ($R_1 =$ CHO) can also be produced by splitting a hemi-thioacetal thereof, e.g., those of the formula Z—CHR$_2$—CHOA—SA, or thioacetal thereof, i.e., mercaptals, e.g., those of the formula Z—CHR$_2$—CH(SA)$_2$. The hemi-thioacetals are cleaved, for example, with Raney nickel, and the mercaptals are split with HgCl$_2$ in acetone, THF or dioxane. It is also possible to employ mixtures of HgCl$_2$ and CdCO$_3$ or HgCl$_2$ and HgO for splitting purposes.

Schiff bases, e.g., those of the formula Z—CHR$_2$—CH=NAr can be split by brief heating with dilute acids, e.g., the above-mentioned mineral acids or oxalic acid, optionally with the addition of a solvent, e.g., ethanol or acetic acid. The Schiff bases can also be split with NaHSO$_3$ and the thus-formed amine (ArNH$_2$) removed by distillation or extraction and the aldehyde isolated as the bisulfite addition compound or liberated from the latter as described below. The aldehydes can also be liberated by hydrolysis, e.g., by treatment with an acid, of the condensation products thereof with compounds of the acid amide type, e.g., carboxylic acid amides, sulfonic acid amides, urethanes, urea derivatives.

Aldehydes of Formula I ($R_1 =$ CHO) can also be obtained by the hydrolysis of hydrazones of the formula Z—CHR$_2$—CH=N-NHR' or azines of the formula (Z—CHR$_2$—CH=N)$_2$. In general, the splitting of these derivatives is preferably accomplished by acid hydrolysis. For decomposition purposes, a dilute solution of oxalic acid or phthalic acid can be employed. It is also possible to employ sulfurous acid with heating for splitting the oximes. Also suitable for the splitting reaction are aqueous mineral acids. In this procedure, the compounds to be cleaved are dissolved by the addition of ethanol, THF, acetic acid, or dioxane. Hydrazones can also be split by treating them with other carbonyl compounds, e.g., p-nitrobenzaldehyde, 2,4-dinitrobenzaldehyde, or pyruvic acid. In the thus-produced equilibrium mixture, the aldehyde is liberated, while the corresponding derivative of the added carbonyl compound is formed, which is normally of lower solubility. The process is suitably conducted so that the hydrazone and the carbonyl compound are heated under reflux in an aqueous suspension or in an alcoholic-aqueous solution. If the aldehydes are present in the form of their Girard derivatives T or P, they can be liberated by cleavage with hydrochloric acid or sulfuric acid at temperatures of 0° C. to the boiling temperature of the solvent employed, e.g., water, optionally in mixture with methanol or ethanol. The thus-formed aldehyde is extracted from the aqueous phase with a suitable organic solvent, e.g., $CHCl_3$.

Oximes of the formula $Z—CHR_2—CH=NOH$ can also be split by oxidation, which is done by treatment with nitrous acid and/or amyl nitrite or $FeCl_3$ in the presence of an acid.

Bisulfite addition compounds of the formula $Z—CHR_2—CHOH—SO_3M_1$ can be split by treatment with a base or acid, thus liberating the corresponding aldehyde. The cleavage reaction can take place merely by heating an aqueous solution thereof. More advantageously, the reaction mixture is heated in the presence of dilute aqueous acid, e.g, HCl or $H_2SO_4$, of a bicarbonate, e.g., $NaHCO_3$, of a carbonate, e.g., $Na_2CO_3$, or of an alkali, e.g., NaOH. The splitting step can also be achieved by adding another carbonyl compound having a greater affinity to bisulfite, e.g., formaldehyde.

Aldehydes of Formula I ($R_1 = CHO$) can also be obtained by splitting enol ethers of the formula $Z—CR_2=CHOA$ or $Z—CR_2=CHOAr$. These enol ethers can be cleaved, for example, with diulte mineral acids, e.g., HCl or $H_2SO_4$.

The splitting step can also be effected with acetic acid or $NaHCO_3$. In the case of sensitive enol ethers, heating in water to 100° C. under evaporated pressure is sufficient. The cleavage can also be accomplished with hydroxylamine hydrochloride or semi-carbazide hydrochloride, in which case the aldehydes are isolated in the form of the oximes or semi-carbazones.

Ethers of Formula I ($R_1 = CH_2OA$ or $CH_2OAr$) can be converted into alcohols of Formula I ($R_1 = CH_2OH$) in accordance with the ether splitting methods known in the literature. For example, the ethers can be split by treatment with hydrogen bromide or hydrogen iodide in an aqueous or acetic solution, by heating with a Lewis acid, e.g., $AlCl_3$ or boron trihalide, or by melting with a pyridine hydrohalide or aniline hydrohalide at about 200° C.

From other compounds of Formula I, esters of Formula I ($R_1 = $ esterified COOH— or $CH_2OH$—group) can be prepared according to methods disclosed in the literature. Thus, it is possible, for example, to react an acid of Formula I ($R_1 = COOH$) with the respective alcohol, or an alcohol of Formula I ($R_1 = CH_2OH$) with the respective acid, especially a carboxylic acid, in the presence of an inorganic or organic acid, e.g., HCl, HBr, HI, $H_2SO_4$, $H_3PO_4$, trifluoroacetic acid, a sulfonic acid, e.g., benzenesulfonic acid or p-toluenesulfonic acid, or an acidic ion exchanger, optionally in the presence of an inert solvent, e.g., benzene, toluene or xylene, at temperatures of about 0° C. to preferably the boiling temperature of the reaction mixture. Either the alcohol or the carboxylic acid is preferably employed in excess. Preferred alcohols are those of the formulae $R_5OH$ and $R_6OH$ wherein $R_5$ and $R_6$ have the values given above except H. It is also possible to conduct the reaction in the presence of a water-binding agent, e.g., an anhydrous heavy metal sulfate or molecular sieve. It is also possible to remove the water of reaction azeotropically, wherein advantageously a hydrocarbon, e.g., benzene or toluene, or chlorinate hydrocarbon, e.g., chloroform or 1,2-dichloroethane, is added thereto. The esterification takes place under gentle conditions if the water of reaction is bound chemically by the addition of a carbodiimide, e.g., N,N'-dicyclohexylcarbodiimide. In this reaction, an inert solvent is used, e.g., ether, dioxane, 1,2-dimethoxyethane, benzene, $CH_2Cl_2$ or $CHCl_3$. A base, e.g., pyridine, can also be added. The methyl, ethyl or benzyl esters can also be produced by reacting the free acids with diazomethane, diazoethane or phenyldiazomethane, respectively, in an inert solvent, e.g., ether, benzene or methanol. Esters of Formula I ($R_1 = $ esterified COOH—group) can also be obtained by the chemical addition of the carboxylic acids (I, $R_1 = $ COOH) to an olefin, e.g., isobutylene, cyclohexene, or to an acetylene, preferably in the presence of a catalyst, e.g., $ZnCl_2$, $BF_3$, $H_2SO_4$, arylsulfonic acids, pyrophosphoric acid, boric acid, oxalic acid, at temperatures of about 0° to about 200° C., pressures of 1 to 300 atmospheres, and in an inert solvent, e.g., ether, THF, dioxane, benzene, toluene and xylene.

Esters of Formula I ($R_1 = $ esterified COOH-group) can also be produced by reacting metallic salts of the carboxylic acids of Formula I ($R_1 = $ COOH), preferably the alkali metal, lead or silver salts, with an alkyl halogenide, e.g., those of the formula $R_5Cl$ or $R_6Cl$, optionally in an inert solvent, e.g., ether, benzene, DMF or petroleum ether, or with an alkyl chlorosulfite, e.g., those of the formula A—OSOCl, and subsequent thermolysis of the thus-obtained adducts.

It is likewise possible to convert acid halogenides, anhydrides and nitriles of Formula I ($R_1 = $ COCl, COBr, COOAc, CO—O—CO—$CHR_2$—Z and CN) into esters of Formula I ($R_1 = $ esterified COOH) by reaction with an alcohol, e.g., an alcohol of the formula $R_5OH$ or $R_6OH$, if desired in the presence of an acidic catalyst or a base, e.g., NaOH, KOH, $Na_2CO_3$, $K_2CO_3$ or pyridine. Preferably, an excess of the respective alcohol is utilized and the reaction is conducted at temperatures of about 0° C. to the boiling temperature of the mixture. tert.-Alkyl esters are obtainable, for example, from the corresponding acid chlorides and potassium tert.-alcoholates in the presence of an inert solvent. Alcohols of Formula I ($R_1 = CH_2OH$) and the alkali metal alcoholates thereof can be reacted with the halogenides or anhydrides of the acids to be esterified, without or with the addition of an acid-neutralizing agent, e.g., sodium hydroxide or potassium hydroxide, sodium carbonate or potassium carbonate or pyridine. Suitable solvents are inert organic solvents, e.g., ether, THF or benzene. It is also possible to employ an excess of the halogenide or anhydride as a solvent. In a preferred mode of operation, the selected alcohol of Formula I ($R_1 = CH_2$)H) in a pyridine solution is combined with the halogenide and/or anhydride of the acid to be esterified.

It is also possible to esterify alcohols of Formula I ($R_1 = CH_2OH$) with ketenes. This reaction is preferably conducted in an inert solvent, e.g., ether, benzene or toluene, and in the presence of an acidic catalyst, e.g., sulfuric acid or p-toluenesulfonic acid. Thus, 2-(2-dibenzofuryl)-propyl acetate can be produced, for example, from 2-(2-dibenzofuryl)-propanol and ketene.

Esters of Formula I ($R_1 = $ esterified COOH-group) can also be prepared by the transesterification of another ester of Formula I ($R_1 = COOR_{20}$ wherein $R_{20} = $ any desired organic residue, preferably A) with an excess of the respective alcohol, or by reacting a carboxylic acid of Formula I ($R_1 = COOH$) with any desired other ester of the selected alcohol, which is preferably employed in an excess. Analogously, the esters of Formula I ($R_1 =$ esterifiifed $CH_2OH$-group) can be obtained by the transesterification of alcohols of Formula I ($R_1 = CH_2OH$) with an excess of a lower alkyl ester, e.g., of the formula AcOA, or by the transesterification of other esters of Formula I ($R_1 =$ esterified $CH_2OH$-group, preferably esterified with a lower carboxylic acid) with an excess of the carboxylic acid to be esterified. The reaction is conducted in accordance with the transesterification methods described in the literature, especially in the presence of a basic or acidic catalyst, e.g., sodium ethylate or sulfuric acid, at temperatures of about 0° C. to the boiling temperature. Preferably, the reaction is carried out so that after the equilibrium has been established, one reactant is withdrawn from the equilibrium mixture by distillation. Thus, 2-(2-dibenzofuryl)-propanol can be converted into 2-(2-dibenzofuryl)-propyl butyrate with the methyl ester of butyric acid by distilling off the methanol.

Among the esters of Formula I ($R_1 =$ esterified COOH), of particular interest are those which are readily cleavable under physiological conditions, for example the vinyl, tert.-butyl, tetrahydro-2-furyl, and tetrahydro-2-pyranyl esters, obtainable for example by reacting the free carboxylic acids with acetylene, isobutylene, 2,3-dihydrofuran and 2,3-dihydropyran, preferably in the presence of a catalyst, e.g., $ZnCl_2$, $BF_3$, $H_2SO_4$, aryl-sulfonic acids, pyrophosphoric acid, boric acid and oxalic acid, at about 0°–120° C. in an inert solvent, e.g., ether, THF, dioxane, benzene and xylene.

Esters of Formula I ($R_1 =$ esterified COOH) can also be obtained by solvolyzing compounds of Formula I wherein $R_1$ is a thio ester, imino ether, oximino ether, hydrazone ether, thioamide, amidine, amidoxime or amide hydrazone group, with water or dilute aqueous base or acid, e.g., ammonia, NaOH, KOH, $Na_2CO_3$, $K_2CO_3$, HCl, $H_2SO_4$, with the addition of the respective alcohol and splitting off, respectively, of hydrogen sulfide, ammonia, amines, hydrazine derivatives and hydroxylamine. Although most of the imino ether hydrochlorides are usually immediately split into the esters and ammonium chloride in an aqueous solution at room temperature, the solvolysis of other derivatives, e.g., the amidoximes or thioamides, takes place only at higher temperatures, e.g., up to 100° C.

Acids of Formula I ($R_1 =$ COOH) can be converted into the corresponding acid halogenides of Formula I ($R_1 =$ e.g., COCl or COBr) in the presence or absence of an inert solvent by treatment with an inorganic acid halogenide, e.g., $SOCl_2$ or $SOBr_2$. Hydrochlorides of the imino ethers of Formula I ($R_1 = C(=NH)OA$) can be obtained from the nitriles of Formula I ($R_1 = CN$) with an alcohol of the formula A-OH in ether, in the presence of HCl.

It is also possible to convert the acids of Formula I ($R_1 =$ COOH) and/or the functional derivatives thereof, preferably the halogenides and esters thereof of Formula I ($R_1 =$ COCl, COBr, and/or esterified COOH-group) into the corresponding amides (or hydroxamic acids) by treatment with an amidating agent, e.g., ammonia or an amine of the formulae $A—NH_2$ or $(A)_2NH$, respectively, or with hydroxylamine. Examples of suitable amines are monoalkylamines, e.g., methylamine, ethylamine, n-propylamine, isopropylamine, n-butylamine, isobutylamine; dialkylamines, e.g., dimethylamine, methylethylamine, diethylamine, di-n-propylamine, diisopropylamine, di-n-butylamine, diisobutylamine; and also aryl- and aralkylamines, e.g., aniline, benzylamine; hydroxyalkylamines, e.g., ethanolamine, diethanolamine; cyclic amines, e.g., pyrrolidine, piperidine, morpholine, thiomorpholine, piperazine; N-alkyl-piperazines, e.g., N-methyl- or N-ethyl-piperazine; N-hydroxyalkylpiperazines, e.g., N-2-hydroxyethylpiperazine. It is possible, but not required to add an inert solvent during the production of the amides, e.g., an alcohol, e.g., methanol or ethanol or a chlorinated hydrocarbon, e.g., $CHCl_3$. It is likewise possible, but not required, to employ pressure, e.g., up to about 200 atmospheres. The reaction temperatures range from about −20° to +150° C., prefereably 0° to 100° C. One variant of the amidation resides in converting an acid of formula I ($R_1 =$ COOH) first with a chloroformic acid ester of the formula ClCOOA in the presence of a base, e.g., triethylamine, into the mixed anhydride of the formula Z—CHR—$_2$—CO—O—CO—OA, and then further reacting the latter with the amine.

Amides of Formula I ($R_1 = CONH_2$) can optionally be dehydrated to the nitriles of Formula I ($R_1 = CN$), for example with a dehydration agent, e.g., $P_2O_5$, $POCl_3$, p-toluenesulfochloride/pyridine, at temperatures of about 0° to 200° C., preferably 20° to 100° C. Heating of the carboxylic acids of Formula I ($R_1 =$ COOH) with lower alkanoic acid anhydrides produce the acid anhydrides of Formula I ($R_1 =$ —CO—O—CO—$CHR_2$—Z).

Aldehydes of Formula I ($R_1 =$ CHO) optionally can be converted into hemiacetals, e.g., those of the formula Z—$CHR_2$—CHCH—OA, or acetals, e.g., those of the formula Z—CHOH—2—$CH(OA)_2$, by treatment with an acetalizing agent, e.g., an alcohol. For example, the aldehyde is reacted with an alcohol of the formula A—OH, e.g., methanol, ethanol, n-propanol, isopropanol, n-butanol, isobtuanol, or with a glycol of the formula HO—$C_mH_{2m}$—OH wherein $m = 2$, 3 or 4 e.g., ethylene glycol, 1,2-propanediol, 1,3-propanediol, 1,2-butanediol, 2,3-butanediol, 1,4-butanediol, or with a phenol of the formula Ar—OH, with the addition of a reaction catalyst. The condensation of the aldehydes with polyhydric alcohols or phenols produces cyclic acetals. For example, with 1,2-glycols, derivatives of 1,3-dioxolane are obtained and with 1,3-glycols, derivatives of 1,3-dioxane are produced. Suitable catalysts are acids, e.g., mineral acids, e.g., HCl, $H_2SO_4$, $H_3PO_4$; sulfonic acids, e.g., p-toluene-sulfonic acid Also suitable, for example, are $NaHCO_3$, $P_2O_5$, $CaCl_2$, $FeCl_3$, $ZnCl_2$, iodine, anhydrous $CuSO_4$ and cation exchangers. The water of reaction advantageously is removed by azeotropic distillation using an entraining agent, e.g., benzene, toluene, pertroleum ether. An advantageous mode of operation for producing the dimethyl- or diethylacetals is introducing gaseous hydrogen chloride (approximately up to 1%) into the methanolic or ethanolic solution of the aldehyde.

Acetals of the formula Z—$CHR_2$—$CH(OA)_2$ can also be produced by reacting the aldehydes with orthoformic acid esters of the formula $HC(OA)_3$ in the presnece of an acidic catalyst. In general, these substances are permitted to react in the corresponding alcohol of the formula A—OH. The catalysts are suitably small amounts of a mineral acid, aromatic sulfonic acid, $FeCl_3$, $NH_4Cl$, $NH_4NO_3$, $KHSO_4$ or a hydrochloride of a base, e.g., pyridine hydrochloride. Advantageously, the reaction mixture is briefly heated and then allowed to stand for some time at room temperature. In place of the orthoformic acid esters, it is also possible to employ formimido ester salts, e.g., formimido ester hydrochlorides. The reaction of the aldehydes with orthosilicic acid esters of the formula $Si(OA)_4$ in an alcoholic solution in the presence of acids or acidreacting substances likewise results in the desired acetals. Furthermore, a combination of an alcohol of the formula A-OH with dimethyl sulfite in the presence of an acidic catalyst can likewise be used for the acetalization. During the reaction, $SO_2$ is liberated so that the progression of the reaction can be followed by observing the gas evolution.

A further method for the production of acetals is the trans-acetalization of a lower acetal, e.g., dimethyl- or diethylacetal, in the presence of an acidic catalyst and a higherboiling alcohol, e.g., a glycol of the formula $HO-C_mH_{2m}-OH$, wherein m is an integer from 2 to 6. The thus-obtained equilibrium can be shifted by removing the lower alcohol in favor of the acetal of the higher-boiling alcohol. For accomplishing the reaction, it is sufficient to reflux the lower acetal for some time with an excess of the higher-boiling alcohol with the addition of an acidic catalyst, e.g., HCl, $H_2SO_4$, p-toluenesulfonic acid, $FeCl_3$, or $BF_3$. Dihydric and polyhydric alcohols react particularly smoothly with lower acetals, so that this process is especially well suited for the preparation of cyclic acetals. It is also possible to combine the production of the acetal with orthoformic acid esters and the trans-acetalization into one operation. Under the conditions of trans-acetalization, an exchange of the carbonyl compounds can likewise occur. Thus, an aldehyde of Formula I ($R_1$ = CHO) can be converted, e.g., with acetone dimethyl ketal or butanone ethylene ketal, in the presence of p-toluenesulfonic acid, into the corresponding dimethyl- or ethyleneacetal. The thus-liberated acetone or butanone, respectively, is removed from the equilibrium.

Hemithioacetals, e.g., those of the formula $Z-CHR_2-CHOA-SA$, or thioacetals, e.g., those of the formula $Z-CHR_2-CH(SA)_2$, are obtained by reacting the aldehydes of Formula I ($R_1$ = CHO) with mercaptoalkanols, e.g., those of the formula $HS-C_mH_{2m}-OH$ wherein m has the values given above, preferably 2-mercaptoethanol, mercaptans, e.g., those of the formula A—SH, preferably methyl- or ethylmercaptan, or N-propyl-, isopropyl-, n-butyl-, isobutyl-, n-amyl-, n-hexyl-, n-heptyl, n-octylmercaptan, or dithiols, e.g., those of the formula $HS-C_mH_{2m}-SH$ wherein m has the values given above, preferably ethane-1,2-dithiol, or propane-1,2-dithiol, propane-1,3,-dithiol, butane-1,2-dithiol, butane-2,3-dithiol, butane-1,4-dithiol. In the foregoing description and in the following description, the mercaptoalkanols, mercaptans, and dithiols are included within the term acetalizing agents. The condensation of the aldehydes with these substances takes place rapidly at room temperature. In general, a temperature of $-70°$ to $+200°$ C. is suitable for the reaction. The reaction can be conducted, especially with low-boiling mercaptans, in the presence of an inert solvent, e.g., a hydrocarbon, e.g., benzene, toluene or xylene. A preferred catalyst is boron trifluoride etherate, with or without the addition of acetic acid.

Aldehydes of Formula I ($R_1$ = CHO) can also be converted into the corresponding acylates, e.g., those of the formula $Z-CHR_2-CH(OAc)_2$ by treatment with an acylating agent, e.g., an acid anhydride. At an elevated temperature and in the presence of an acidic catalyst, one molar equivalent of H—OAc can be eliminated from the acylates, with the formation of the corresponding enol acylates, e.g., of the formula $Z-CR_2=CH-OAc$.

The free aldehydes of Formula I ($R_1$ = CHO) can also be converted, by reaction with a metal bisulfite solution, into stable, often crystalline addition compounds of the formula $Z-CHR_2-CHOH-SO_3M_1$ ($M_1$ preferably = Na). In general, this reaction is carried out by dissolving the free aldehyde in ether and treating the solution with a concentrated aqueous $NaHSO_3$ solution. It is sometimes advantageous to employ an alcohol, e.g., methanol or ethanol, as an additional solvent, or to add this alcohol to achieve quantitative precipitation toward the end of the reaction. The bisulfite solution can be freshly prepared by combining 1 mole of $Na_2SO_3$ and 1 mole of acetic acid. Another mode of operation is to combine the aldehyde and an aqueous $Na_2SO_3$ solution, introduce $SO_2$ and continuously neutralize the thus-liberated sodium hydroxide solution. Also, $SO_2$ can convert aqueous aldehyde solutions or suspensions into bisulfite compounds by the continuous addition of NaOH. The bisulfite compounds are, in most cases, difficult to dissolve in excess $NaHSO_3$ solution. They can therefore be easily separated therefrom and can normally be purified by recrystallization from aqueous ethanol.

The aldehydes of Formula I ($R_1$ = CHO) can also be converted into other functional derivatives in accordance with methods described in the literature, e.g., oximes, semicarbazones, phenylhydrazones and substituted phenylhydrazones.

Ethers of Formula I ($R_1$ = etherified $CH_2OH$-group, preferably $CH_2OA$) are obtained from alcohols of Formula I ($R_1$ = $CH_2OH$) by reacting the corresponding alkali metal alcoholates with an alkyl halogenide, alkyl methanesulfonate or alkyl p-toluenesulfonate. The alkali metal alcoholates are obtained by agitating the alcohol of Formula I ($R_1$ = $CH_2OH$) in an inert solvent, e.g., ether, THF, dioxane, or benzene, with finely divided Na, $NaNH_2$ or NaH until the evolution of hydrogen or ammonia, respectively, is terminated. Thereafter, the alkyl halogenide, most advantageously the respective alkyl iodide, is added thereto and the mixture refluxed for several hours.

Ethers of Formula I ($R_1$ = etherified $CH_2OH$-group) are also produced by reacting alcohols of Formula I ($R_1$ = $CH_2OH$) in an inert solvent, e.g., ether, benzene or toluene, with a diazoalkane, by the addition of catalytic amounts of a Lewis acid, e.g., $AlCl_3$, $BF_3$ or $FeCl_3$. The amount of catalyst added is normally dependent on the reaction velocity, i.e., reactions which are slowing down can be accelerated by the addition of further amounts of the catalyst.

Finally, alcohols of Formula I ($R_1$ = $CH_2OH$) can also be converted into the corresponding ethers by adding these alcohols to olefins. Preferred olefins are those hydrocarbons produced by splitting off water from a tertiary alcohol. The addition step is executed in the presence of an acidic catalyst, e.g., mineral acids, tetrafluoroboric acid, perchloric acid, or $BF_3$. In some cases, basic catalysts are also suitable, e.g., alkali metal alcoholates. An excess of the olefin is a suitable solvent but normally inert solvents are employed, e.g., THF, dioxane, benzene or toluene. The preferred reaction temperature is the boiling temperature of the selected solvent. Thus, for example, it is possible to obtain the 2-(2-dibenzofuryl)-propyl-tert.-amyl ether from 2-(2-dibenzofuryl)-propanol and trimethylethylene.

Functional derivatives of compounds of Formula I (e.g., $R_1$ = functionally modified COOH— or $CH_2OH$-group) can be converted, by further modifications, into other functional derivatives of the same type. For example, esters containing additional reactive groups in the alcohol portion can be converted into other esters. For example, haloalkyl esters (e.g., 2-chloroethyl esters) of acids of Formula I ($R_1$ = COOH) can be reacted with sodium alcoholates to alkoxyalkyl esters or with dialkylamines to dialkylaminoalkyl esters, suitably in the presence of an inert solvent, e.g., benzene or chloroform, at temperatures of from 0° to 150°C., preferably 20° and 100° C., optionally also under elevated pressure.

It is also possible to convert, in a thus-obtained product of Formula I, an $R_1$ group, preferably an optionally functionally modified COOH— or CHO-group, by treatment with reducing agents, into another $R_1$ group, preferably an optionally functionally modified CHO— or $CH_2OH$—group.

Suitable for such reductions are, e.g., compounds of Formula I wherein $R_1$ is —COOH, —COCl, —CN, —COOA, —CO-SA, —CON(A)$_2$, -CHO, —COHal, —CO—O—Ac, —CO—O—CO—$CHR_2$—Z, —$CON_3$ or —CH(OA)$_2$.

For example, aldehydes of the formula Z—$CHR_2$—CHO are obtainable from acid chlorides Z—$CHR_2$—COCl by catalytic hydrogenation according to the Rosenmund method (suitably under normal pressure using a Pd/$BaSO_4$ catalyst in benzene, toluene or xylene as the solvent; or by reaction with quinoline and NaCN according to the Reissert method; or by reaction with a lithium tri-tert.-alkoxyaluminum hydride, e.g., lithium tri-tert.-butoxyaluminum hydride; or from nitriles Z—$CHR_2$—CN by reduction with $SnCl_2$/HCl according to the Stephen method; or reduction with a dialkylaluminum hydride, e.g., diisobutylaluminum hydride. These aldehydes are also obtainable from esters of the formula Z-$CHR_2$-COOA by reaction with dialkylaluminum hydrides or lithium tri-tert.-alkoxyaluminum hydrides; and from unsaturated esters of the type Z-C(=$R_{15}$)-COOA, e.g., 2-(2-dibenzofuryl)-acrylic acid ethyl ester; or from acid imidazolides or 3,5-dimethylpyrazolides or carbazolides, e.g., N-[2-(2-dibenzofuryl)-propionyl]-imidazole or - 3,5-dimethylpyrazole or -carbazole, or from acid aziridides of the formula

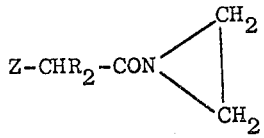

by reaction with LiAlH$_4$, or from phenylimide chlorides of the formula Z—$CHR_2$—CCl =N—$C_6H_5$ by reaction with tetrachlorotin(II) acid.

Alcohols of the formula Z—$CHR_2$—$CH_2OH$ are obtained, for example, from acids of the formula Z—$CHR_2$—COOH or esters of the formula Z—$CHR_2$—COOA by reaction with LiAlH$_4$; from aldehydes of the formula Z-$CHR_2$-CHO by reaction with a number of reducing agents of all kinds, e.g., pulverized iron in aqueous acetic acid, LiAll$_4$, NaBH$_4$, aluminum alcoholates, such as aluminum isopropylate, according to the method of Meerwein-Ponndorf, e.g., in benzene or toluene at temperatures of between about 20° and about 110° C.; from acid azides of the formula Z—$CHR_2$—$CON_3$ by reaction with NaBH$_4$; from acid chlorides of the formula Z—$CHR_2$—COCl by reaction with NaAlH$_4$ or LiAlH$_4$; from acid amides of the formula Z—$CHR_2$—$CONH_2$ by reaction with alkali metals in lower alcohols, e.g., Na in ethanol; and from mixed carbonic acid esters of the formula Z—$CHR_2CO$—O—CO—OA by reaction with LiAlH$_4$.

Ethers of the fomula Z—$CHR_2$—$CH_2OA$ are obtainable, for example, by reduction of the corresponding esters of the formula Z—$CHR_2$—CO—OA with diborane, which can be produced in situ from NaBH$_4$/BF$_3$ or LiAlH$_4$/BF$_3$.

Further details of the reducing methods are described above, e.g., paragraph (c).

Ethers or esters of the formula Z—$CHR_2$—$CH_2OR_{21}$ wherein $R_{21}$ is a group which can be split off by hydrogenolysis, e.g., benzyl, diphenylmethyl, triphenylmethyl, p-methylbenzyl, 2-picolyl or carbobenzoxy, can be split reductively, thus forming alcohols of Formula I ($R_1$ = $CH_2OH$). A preferred hydrogenolysis is conducted with hydrogen in the presence of a Pd catalyst, e.g., Pd on charcoal. Thus 2-(2-dibenzofuryl)-propanol is obtained, for example, from 2-(2-dibenzofuryl)-propylbenzyl ether.

Conversely, it is also possible, in a thus-obtained compound of Formula I, to oxidize an $R_1$ group, especially a $CH_2OH$— or CHO-group, to another $R_1$ group, especially a CHO— or COOH— group.

Alcohols of the formula Z—$CHR_2$—$CH_2OH$ and aldehydes of the formula Z—$CHR_2$—CHO can readily be converted into the corresponding carboxylic acids of the formula Z—$CHR_2$—COOH with a plurality of oxidizing agents. These oxidizing agents include chromic acid and/or the salts thereof, e.g., sodium dichromate, preferably in an aqueous-sulfuric acid medium and/or with the addition of acetone, acetic acid and/or benzene as the solvent; silver oxide, which can suitably be prepared in situ from silver nitrate and NaOH, preferably in an aqueousalkaline medium; KMnO$_4$, for example, in pyridine; NiO$_2$, for example, in THF in the presence of a base, e.g., Na$_2$CO$_3$.

An oxidation of alcohols of the formula Z—$CHR_2$—$CH_2OH$ to the corresponding aldehydes is likewise possible, which can be accomplished according to methods described in detail in the literature. For example, these alcohols can be dehydrogenated catalytically with hydrogen being split off, or with the aid of oxidation agents.

The catalytic dehydrogenation is suitably effected under reduced pressure in the vapor phase. Suitable catalysts are primarily copper, silver and zinc compounds. The reaction temperature is normally between 100° and 450° C. The dehydrogenation can also be conducted in the presence of hydrogen acceptors. Suitable as such acceptors are, above all, aromatic nitro compounds, e.g., nitrobenzene or m-dinitrobenzene. A suitable catalyst is pulverized copper, for example. The reaction is conducted by heating the reactants in an inert solvent, e.g., xylene, while passing air through the reaction mixture.

The oxidation can furthermore be conducted, for example, with chromic acid. The reaction can be effected in an aqueous solution or another inert solvent at a temperature of from 0° to 100° C. Also the chromic acid-pyridine complex is suitable as an oxidation agent. Nitrogen or carbon dioxide can be introduced into the reaction mixture in order to suppress the further oxidation of the thus-formed aldehyde. A variant of the $CrO_3$ oxidation is the dehydrogenation with tert.-butyl chromate which is conducted in excess tert.-butanol or in an inert diluent, e.g., petroleum ether, benzene or $CCl_4$.

Further oxidation agents for the oxidation of the alcohols of Formula I ($R_1 = CH_2OH$) to the aldehydes of Formula I ($R_1 = CHO$) are $MaO_2$, which is used in dilute sulfuric acid but can also be employed suspended in inert organic solvents, e.g., petroleum ether or acetonitrile; $PbO_2$; lead tetraacetate, which is used in acetic acid or also in benzene, optionally with the addition of some pyridine; $SeO_2$; $N_2O_4$, most advantageously in $CHCl_3$ or $CCl_4$; N-haloamides, e.g., N-bromosuccinimide, which compounds can be employed in acetic acid/sodium acetate or in pyridine; concentrated $HNO_3$ or m-nitrobenzenesulfonic acid; or 1-chlorobenzotriazole.

With the use of very low-volatile carbonyl compounds as hydrogen acceptors, e.g., diphenylcarbaldehyde, benzoquinone or phenanthrenequinone, it is also possible to convert alcohols of the formula $Z-CHR_2-CH_2OH$ into the aldehydes according to the Oppenauer method. In this reaction, the alcohol is first converted into the alcoholate with the stoichiometric amount of aluminum isopropylate or aluminum phenoxide, and then mixed with an excess of the high-boiling hydrogen acceptor. The thus-formed aldehyde can be distilled from the redox equilibrium, for example, under reduced pressure.

Anodic oxidation can likewise be utilized for the dehydrogenation of alcohols of Formula I ($R_1 = CH_2OH$).

A preferred oxidation method resides in converting alcohols of the formula $Z-CHR_2-CH_2OH$ into the aldehydes of Formula I ($R_1 = CHO$) with dimethyl sulfoxide (DMSO). This reaction is advantageously carried out in the presence of an agent splitting off water, e.g., acetic anhydride or, in an even gentler manner, in the presence of dicyclohexylcarbodiimide with the addition of a suitable acid, e.g., trifluoroacetic acid or $H_3PO_4$, by allowing the components to react with each other at temperatures of from 0° to 50° C., preferably at about room temperature, for about 0.5 - 24 hours.

In a thus-obtained product of Formula I, an $R_3$ group can be converted into another $R_3$ group by substitution reactions and/or further conversions of the introduced or already present substituents.

For example, it is possible to introduce, by halogenation, alkylation, nitration, etc., a halogen atom, an alkyl, alkanoyl, monoalkylamino, dialkylamino, acylamino, amino, or nitro group into the dibenzofuran and/or the dibenzothiophene ring. An amino group can be diazotized and the thus-obtained diazonium residue can be further converted into other functional groups.

Thus, according to methods described in the literature, one of the following substituents can be introduced into the dibenzofuran or dibenzothiophene ring, respectively:

a. Chlorine:

For example, by direct reaction with elemental chlorine in an inert solvent, such as water, aqueous sodium hydroxide solution, ether, tetrachloromethane, acetic acid, without or with the addition of specific catalysts, such as, for example, $FeCl_3$, $AlCl_c3$, $SbCl_3$, or $SnCl_4$, preferably between $-10°$ and 100° C., or by reaction in a strongly hydrochloric solution with $H_2O_2$ or with $NaClO_{103}$, wherein the chlorination is effected by the chlorine produced in the nascent state, or by reaction with $SO_2Cl_2$ in an inert solvent, such as chlorobenzene, in the presence of radical-forming catalysts, e.g., peroxides, at preferably 80°–180° C.

b. Bromine:

For example, by direct reaction with elemental bromine in an inert solvent, such as water, aqueous sodium hydroxide solution, carbon disulfide, acetic acid, chloroform, tetrachloromethane, or dioxane, especially with the addition of catalysts effective as bromine-transfer agents, such as iron filings, $AlCl_3$, $AlBr_3$, $FeCl_3$, iodine, or pyridine, preferably between $-30°$ and 90° C., or by reaction with hypobromous acid, acylhypobromites, N-bromoimides, such as N-bromosuccinimide, N-bromophthalimde, or other bromine-yielding agents, such as 1,3-dibromo-5,5-dimethylhydantoin, in inert solvents, such as nitrobenzene or carbon disulfide, preferably at $-10°$ to 150° C.

c. Iodine:

For example, by direct reaction with elemental iodine, especially in the presence of nitric acid in chloroform or of HgO in an inert solvent, such as alcohol, acetic acid, or benzene, preferably at temperatures of between 0° and 120° C., or by reaction with iodine - alkali metal iodide solutions in the presence of carbonates, acetates, alkali metal hydroxide solutions, ammonia, or amines, or by reaction of mixtures of alkali metal iodides and oxidation agents, such as alkali metal iodates, alkali metal nitrates, or $H_2O_2$, in inert solvents, such as water, acetic acid, or ethanol, wherein the thus-liberated iodine reacts in the nascent state, or by reaction with CII in dilute acetic acid, preferably at 50° – 100° C., or after mercuration, for example in an aqueous or acetic medium with mercury(II) acetate to the $Hg-O-COCH_3$ compound and exchange of the organometallic residue against iodine, for example by reaction with iodine or iodine - alkali metal hydroxide solutions.

d. Nitro:

For example, with the aid of the following agents: a mixture of anhydrous nitric acid with $BF_3$; metal nitrates, such as Cu, Fe, Mn, Co, Ni nitrate, in a mixture with acetic acid or acetic anhydride; metal nitrates, such as Ag, Ba, Na, K, $NH_4$, or Pb nitrate, in a mixture with Friedel-Crafts catalysts, such as $AlCl_3$, $FeCl_3$, $BF_3$, or $SiCl_4$; alkyl nitrates, such as ethyl nitrate, in a mixture with concentrated sulfuric acid, $HBF_4$, or Lewis acids, such as $BCl_3$, $SnCl_4$, $PCl_3$, $AlCl_3$, $SiCl_4$, $SbCl_5$, or $FeCl_3$; nitryl fluoride, chloride, bromide, perchlorate, or tetrafluoroborate, preferably in the presence of Friedel-Crafts catalysts, such as $AlCl_3$, $FeCl_3$, $ZrCl_4$, or $AlBr_3$, in solvents such as carbon disulfide, n-pentane, or $CHCl_3$; nitrogen oxides, such as $N_2O_5$, $N_2O_3$, in the presence of concentrated $H_2SO_4$, HF, or Friedel-Crafts catalysts, such as $BF_3$, $AlCl_3$, or $FeCl_3$, optionally in solvents, such as tetramethylenesulfone or acetic acid; concentrated nitric acid; mixtures of concentrated sulfuric acid with concentrated and/or anhydrous nitric acid; alkali metal nitrates, such as sodium or potassium nitrate, in a mixture with concentrated sulfuric acid; mixtures of concentrated nitric acid with pyrosulfuric acid, oleum, acetic acid and/or acetic anhydride; mixtures of nitric acid, sulfuric acid, and acetic acid; acetyl or benzoyl nitrate; nitrosulfonic acid, producible by introducing $SO_2$ into fuming $HNO_3$; nitrosylsulfuric acid; nitroguanidine; highly concentrated nitric acid in the presence of dehydrating agents, such as $P_2O_5$ or anhydrous hydrofluoric acid, optionally in solvents, such as nitrobenzene or polychloroethanes. A special nitration reaction resides in dissolving the substance to be nitrated in a solvent, such as $CHCl_3$, $CH_2Cl_2$, or $CCl_4$, forming a bottom layer of concentrated sulfuric acid thereunder, and then adding anhydrous nitric acid in $CHCl_3$, $CH_2Cl_2$ or $CCl_4$. In general, the temperatures employed in this reaction are not too high, in order to avoid side reactions; they are normally between $-20°$ and $+100°$ C., preferably between $-10°$ and $+80°$ C.

e. Alkyl, alkanoyl, amino, alkyl- or dialkylamino, or acylamino:

For example, by reaction with the corresponding chlorine, bromine, iodine, hydroxy, or acyloxy compounds of the type $R_3-X_1$, such as, for example, methyl chloride, ethyl iodide, n-propyl bromide, n-butanol, ethyl acetate, acetyl chloride or bromide, acetic anhydride, hydroxylamine, chloramine, diethyl chloramine, or acethydroxamic acid, in accordance with the conditions of a Friedel-Crafts reaction as described in greater detail in the literature. Suitable catalysts are Lewis acids, such as $AlCl_3$, $AlBr_3$, $SnCl_4$, $ZnCl_2$, $FeCl_3$, $SbCl_5$, HF, or polyphosphoric acid, and suitable solvents are n-hexane, 1,2-dichloroethane, carbon disulfide, nitrobenzene, tetramethylenesulfone, or nitroethane. The reaction is advantageously conducted at between $0°$ and $200°$ C. In place of the compounds $R_3-X_1$, it is also possible to use the corresponding des-$HX_1$ derivatives, e.g., olefins, ketene.

In thus-obtained compounds of Formula I containing reducible subststituents $R_3$ (e.g., nitro, alkanoyl, or acylamino groups, or Hal atoms), the latter can be reduced to other substituents (e.g., amino, alkyl, or alkylamino groups, or H) in accordance with methods described in the literature. It is possible to hydrogenate the reducible groups catalytically, or to reduce them chemically, wherein suitably one of the above-described methods (paragraph [c]) is employed.

In addition to the catalytic hydrogenation, furthermore suitable as a way of reducing $NO_2$-groups to $NH_2$-groups are especially metals (e.g., iron, zinc) with acids (e.g., HCl, $CH_3COOH$) or $SnCl_2$. Alkanoyl groups can be reduced to the corresponding alkyl groups by catalytic hydrogenation or according to the methods of Wolff-Kishner or Clemmensen. When treating acylamino compounds with $LiAlH_4$, for example in boiling THF, the corresponding alkylamino compounds are produced.

It is furthermore possible to replace chlorine, bromine, or iodine atoms contained in the residue $R_3$ by hydrogen; this is done by converting the corresponding halogen compounds into the associated organometallic, e.g., Grignard, compounds and hydrolyzing same with water or dilute acids.

Compounds of Formula I containing a free hydroxy, amino, or monoalkylamino group in the residue $R_3$ can be alkylated to corresponding alkoxy, monoalkylamino, or dialkylamino compounds, or acylated to the corresponding acylamino compounds. The alkylation can be accomplished according to methods described in the literature by treatment with an alkylating agent. For the O-alkylation, the starting substances are suitably first converted into the corresponding phenolates by the addition of a base, e.g., NaOH or $K_2CO_3$. Suitable alkylating agents are, for example, alkyl halogenides, such as methyl chloride, bromide, or iodide; ethyl chloride, bromide, or iodide; n-propyl chloride, bromide, or iodide; isopropyl chloride, bromide, or iodide; n-butyl chloride, bromide, or iodide, or the corresponding dialkylsulfuric acid or alkylsulfonic acid esters, e.g., dimethyl sulfate, diethyl sulfate, the methyl ester of p-toluenesulfonic acid. Also diazo compounds, such as diazomethane, can be used for the O-alkylation. Amino compounds can also be alkylated with the corresponding alcohols, e.g., methanol or ethanol, in the presence of Raney nickel, or reductively with formaldehyde or acetaldehyde in the presence of hydrogen or formic acid. When conducting the reaction in the presence of hydrogen, it is advantageous to have one of the abovementioned catalysts present.

Examples of suitable solvents are water or aqueous sodium hydroxide solution; alcohols, such as methanol, ethanol, n-butanol; hydrocarbons, such as benzene, xylene; ethers, such as THF; amides, such as DMF; or mixtures thereof. The alkylations are advantageously conducted at temperatures of between about $-10°$ and about $+150°$ C., especially between room and boiling temperature. In case starting substances are employed having a free carboxyl group ($R_1 = COOH$), this group can simultaneously be esterified, unless the reaction mixture is kept at a strongly alkaline level.

An acylation is suitably accomplished with carboxylic acids or carboxylic acid derivatives. Suitable as the latter are, for example, carboxylic acid esters, anhydrides (e.g., acetic anhydride), or halogenides, such as chlorides, bromides, or iodides (e.g., acetyl chloride, bromide, or iodide). An excess of the carboxylic acid derivative can be used as the solvent; or the reaction is carried out in the presence of an inert solvent such as benzene, toluene, THF, dioxane, or chloroform. During the acylation, a base is preferably added, such as NaOH, KOH, sodium carbonate or potassium carbonate, pyridine, triethylamine.

In compounds of Formula I containing one or more diazonium groupings, these can be exchanged for fluorine, chlorine, bromine, iodine, $NO_2$, OH, alkoxy, or cyano in accordance with methods disclosed in the literature. The diazonium compounds are obtainable according to methods described in the literature by the diazotization of corresponding amino compounds, e.g., in a hydrochloric or hydrobromic aqueous solution by adding the stoichiometric amount of an inorganic nitrite, preferably $NaNO_2$ or $KNO_2$, at temperatures of between about $-20°$ and $+10°$ C., or in inert organic solvents, such as diethyl ether, diisopropyl ether, THF, dioxane, 1,2-dimethoxyethane, 1,2-diethoxyethane, diglyme, or diethylene glycol diethyl ether, by adding an organic nitrite, such as n-butyl nitrite, n-amyl nitrite, or isoamyl nitrite, at temperatures of between $-20°$ and $+5°$ C.

In order to introduce a fluorine atom, the compounds are diazotized, for example, in anhydrous hydrofluoric acid and then heated; or the diazonium salts are reacted with $HBF_4$ to the sparingly soluble diazonium tetrafluoroborates which can be isolated and thermally converted into the desired fluorine compounds, for example by heating in an inert solvent.

The diazonium group is exchanged against chlorine preferably in a hot aqueous solution in the presence of $Cu_2Cl_2$ in accordance with the Sandmeyer method. The exchange against bromine can be effected, for example, in an aqueous solution in the presence of $Cu_2Br_2$ according to Sandmeyer, or by reaction with bromine to the diazonium perbromide and subsequent refluxing in solvents, such as water or lower alcohols. It is also possible to convert the diazonium bromides with $HgBr_2$ into the diazonium mercury bromides, and to decompose them thermally to the desired bromine compounds.

The exchange of a diazonium iodide group against iodine can readily be accomplished by gently heating. It is also possible to add catalysts, such as CuI, CuBr, or CuCl in order to accelerate the reaction (as described in the literature).

Furthermore, the diazonium salt grouping can be exchanged against the corresponding alkoxy group, for example, by heating in an aqueous-alcoholic solution.

Also, by heating, if necessary by refluxing, the aqueous solutions of the diazonium salts can also be hydrolyzed to the corresponding phenols.

With the aid of CuCN or complex nickel cyanides, the diazonium group can be replaced by a cyano group. For purposes of this reaction, the reactant is suitably produced in situ from $Cu_2Cl_2$ and/or fromm $Ni(NO_3)_2$ and an alkali metal cyanide. It is advantageous to add the neutral diazonium salt solution dropwise to the cyanide solution at about 0°–5° C.; additionally, an inert, water-immiscible solvent, such as benzene, can be added thereto, and the reaction mixture is then heated for some time (up to about 50° C.).

It is furthermore possible to hydrolyze acylamino compounds of Formula I ($R_3$ = acylamino) to the basic amino compounds (I, $R_3$ = $NH_2$) under the conditions set forth above for the hydrolysis of acid amides, for example by heating with a strong acid, such as HCl.

In halogen compounds of Formula I ($R_3$ = Cl, Br, or I), the halogen atom can be exchanged against other substituents $R_3$ in accordance with various methods.

Thus, for example, such compounds (preferably I, $R_3$ = Br) can be treated with ammonia (e.g., aqueous ammonia) or substances yielding ammonia (e.g., ammonium carbonate), preferably under pressure (10–70 atmospheres) at elevated temperatures (about 150° to 250° C.) and in the presence of heavy metal salts, especially copper salts, such as $Cu_2Cl_2$. During this reaction, the halogen atom is replaced by an amino group. Analogously, it is possible to substitute the halogen atom by an alkylamino or dialkylamino group, respectively, by treatment with alkyl- or dialkylamines, respectively, wherein the alkyl groups contain in each case 1–4 carbon atoms.

Furthermore, halogen compounds (I, $R_3$ = preferably I) can be converted into the corresponding trifluoromethyl compounds (I, $R_3$ = $CF_3$) by reaction with $ICF_3$ in the presence of copper powder. This reaction is accomplished, for example, in solvents, such as DMF or hexamethylphosphoric triamide at temperatures of between 100° and 200° C.

Further, halogen compounds (I, $R_3$ = Hal) can be converted into the corresponding cyano compounds (I, $R_3$ = CN) with the aid of metal cyanides, such as NaCN, KCN, or preferably CuCN. This reaction is advantageously conducted in an inert solvent, such as DMF, N-methylpyrrolidone, or pyridine at temperatures of between 140° and 220° C. or in the absence of a solvent at temperatures of between 150° and 260° C.

Halogen compounds of Formula I ($R_3$ = Hal) can be converted into the corresponding alkoxy compounds (I, $R_3$ = alkoxy) by reaction with alkali metal or magnesium alcoholates in the presence of a copper(I) halide, such as $Cu_2Cl_2$, $Cu_2Br_2$, or $Cu_2I_2$ in a heterocyclic basic solvent, such as pyridine, collidine, lutidines, such as 2,6-lutidine, quinoline, isoquinoline, picolines, at temperatures of preferably 110°–220° C. in 0.5 to 24 hours.

A basic compound of Formula I (for example a compound substituted by at least one amino group) can be converted into the associated acid addition salt by means of an acid. Suitable for this reaction are those acids yielding physiologically acceptable salts. Thus, suitable are organic and inorganic acids, such as, e.g., aliphatic, alicyclic, araliphatic, aromatic, or heterocyclic mono- or polybasic carboxylic or sulfonic acids, such as formic acid, acetic acid, propionic acid, pivalic acid, diethylacetic acid, oxalic acid, malonic acid, succinic acid, pimelic acid, fumaric acid, maleic acid, lactic acid, tartaric acid, malic acid, aminocarboxylic acids, sulfamic acid, benzoic acid, salicyclic acid, phenylpropionic acid, citric acid, gluconic acid, ascorbic acid, nicotinic acid, isonicotinic acid, methanesulfonic acid, ethanedisulfonic acid, $\beta$-hydroxyethanesulfonic acid, p-toluenesulfonic acid, naphthalene-mono- and -disulfonic acids, sulfuric acid, nitric acid, hydrohalic acids, such as hydrochloric acid or hydrobromic acid, or phosphoric acids, such as orthophosphoric acid.

On the other hand, the free carboxylic acids of Formula I ($R_1$ = COOH) can be converted into one of the physiologically acceptable metal or ammonium salts thereof by reaction with a base. Suitable salts are especially the sodium, potassium, magnesium, calcium, and ammonium salts, furthermore substituted ammonium salts, such as, for example, the dimethyl- and diethylammonium, monoethanol-, diethanol-, and triethanolammonium, cyclohexylammonium, dicyclohexylammonium, and dibenzylethylenediammonium salts.

Conversely, basic and/or acidic compounds of Formula I can be liberated from the acid addition salts thereof by treatment with strong bases, such as sodium or potassium hydroxide, sodium or potassium carbonate; and from the metal and ammonium salts thereof by treatment with acids, especially mineral acids such as hydrochloric or sulfuric acid.

If the compounds of Formula I contain a center of asymmetry, they are ordinarily present in the racemic form.

The racemates can be separated into the optical antipodes thereof in accordance with a large number of conventional methods, as described in the literature. The method of chemical separation is preferred. According to this method, diastereomers are formed from the racemic mixture by reaction with an optically active auxiliary agent. Thus, an optically active base can be optionally reacted with the carboxyl group, or an optically active acid can be reacted with the amino group of a compound of Formula I. For example, it is possible to form diastereomeric salts of the compounds of Formula I ($R_1$ = COOH) with optically active amines, such as quinine, cinchonidine, brucine, cinchonine, hydroxyhydrindamine, morphine, 1-phenylethylamine, 1-naphthylethylamine, phenyloxynaphthylmethylamine, quinidine, strychnine, basic amino acids, such as lysine, arginine, amino acid esters; or diastereomeric salts of basic compounds of Formula I can be formed with optically active acids, such as (+)- and (−)-tartaric acid, dibenzoyl-(+)- and -(−)-tartaric acid, diacetyl-(+)- and -(−)-tartaric acid, camphoric acid, β-camphorsulfonic acid, (+)- and (−)-mandelic acid, (+)- and (−)-malic acid, (+)- and (−)-2-phenylbutyric acid, (+)- and (−)-dinitrodiphenic acid, or (+)- and (−)-lactic acid. In a similar manner, ester diastereomers can be produced by the esterification of compounds of Formula I ($R_1$ = COOH) with optically active alcohols, such as borneol, menthol, 2-octanol. The thus-obtained mixtures of diastereomeric salts or esters can be separated by selective crystallization. By the hydrolytic dissociation of the isolated diastereomeric compound, the desired optically active compounds of Formula I are obtained.

Furthermore, it is, of course, possible to obtain optically active compounds according to the above-described methods by using starting substances which are already optically active.

The compounds of Formula I and/or optionally the physiologically acceptable salts thereof can be employed in a mixture with solid, liquid and/or semiliquid excipients as medicines in the human or veterinary medicine. Suitable vehicles are those organic or inorganic substances suitable for parenteral, enteral, or topical application, and which do not react with the novel compounds, such as, for example, water, vegetable oils, benzyl alcohols, polyethylene glycols, gelatin, lactose, amylose, magnesium stearate, talc, vaseline, cholesterol. Especially suitable for parenteral application are solutions, preferably oily or aqueous solutions, as well as suspensions, emulsions, or implants. Suitable for enteral application are tablets, dragees, capsules, syrups, elixirs, or suppositories, and for topical application salves, creams or powders. The above-mentioned preparations can optionally be sterilized or can contain auxiliary substances, such as lubricants, preservatives, stabilizers, or wetting agents, emulsifiers, salts for influencing the osmotic pressure, buffers, coloring flavoring and/or aromatous substances.

The substances are preferably administered in dosages of between 1 and 500 mg. per dosage unit.

The temperatures herein are set forth in degrees Celsius. "Working up as usual" means the following: Water is added, if necessary; the reaction mixture is extracted with ethyl acetate, ether, or chloroform; separated; and the organic extract is washed with water, dried over sodium sulfate, filtered; the solvent is distilled off; and the residue is distilled and/or crystallized from the solvent indicated in parentheses. DMF = dimethylformamide DMSO = dimethyl sulfoxide, THF = tetrahydrofuran.

Without further elaboration, it is believed that one skilled in the art can, using the preceding description, utilize the present invention to its fullest extent. The following prferred specific embodiments are, therefore, to be construed as merely illustrative, and not limitative of the remainder of the disclosure in any way whatsoever.

EXAMPLE 1

A mixture of 10 g. of dibenzofuran, 1.5 g. of 2-chloropropionic acid, 0.015 g. of $Fe_2O_3$, and 0.07 g. of KBr is heated to 200° for 15 hours. The reaction product is taken up in ether, extracted with sodium hydroxide solution, and finally precipitated from the aqueous phase with hydrochloric acid. After working up as usual, 2-(2-dibenzofuryl)-propionic acid is obtained, m.p. 139°–140°.

Instead of 2-chloropropionic acid, it is also possible to employ equivalent amounts of 2-bromo- or 2-iodopropionic acid.

Analogously, the corresponding 2-(2-dibenzofuryl)-propionic acids, e.g. 2-(8-methyl-2-dibenzofuryl)-2chloropropionic acid, are obtained with 2chloropropionic acid from 2-methyldibenzofuran, 2-ethyldibenzofuran, 2-n-propyldibenzofuran, 2-isopropyldibenzofuran, 2-n-butyldibenzofuran, 2-isobutyldibenzofuran, 2-sec.-butyldibenzofuran, 2-tert.-butyldibenzofuran, 2-methoxydibenzofuran, 2-ethoxydibenzofuran, 2-n-propoxydibenzofuran, 2-isopropoxydibenzofuran, 2-n-butoxydibenzofuran, 2-isobutoxydibenzofuran, 2-sec.-butoxydibenzofuran, and 2-tert.-butoxydibenzofuran. From dibenzothiophene, 2-(2-dibenzothienyl)-propionic acid is obtained, m.p. 182°–184°.

EXAMPLE 2

(a) A solution of 16.8 g. of dibenzofuran in 300 ml. of nitrobenzene is agitated with 18.1 g. of the ethyl ester of 2-bromopropionic acid and 26.7 g. of $AlCl_3$ for 24 hours at 25°. The reaction mixture is poured on ice, worked up as usual, and the product thus obtained is the ethyl ester of 2-(2-dibenzofuryl)-propionic acid, b.p. 173°–177°/0.2 mm.

In place of $AlCl_3$, it is also possible to use equivalent amounts of $AlBr_3$, $BF_3$ or the etherate thereof, $BCl_3$, $BBr_3$, $ZnCl_2$, or $ZnBr_2$, and in place of the ethyl ester of 2-bromopropionic acid, it is also possible to employ equivalent amounts of the ethyl ester of 2-chloro-, 2-iodo-, 2-hydroxy-, or 2-acetoxypropionic acid.

Analogously, the corresponding esters of 2-(2-dibenzofuryl)-propionic acid are produced from dibenzofuran with the following esters of 2-bromopropionic acid:
methyl ester
isobutyl ester
n-propyl ester
n-pentyl ester
isopropyl ester
n-hexyl ester
n-butyl ester b. At −70°, 13.4 g. of the ethyl ester of 2-(2-dibenzofuryl)-propionic acid is added dropwise to a solution of 7.3 g. of diisobutylaluminum hydride in 150 ml. of absolute hexane within 1 hour. The reaction mixture is agitated for one hour at −70°, decomposed with aqueous $NH_4Cl$ solution, the hexane phase is separated, and the aqueous phase is extracted with ether. The ether/hexane solution is dried and concentrated by evaporation. The residue is chromatographed on silica gel with benzene/hexane (9 : 1), thus obtaining 2-(2-dibenzofuryl)-propanal, m.p. 52°–54°.

EXAMPLE 3 a. 14 g. of pulverized anhydrous $AlCl_3$ is added to a solution of 16.8 g. of dibenzofuran in 200 ml. of nitrobenzene; then, 10 g. of 2-chloropropanol is added dropwise at 20°–25°. The mixture is stirred overnight at 20°, then heated for 3 hours on a steam bath, decomposed by adding ice thereto, and the nitrobenzene is driven off with steam. After the usual working-up procedure, 2-(2-dibenzofuryl)-propanol is obtained, m.p. 48°–50°.

Analogously, the corresponding 2-(8-halo-2-dibenzofuryl)-propanols are obtained, e.g. 2-(8-bromo-2-dibenzofuryl)-propanol, from 2-fluoro-, 2-chloro-, 2-bromo-, or 2-iododibenzofuran, respectively.

b. 2.26 g. of 2-(2-dibenzofuryl)-propanol is agitated in 150 ml. of acetonitrile together with 10 g. of active manganese dioxide for 30 hours at 25°. The reaction mixture is filtered and worked up as usual, thus obtaining 2-(2-dibenzofuryl)-propanal, m.p. 52°–54°.

c. 22.6 g. of 2-(2-dibenzofuryl)-propanol is allowed to stand in 200 ml. of DMSO and 200 ml. of benzene together with 24.8 g. of dicyclohexylcarbodiimide, 6.4 g. of pyridine, and 3.1 ml. of trifluoroacetic acid for 4 hours at 25°. The mixture is then diluted with benzene, the precipitated dicyclohexylurea is filtered off, and the filtrate is washed repeatedly with water, evaporated, and the product is 2-(2-dibenzofuryl)-propanal, m.p. 52°–54°.

d. Under the exclusion of moisture, a solution of 9.1 g. of $CrO_3$, 13.5 g. of tert.-butanol, and 15.1 g. of $CH_3COOH$ in 150 ml. of absolute $CCl_4$ is gradually added dropwise to a solution of 22.6 of 2-(2-dibenzofuryl)-propanol in 200 ml. of absolute $CCl_4$ at 0°. The reaction mixture, after the tert.-butyl chromate solution has been added thereto dropwise, is allowed to stand for 24 hours at 25°. After working up as usual, 2-(2-dibenzofuryl)-propanol is obtained, m.p. 52°–54°.

EXAMPLE 4 a. 14 g. of powdered anhydrous $AlCl_3$ is added to a solution of 16.8 g. of dibenzofuran in 150 ml. of trichloroethylene; at 0°–5°, a solution of 8 g. of propylene oxide in 50 ml. of trichloroethylene is added dropwise to thhs mixture. The latter is agitated for 12 hours at 5°–10°, then decomposed by adding ice, worked up as usual, and the thus-obtained product is 2-(2-dibenzofuryl)-propanol, m.p. 48°–50°.

b. 5.3 g. of 2-(2-dibenzofuryl)-propanol is agitated in 40 ml. of 10% strength $H_2SO_4$ with 2.5 g. of sodium dichromate dihydrate for 2 hours at 60°. The reaction mixture is then cooled, worked up as usual, and chromatographic purification on silica gel yields 2-(2-dibenzofuryl)-propionic acid, m.p. 139°–140°.

c. Silver oxide, freshly prepared from 6.4 g. of $AgNO_3$ and 1.6 g. of NaOH in 50 ml. of water is added to a mixture of 4.5 g. of 2-(2-dibenzofuryl)-propanol and 4 g. of NaOH in 40 ml. of water. The mixture is refluxed for two hours, the thus-precipitated silver is filtered off, the filtrate is worked up as usual, and the product is 2-(2-dibenzofuryl)-propionic acid, m.p. 139°–140°.

EXAMPLE 5

14 g. of pulverized anhydrous $AlCl_3$ is added to a solution of 16.6 g. of dibenzofuran in 200 ml. of trichloroethylene; under cooling to below +5°, 7 g. of allyl alcohol in 20 ml. of trichloroethylene is added dropwise to the mixture. The latter is allowed to reach room temperature, agitated for 12 hours, decomposed by adding ice thereto, and worked up as usual, thus obtaining 2-(2-dibenzofuryl)-propanol, m.p. 48°–50°.

With 2-buten-1-ol, 2-(2-dibenzofuryl)-1-butanol is obtained.

EXAMPLE 6 a. A solution of 18.1 g. of the ethyl ester of 2-bromopropionic acid in 20 ml. of THF is added at 20° to a bis-(2-dibenzofuryl)-cadmium solution (obtained by adding 24.7 g. of 2-bromodibenzofuran in 300 ml. of THF dropwise to 2.5 g. of Mg filings in 100 ml. of THF under agitation and refluxing, adding 20 g. of cadmium chloride thereto, and refluxing for 10 minutes); the reaction mixture is allowed to stand for 24 hours at 20°. After working up as usual, 2-(2-dibenzofuryl)-propionic acid ethyl ester is thus obtained, b.p. 173°–177°/0.2 mm.

Analogously, the corresponding esters, e.g., the ethyl ester of 2-(2-dibenzothienyl)-propionic acid (b.p. 179°–183°/0.05 mm.) or the ethyl ester of 2-(8-methyl-2-dibenzofuryl)-propionic acid are obtained via the corresponding Grignard and organocadmium compounds, starting with
2-bromodibenzothiophene,
2-bromo-8-methyldibenzofuran,
2-bromo-8-ethyldibenzofuran,
2-bromo-8-n-propyldibenzofuran,
2-bromo-8-isopropyldibenzofuran,
2-bromo-8-n-butyldibenzofuran,
2-bromo-8-isobutyldibenzofuran,
2-bromo-8-sec.-butyldibenzofuran,
2-bromo-8-tert.-butyldibenzofuran,
2-bromo-8-methoxydibenzofuran,
2-bromo-8-ethoxydibenzofuran,
2-bromo-8-n-propoxydibenzofuran,
2-bromo-8-isopropoxydibenzofuran,
2-bromo-8-n-butoxydibenzofuran,
2-bromo-8-isobutoxydibenzofuran,
2-bromo-8-sec.-butoxydibenzofuran, or
2-bromo-8-tert.-butoxydibenzofuran.

b. At 20°–25°, a solution of 6.8 g. of 2-(2-dibenzofuryl)-propionic acid ethyl ester in 10 ml. of 1,2-dichloroethane is added dropwise to a mixture of 2.43 g. of acetyl chloride, 6.7 g. of aluminum chloride, and 40 ml. of 1,2-dichloroethane. After agitating the mixture for 3 hours at room temperature, it is poured onto ice water and worked up in the usual manner, thus producing the ethyl ester of 2-(8-acetyl-2-dibenzofuryl)-propionic acid.

Analogously, the following compounds are produced with propionyl chloride, butyryl chloride, and isobutyryl chloride, respectively:
the ethyl ester of 2-(8-propionyl-2-dibenzofuryl)-propionic acid
the ethyl ester of 2-(8-butyryl-2-dibenzofuryl)-propionic acid
the ethyl ester of 2-(8-isobutyryl-2-dibenzofuryl)-propionic acid
and the following compounds are prepared from 2-(2-dibenzofuryl)-propanol and from the ethyl ester of 2-dibenzothienylpropionic acid:
2-(8-acetyl-2-dibenzofuryl)-propanol
2-(8-propionyl-2-dibenzofuryl)-propanol
2-(8-butyryl-2-dibenzofuryl)-propanol
2-(8-isobutyryl-2-dibenzofuryl)-propanol
the ethyl ester of 2-(8-acetyl-2-dibenzothienyl)-propionic acid
the ethyl ester of 2-(8-propionyl-2-dibenzothienyl)-propionic acid
the ethyl ester of 2-(8-butyryl-2-dibenzothienyl)-propionic acid the ethyl ester of 2-(8-isobutyryl-2-dibenzothienyl)-propionic acid.

c. From the above-mentioned esters, the following compounds are produced by refluxing with KOH in ethanol for several hours:

2-(8-acetyl-2-dibenzofuryl)-propionic acid
2-(8-propionyl-2-dibenzofuryl)-propionic acid
2-(8-butyryl-2-dibenzofuryl)-propionic acid
2-(8-isobutyryl-2-dibenzofuryl)-propionic acid
2-(8-acetyl-2-dibenzothienyl)-propionic acid
2-(8-propionyl-2-dibenzothienyl)-propylonic acid
2-(8-butyryl-2-dibenzothienyl)-propionic acid
2-(8-isobutyryl-2-dibenzothienyl)-propionic acid.

d. A mixture of 10 g. of 2-(8-acetyl-2-dibenzofuryl)-propionic acid, 15 ml. of 60% hydrazine hydrate, 6.5 g. of pulverized KOH, and 100 ml. of ethylene glycol is refluxed on a water trap for 6 hours. Then, the mixture is dissolved in water, acidified with hydrochloric acid, and worked up as usual, thus obtaining 2-(8-ethyl-2-dibenzofuryl)-propionic acid, m.p. 89°–91°.

Analogously, the following compounds are produced by reducing the corresponding 2-(8-alkanoyl-2-dibenzofuryl)-propionic acids or -propanols or the 2-(8-alkanoyl-2-dibenzothienyl)-propionic acids:

2-(8-n-propyl-2-dibenzofuryl)-propionic acid
2-(8-n-butyl-2-dibenzofuryl)-propionic acid
2-(8-isobutyl-2-dibenzofuryl)-propionic acid
2-(8-ethyl-2-dibenzofuryl)-propanol
2-(8-n-propyl-2-dibenzofuryl)-propanol
2-(8-n-butyl-2-dibenzofuryl)-propanol
2-(8-isobutyl-2-dibenzofuryl)-propanol
2-(8-ethyl-2-benzothienyl)-propionic acid
2-(8-n-propyl-2-benzothienyl)-propionic acid
2-(8-n-butyl-2-benzothienyl)-propionic acid
2-(8-isobutyl-2-benzothienyl)-propionic acid.

EXAMPLE 7 a. A solution of 2-dibenzofuryllithium (obtained from 24.7 g. of 2-bromodibenzofuran and 1.4 g. of lithium in 300 ml. of ether) is added to a solution of 12.2 g. of 9-borabicyclo[3,3,1]nonane in 100 ml. of THF at 0°. The reaction mixture is agitated for 1 hour at 0°, 9.5 g. of methanesulfonic acid is added thereto, the mixture is stirred for another hour, and thereafter a solution of 18 g. of the ethyl ester of 2-bromopropionic acid (or 22.8 g. of the ethyl ester of 2-iodopropionic acid) in 50 ml. of ether is added thereto, and subsequently a suspension of 25 g. of potassium tert.-butylate in 100 ml. of tert.-butanol is furthermore added to this reaction mixture. The latter is maintained at 10° for 24 hours, acidified with 500 ml. of 6N hydrochloric acid, refluxed for 6 hours, cooled, and worked up as usual, thus producing 2-(2-dibenzofuryl)-propionic acid, m.p. 139°–140°.

(b) 6 g. of thionyl chloride and 11 g. of 2-(2-dibenzofuryl)-propionic acid are allowed to stand in 80 ml. of benzene for 24 hours at 25°. The mixture is then evaporated under reduced pressure; the thus-obtained residue is 2-(2-dibenzofuryl)-propionyl chloride.

c. One gram of crude 2-(2-dibenzofuryl)-propionyl chloride is heated with 10 ml. of n-propanol for 3 hours to 95°. The mixture is evaporated, worked up as usual, and the product is the n-propyl ester of 2-(2-dibenzofuryl)-propionic acid.

d. 2.6 g. of crude 2-(2-dibenzofuryl)-propionyl chloride is dissolved in 30 ml. of absolute THF and mixed with 1.12 g. of potassium tert.-butylate. The mixture is stirred for 30 minutes at 20°, filtered, evaporated, and worked up as usual, thus obtaining the tert.-butyl ester of 2-(2-dibenzofuryl)-propionic acid.

e. A solution of 1 g. of 2-(2-dibenzofuryl)-propionyl chloride in 10 ml. of THF is added dropwise under cooling to 15 ml. of concentrated aqueous $NH_3$ solution. The mixture is agitated for 2 hours, evaporated, and worked up as usual, thus producing 2-(2-dibenzofuryl)-propionamide, m.p. 180°–182°.

f. A suspension of 2.39 g. of 2-(2-dibenzofuryl)-propionic acid amide in 40 ml. of pyridine is mixed at room temperature with 2.85 g. of p-toluenesulfonic acid chloride and then stirred for 45 hours at 60°. The mixture is poured onto water, extracted with ethyl acetate, and worked up as usual, thus producing 2-(2-dibenzofuryl)-propionitrile, m.p. 58°–61°.

g. At 0°, 60 ml. of a 1.1-molar ether $LiAlH_4$ solution is added dropwise during 20 minutes to a solution of 26.5 g. of 2-(2-dibenzofuryl)-propionyl aziridine (obtainable by reacting 2-(2-dibenzofuryl)-propionyl chloride with ethylenimine) in 800 ml. of absolute ether. The reaction mixture is agitated for 1.5 hours at 0°, then hydrolyzed by adding dilute sulfuric acid, worked up as usual, the product being 2-(2-dibenzofuryl)-propanal, m.p. 52°–54°.

h. At −70° to −80°, a solution of 25.5 g. of lithium aluminum tri-tert.-butoxyhydride in 150 ml. of absolute diglyme is added dropwise within 1 hour to a solution of 25.85 g. of 2-(2-dibenzofuryl)-propionyl chloride in 100 ml. of absolute diglyme under agitation and introduction of dry nitrogen. The temperature of the mixture is allowed to rise to 20° within 1 hour. The mixture is then poured onto ice and worked up as usual, thus obtaining 2-(2-dibenzofuryl)-propanal, m.p. 52°–54°.

i. 25.85 g. of 2-(2-dibenzofuryl)-propionyl chloride is hydrogenated on 7 g. of 2% Pd-$BaSO_4$ catalyst in 500 ml. of toluene until the stoichiometric amount of hydrogen has been absorbed. The reaction mixture is worked up as usual, thus obtaining 2-(2-dibenzofuryl)-propanal, m.p. 52°–54°.

j. 12.9 g. of 2-(2-dibenzofuryl)-propionyl chloride is dissolved in 150 ml. of ether and gradually added dropwise to a suspension of 2 g. of $LiAlH_4$ in 100 ml. of ether. The mixture is agitated for 4 hours at 25°, decomposed with methanol, and then with 15% aqueous sodium hydroxide solution, worked up as usual, and the product is 2-(2-dibenzofuryl)-propanol, m.p. 48°–50°.

EXAMPLE 8 a. 2.47 g. of 2-bromodibenzofuran is allowed to react with 0.5 g. of magnesium filings in 60 ml. of absolute THF, heating and adding a trace of iodine; 10 g. of potassium 2-iodopropionate is added thereto in incremental portions, and the mixture is refluxed for 20 hours under agitation. Thereafter, the mixture is evaporated to dryness, worked up as usual, and 2-(2-dibenzofuryl)-propionic acid is thus obtained, m.p. 139°–140°.

b. 9.6 g. of 2-(2-dibenzofuryl)-propionic acid is dissolved in 75 ml. of absolute THF and mixed with 3.5 ml. of triethylamine. At −10°, a solution of 2.4 ml. of ethyl chloroformate in 16 ml. of THF is added dropwise within 15 minutes; the mixture is stirred for 30 minutes at −10°, and 1.9 g. of $NaBH_4$ is introduced into the solution containing the mixed anhydride of of monoethyl carbonate and the aforementioned acid, 2-(2-dibenzofuryl)-4,6-dioxaoctane-3,5-dione. The mixture is thereafter agitated for 90 minutes at 25°, 40 ml. of water is added, the mixture is extracted with ether, evaporated, and the thus-obtained remainder is refluxed for 30 minutes with a solution of 1 g. of KOH in 30 ml. of ethanol. After distilling off the ethanol, working up the reaction mixture as usual, and chromatography on $Al_2O_3$, 2-(2-dibenzofuryl)-propanol, m.p. 48°–50°, is obtained.

EXAMPLE 9

A solution of 22 g. of 2-chloropropylmethyl ether in 80 ml. of absolute benzene is added to a solution prepared from 2.6 of magnesium filings and 24.7 g. of 2-bromodibenzofuran in 120 ml. of absolute ether; the ether is evaporated, and the residue is refluxed for 12 hours. After decomposition with aqueous $NH_4Cl$ solution and working up as usual, 2-(2-dibenzofuryl)-propylmethyl ether is obtained.

EXAMPLE 10

Under agitation and cooling to 0°–5°, a solution of 5.8 g. of propylene oxide in 10 ml. of absolute ether is added to a solution obtained from 2.6 g. of magnesium filings and 24.7 g. of 2-bromodibenzofuran in 120 ml. of absolute ether; the reaction mixture is allowed to stand overnight. Then, 80 ml. of benzene is added thereto, the ether is distilled off, and the benzenic solution is refluxed for one hour. After decomposition with aqueous $NH_4Cl$ solution and the usual working-up operation, 2-(2-dibenzofuryl)propanol is produced, m.p. 48°–50°.

EXAMPLE 11

Under agitation, 25 g. of potassium iodopropionate is reacted with 0.85 g. of magnesium filings, while adding traces of iodine, by refluxing for 6 hours in 350 ml. of absolute THF; 5 g. of 2-bromodibenzofuran is added thereto, and the mixture is refluxed for another 24 hours. After evaporation to dryness, the product is worked up as usual, thus obtaining 2-(2-dibenzofuryl)-propionic acid, m.p. 139°–140°.

EXAMPLE 12

A solution of 22.6 g. of 2-dibenzofurylacetic acid in 250 ml. of hexamethylphosphoric triamide is treated with 50 ml. of a 4N solution of propylmagnesium bromide in ether and then with 30 g. of methyl iodide. The mixture is heated for 15 minutes to 65°, poured into dilute hydrochloric acid, extracted with hexane, and the extract is evaporated to dryness. The residue is refluxed with 20 g. of NaOH in 75 ml. of water for 1 hour, then acidified with HCl, filtered off, and the product thus produced is 2-(2-dibenzofuryl)-propionic acid, m.p. 139°–140°.

EXAMPLE 13

1.5 g. of methyl iodide is added to a mixture of 2.8 g. of the tert.-butyl ester of 2-dibenzofurylacetic acid (obtainable by reacting the acid chloride with potassium tert.-butylate), 0.3 g. of NaH, and 20 ml. of 1,2-dimethoxyethane, agitated for 15 minutes at 20°; this mixture is then stirred for 12 hours at 20°, diluted with ether, worked up as usual, and the product is the tert.-butyl ester of 2-(2-dibenzofuryl)-propionic acid. The thus-obtained crude product is heated for 30 minutes to 260°, thus producing 2-(2-dibenzofuryl)-propionic acid, m.p. 139°–140°.

EXAMPLE 14

25 g. of methyl iodide is added to a mixture of 24 g. of the methyl ester of 2-dibenzofurylacetic acid and 2.5 g. of NaH in 150 ml. of 1,2-dimethoxyethane after 15 minutes of agitation at 20°. The reaction mixture is allowed to stand for several hours and worked up as usual, thus obtaining the methyl ester of 2-(2-dibenzofuryl)-propionic acid.

EXAMPLE 15 a. Under a nitrogen atmosphere, a solution of 20.7 g. of 2-dibenzofurylacetonitrile in 40 ml. of DMSO is added dropwise under agitation and cooling to 2.6 g. of NaH in 20 ml. of DMSO. The mixture is stirred for 1 hour at 25°, 14.6 g. of methyl iodide in 20 ml. of DMSO is added dropwise under agitation at the same temperature, the reaction mixture is stirred overnight at 25°, mixed with dilute acetic acid, and worked up as usual, thus obtaining 2-(2-dibenzofuryl)-propionitrile, m.p. 58°–61°.

b. 22.1 g. of 2-(2-dibenzofuryl)-propionitrile and 4.6 g. of absolute ethanol are dissolved in 300 ml. of absolute ether and saturated with gaseous HCl at 0°. The 2-(2-dibenzofuryl)-propionic acid iminoethyl ether hydrochloride, separated after standing for 8 days at 0°, is filtered off.

c. One gram of 2-(2-dibenzofuryl)-propionic acid iminoethyl ether hydrochloride is refluxed with 25 ml. of water for one hour. After working up as usual, the ethyl ester of 2-(2-dibenzofuryl)-propionic acid is obtained, b.p. 173°–177°/0.2 mm.

EXAMPLE 16 a. A solution of 1 g. of $CH_3Li$ in 40 ml. of absolute THF is added dropwise to a solution of 2.86 g. of 2-dibenzofuryl bromoacetonitrile (obtainable by the bromination of 2-dibenzofurylacetonitrile) in 40 ml. of absolute THF. Thereafter, the reaction mixture is refluxed for 1 hour, cooled, decomposed with saturated $NH_4Cl$ solution, and extracted with ethyl acetate. After working up as usual, 2-(2-dibenzofuryl)-propionitrile is produced, m.p. 58–61°.

b. One gram of 2-(2-dibenzofuryl)-propionitrile is refluxed in 15 ml. of ethanol and 2 ml. of water with 2 g. of KOH for 40 hours. The mixture is evaporated and the residue worked up as usual, thus producing 2-(2-dibenzofuryl)-propionic acid, m.p. 139°–140°.

c. One gram of 2-(2-dibenzofuryl)-propionitrile is refluxed with 6 ml. of acetic acid and 6 ml. of concentrated hydrochloric acid for 2 hours under a nitrogen atmosphere. The reaction mixture is evaporated, the residue is dissolved in dilute NaOH, washed with ether, and worked up as usual, thus obtaining 2-(2-dibenzofuryl)-propionic acid, m.p. 139–140°.

d. One gram of 2-(2-dibenzofuryl)-propionitrile is refluxed for 48 hours with 3 ml. of n-hexanol and 0.1 g. of concentrated $H_2SO_4$. To this mixture is added 3 ml. of water, the mixture is refluxed for another 48 hours, and worked up as usual, thus producing 2-(2-dibenzofuryl)-propionic acid, m.p. 139°–140°.

EXAMPLE 17 a. At −20°, a dry stream of $CO_2$ is introduced into a solution of 1-(2-dibenzofuryl)-ethyllithium (obtainable by adding dropwise 35 ml. of a 20% solution of n-butyllithium in hexane to a solution of 27.5 g. of 2-(1-bromoethyl)-dibenzofuran in 300 ml. of absolute ether under cooling to −60° and agitating the mixture for one-half hour at −60°). After 2 hours, the mixture is poured into water, acidified, and worked up as usual, yielding 2-(2-dibenzofuryl)-propionic acid, m.p. 139°–140°.

2-(1-Bromoethyl)-dibenzofuran is obtainable by the reduction of 2-acetyldibenzofuran with NaBH$_4$ to 2-(1-hydroxyethyl)dibenzofuran and subsequent reaction with aqueous HBr solution.

Analogously, the corresponding carboxylic acids, for example 2-(8-methyl-2-dibenzofuryl)-propionic acid, are obtained via the corresponding lithium compounds from the following starting substances:

2-(1-bromoethyl)-dibenzothiophene
2-(1-bromoethyl)-8-methyldibenzofuran
2-(1-bromoethyl)-8-ethyldibenzofuran
2-(1-bromoethyl)-8-n-propyldibenzofuran
2-(1-bromoethyl)-8-isopropyldibenzofuran
2-(1-bromoethyl)-8-n-butyldibenzofuran
2-(1-bromoethyl)-8-isobutyldibenzofuran
2-(1-bromoethyl)-8-sec.-butyldibenzofuran
2-(1-bromoethyl)-8-tert.-butyldibenzofuran
2-(1-bromoethyl)-8-methoxydibenzofuran
2-(1-bromoethyl)-8-ethoxydibenzofuran
2-(1-bromoethyl)-8-n-propoxydibenzofuran
2-(1-bromoethyl)-8-isopropoxydibenzofuran
2-(1-bromoethyl)-8-n-butoxydibenzofuran
2-(1-bromoethyl)-8-isobutoxydibenzofuran
2-(1-bromoethyl)-8-sec.-butoxydibenzofuran
2-(1-bromoethyl)-8-tert.-butoxydibenzofuran
2-(1-bromopropyl)-dibenzofuran
2-(1-bromobutyl)-dibenzofuran
2-(1-bromo-2-methylpropyl)-dibenzofuran
2-(1-bromopentyl)-dibenzofuran
2-(1-bromo-3-methylbutyl)-dibenzofuran.

b. 24 g. of 2-(2-dibenzofuryl)-propionic acid is heated in 250 ml. of absolute benzene with 15 g. of POCl$_3$ for 15 minutes on a steam bath. After cooling, the reaction mixture is mixed with 120 ml. of concentrated aqueous NH$_3$. The benzene solution is separated and concentrated, thus obtaining 2-(2-dibenzofuryl)-propionamide, m.p. 180°–182°.

Analogously, by reacting the acids of Formula I (R$_1$ = COOH) with POCl$_3$ and subsequent reaction with methylamine, benzylamine and/or aniline, the corresponding amides are produced, for example 2-(2-dibenzofuryl)-propionic acid methylamide
2-(2dibenzofuryl)-propionic acid benzylamide
2-(2-dibenzofuryl)-propionic acid anilide.

EXAMPLE 18

1.2 g. of magnesium filings and 1.2 g. of powdered magnesium are heated under agitation in 60 ml. of absolute ether; a moderate stream of dry CO$_2$ is introduced, a granule of iodine is added thereto, and a solution of 2.3 g. of 2-(1-chloroethyl)-dibenzofuran (obtainable from 2-(1-hydroxyethyl)-dibenzofuran and SOCl$_2$) in 20 ml. of absolute ether is added dropwise thereto. The reaction mixture is refluxed for 20 minutes, cooled, filtered, evaporated, water is added, and the mixture is worked up as usual, thus obtaining 2-(2-dibenzofuryl)-propionic acid, m.p. 139°–140°.

EXAMPLE 19 a. A solution of 27.5 g. of 2-(1-bromoethyl)-dibenzofuran in 200 ml. of THF is gradually added under agitation to a mixture of 2.6 g. of pulverized magnesium and 200 ml. of THF at 45°. The mixture is stirred for 15 minutes, filtered, and the solution is poured on 1 kg. of solid carbon dioxide, allowed to warm up to 20°, the solvent is removed, and the mixture is worked up as usual, thus producing 2-(2-dibenzofuryl)-propionic acid, m.p. 139°–140°.

As the starting material, it is also possible to employ equivalent amounts of 1-(2-dibenzofuryl)-1-ethylmagnesium iodide
1-(2-dibenzofuryl)-1-ethylmagnesium chloride
1-(2-dibenzofuryl)-1-ethyllithium
1-(2-dibenzofuryl)-1-ethylzinc
1-(2-dibenzofuryl)-1-ethylcadmium
1-(2-dibenzofuryl)-1-ethylsodium
1-(2-dibenzofuryl)-1-ethylpotassium.

b. 24 g. of 2-(2-dibenzofuryl)-propionic acid is dissolved with 14 ml. of triethylamine in 260 ml. of chloroform and cooled to −10°. Within 15 minutes, a solution of 9.5 ml. of ethyl chloroformate in 60 ml. of chloroform is added dropwise, and the reaction mixture is stirred for 30 minutes at −10° to −15°, with ammonia being introduced until saturation. After 1 hour of agitation at 0° to −10°, the solvent is removed by evaporation; the residue is mixed with water and worked up as usual, thus obtaining 2-(2-dibenzofuryl)-propionamide, m.p. 180°–182°.

Analogously, the corresponding amides are obtained from the corresponding acids of Formula I (R$_1$ = COOH) by successive reaction with ethyl chloroformate and ammonia, methylamine, ethylamine, n-propylamine, n-butylamine, ethanolamine, cyclohexylamine, pyrrolidine, piperidine, and morpholine, respectively; for example:

2-(2-dibenzofuryl)-propionic acid methylamide
2-(2-dibenzofuryl)-propionic acid ethylamide
2-(2-dibenzofuryl)-propionic acid n-propylamide
2-(2-dibenzofuryl)-propionic acid n-butylamide
2-(2-dibenzofuryl)-propionate acid (2-hydroxyethylamide)
2-(2-dibenzofuryl)-propionic acid cyclohexylamide
2-(2-dibenzofuryl)-propionic acid pyrrolidide
2-(2-dibenzofuryl)-propionic acid piperidide
2-(2-dibenzofuryl)-propionic acid morpholide.

c. 30 g. of the (2-chloroethyl ester) of 2-(2-dibenzofuryl)-propionic acid (obtainable by dissolving 2-(2-dibenzofuryl)propionamide in 2-chloroethanol and introducing gaseous HCl for 5 hours at 100°) is heated with 15 g. of diethylamine in 120 ml. of absolute benzene in a tube to 100° for 10 hours. The thus-precipitated diethylamine hydrochloride is filtered, and the filtrate is evaporated, thus obtaining the (2-diethylaminoethyl ester) of 2-(2-dibenzofuryl)-propionic acid, b.p. 180°–183°/0.1 mm.

EXAMPLE 20

20 g. of the tetraethyl ester of orthocarbonic acid is added to a solution of 1-(2-dibenzofuryl)-1-ethylmagnesium bromide (produced from 27.5 g. of 2-(1-bromoethyl)-dibenzofuran) in 300 ml. of THF, and the mixture is stirred for 4 hours at 25°. An excess of semiconcentrated hydrochloride acid is gradually added thereto, the mixture is refluxed for 24 hours, allowed to cool, worked up as usual, and the product thus obtained is 2-(2-dibenzofuryl)propionic acid, m.p. 139°–140°.

EXAMPLE 21

A Grignard solution produced from 27.5 g. of 2-(1-bromoethyl)-dibenzofuran in 200 ml. of THF is added gradually to a solution of 12 g. of ethyl chloroformate in 200 ml. of THF. To this mixture is added 150 ml. of concentrated hydrochloric acid; the reaction mixture is refluxed for 24 hours, worked up as usual, and the product thus obtained is 2-(2-dibenzofuryl)-propionic acid, m.p. 139°–140°.

EXAMPLE 22

A Grignard solution, prepared from 23 g. of 2-(1-chloroethyl)-dibenzofuran in 500 ml. of absolute ether is added dropwise to a solution of 16 g. of N-ethoxymethylene aniline in 100 ml. of absolute ether. The reaction mixture is then refluxed for one-half hour, the ether is removed by evaporation, the residue is decomposed with ice and hydrochloric acid, and worked up as usual, yielding 2-(2-dibenzofuryl)-propanal, m.p. 52°–54°.

EXAMPLE 23

27.5 g. of 2-(1-bromoethyl)-dibenzofuran is converted into the Grignard compound with 2.6 g. of magnesium filings in 400 ml. of ether. Within 15 minutes, 15 g. of triethyl orthoformate is added dropwise to the Grignard compound, the the mixture is agitated for 10 hours at 25°. The ether is replaced by benzene, and the mixture is heated for 3 hours at 75°. After decomposition with $NH_4Cl$ solution and the usual working-up step, 2-(2-dibenzofuryl)-propanal diethylacetal is obtained.

EXAMPLE 24

27.5 g. of 2-(1-bromoethyl)-dibenzofuran is reacted in 200 ml. of absolute ether together with 2.6 g. of magnesium filings. A solution of 8 g. of chloromethyl methyl ether in 100 ml. of absolute ether is gradually added dropwise to the thus-obtained Grignard solution. The mixture is refluxed for 2 hours, aqueous $NH_4Cl$ solution is added thereto, and the mixture is worked up as usual, thus producing 2-(2-dibenzofuryl)-propylmethyl ether.

EXAMPLE 25 a. 27.5 g. of 2-(1-bromoethyl)-dibenzofuran is added within 15 minutes at 60° and under agitation to a mixture of 5.5 g. of NaCN and 40 ml. of DMSO. The mixture is heated for 6 hours to 70° and worked up as usual, yielding 2-(2-dibenzofuryl)-propionitrile, m.p. 58°–61°.

b. 2.21 g. of 2-(2-dibenzofuryl)-propionitrile is dissolved in 15 ml. of sulfuric acid and allowed to stand overnight at 25°. The mixture is then poured on ice water, sodium hydroxide solution is added to a pH of 8, and the product is 2-(2-dibenzofuryl)-propionamide, m.p. 180°–182°.

c. 2.4 g. of 2-(2-dibenzofuryl)-propionamide and 5 g. of KOH are refluxed in 100 ml. of ethanol under $N_2$ for 3 hours. The mixture is concentrated by evaporation and worked up as usual, producing 2-(2-dibenzofuryl)-propionic acid, m.p. 139°–140°.

d. A mixture of 1 g. of 2-(2-dibenzofuryl)-propionamide, 2 ml. of concentrated hydrochloride acid, and 2 ml. of acetic acid is refluxed for 48 hours and, after adding water thereto, worked up as usual, yielding 2-(2-dibenzofuryl)-propionic acid, m.p. 139°–140°.

e. Under $N_2$ at 25°, 22.1 g. of 2-(2-dibenzofuryl)propionitrile in 350 ml. of absolute ether is added dropwise within 1 hour to a solution of 16.5 g. of diisobutylaluminum hydride in 350 ml. of absolute ether. The reaction mixture is agitated for 2 hours at 25°, decomposed with aqueous $NH_4Cl$ solution, and worked up as usual, yielding 2-(2-dibenzofuryl)-propanal, m.p. 52°–54°.

EXAMPLE 26

28.2 g. of 2-oxo-3-(2-dibenzofuryl)-butyric acid (obtainable by condensation of 2-acetyldibenzofuran with acetylglycine to 2-methyl-4-[1-(2-dibenzofuryl)-ethylidene]-5-oxazolone and alkaline hydrolysis) is dissolved in 280 ml. of 5% sodium hydroxide solution. The mixture is cooled to 0°, and a solution of 150 ml. of 10% $H_2O_2$ is added dropwise thereto under agitation at 5°–10°. The mixture is agitated for 2 hours at 5° and for 24 hours at 20° and worked up as usual, producing 2-(2-dibenzofuryl)-propionic acid, m.p. 139°–140°.

EXAMPLE 27 a. A mixture of 22.6 g. of 2-(2-dibenzofuryl)-2-propanol (obtainable from 2-acetyldibenzofuran and $CH_3MgI$ with subsequent hydrolysis), 10 g. of sulfur, and 17.4 g. of morpholine is refluxed for 18 hours. The excess morpholine is removed under reduced pressure, and the residue is refluxed with 100 ml. of concentrated hydrochloric acid and 100 ml. of acetic acid for 4 hours. The mixture is then poured into water and worked up as usual, thus obtaining 2-(2-dibenzofuryl)-propionic acid, m.p. 139°–140°.

Equivalent amounts of 2-(2-propenyl)-dibenzofuran or 2-(2-dibenzofuryl)-1,2-propylene oxide can also be employed as the starting substance.

Analogously, with the use of 2-(8-methyl-2-dibenzofuryl)-2-propanol, 2-(8-ethyl-2-dibenzofuryl)-2-propanol, and 2-(2-dibenzofuryl)-2-butanol, respectively, the following final products are obtained:

2-(8-methyl-2-dibenzofuryl)-propionic acid,
2-(8-ethyl-2-dibenzofuryl)-propionic acid, and
2-(2-dibenzofuryl)-butyric acid, respectively.

b. 24 g. of 2-(2-dibenzofuryl)-propionic acid is dissolved in a mixture of 100 ml. of dioxane, 5.6 g. of KOH, and 40 ml. of water and then mixed dropwise and under agitation at 5°–7° with a solution of 16 g. of bromine in 160 ml. of dioxane (duration about 2 hours). The mixture is evaporated, the residue is dissolved in 150 ml. of water and worked up as usual, yielding 2-(8-bromo-2-dibenzofuryl)-propionic acid, m.p. 174°–176°.

Analogously, the corresponding bromine compounds of Formula I are obtained from the corresponding unsubstituted compounds by bromination, for example:

2-(8-bromo-2-dibenzofuryl)-butyric acid.

c. A solution of 2.4 g. of 2-(2-dibenzofuryl)-propionic acid in the minimum amount of ether is treated with dry chlorine; the progression of the chlorination is controlled by means of thin-layer chromatography. After termination of the reaction, the mixture is filtered, the filtrate is evaporated, and the residue is chromatographed on silica gel, thus producing 2-(8-chloro-2-dibenzofuryl)-propionic acid.

Analogously, the chlorine compounds of Formula I are obtained by the chlorination of the corresponding unsubstituted compounds.

d. A solution of 5 g. of 2-(2-dibenzofuryl)-propionic acid in 120 ml. of acetic acid is treated with 0.745 g. of chlorine at 25°–30°. After working up the mixture as usual, 2-(8-chloro-2-dibenzofuryl)-priopionic acid is produced.

e. A mixture of 2.75 g. of 2-(8-chloro-2-dibenzofuryl)-propionic acid, 3 g. of sodium methylate, 1 g. of $Cu_2I_2$, and 30 ml. of collidine is refluxed for 6 hours, acidified with hydrochloric acid, and worked up as usual, yielding 2-(8-methoxy-2-dibenzofuryl)-propionic acid.

Analogously, the corresponding 2-(8-alkoxy-2-dibenzofuryl)-propionic acids are obtained with sodium ethylate, propylate, isopropylate, n-butylate, or isobutylate.

f. 1.4 ml. of 100% nitric acid is added to a mixture of 4.8 g. of 2-(2-dibenzofuryl)-propionic acid, 2.5 g. of iodine, and 40 ml. of chloroform; the mixture is refluxed for 4 hours and worked up as usual, producing 2-(8-iodo-2-dibenzofuryl)-propionic acid, m.p. 168°–170° (ethyl acetate/hexane).

g. 3.19 g. of 2-(8-bromo-2-dibenzofuryl)-propionic acid, 3 g. of $Cu_2Cl_2$, and 50 ml. of 25% strength aqueous $NH_3$ solution are heated in an autoclave under agitation to 200°–210° for 10 hours and then worked up as usual, obtaining 2-(8-amino-2-dibenzofuryl)-propionic acid.

h. A mixture of 3.66 g. of 2-(8-iodo-2-dibenzofuryl)-propionic acid, 15 g. of iodotrifluoromethane, 5 g. of copper powder, and 5 ml. of DMF is heated in an autoclave under agitation to 120°–130° for 15 hours and then worked up, yielding 2-(8-trifluoromethyl-2-dibenzofuryl)-propionic acid.

i. A mixture of 3.19 g. of 2-(8-bromo-2-dibenzofuryl)-propionic acid, 1.2 g. of CuCN, and 2 ml. of pyridine is heated for 15 hours to 220°. After working the mixture up as usual, 2-(8-cyano-2-dibenzofuryl)-propionic acid is obtained.

EXAMPLE 28

A solution of 20.8 g. of 2-(2-propenyl)-dibenzofuran (obtainable by reacting 2-acetyldibenzofuran with $CH_3MgI$, hydrolysis, and splitting off water) in 200 ml. of ether is treated with a solution of diborane in THF until analysis by thin-layer chromatography indicates the end of the reaction. The mixture is then treated at 0° with 20 g. of $CrO_3$ in 100 ml. of water, and 20 ml. of acetic acid is added in incremental portions within 30 minutes. After 2 hours of agitation at 20°, the mixture is diluted with water and worked up as usual, yielding 2-(2-dibenzofuryl)-propionic acid, m.p. 139°–140°.

Analogously,
2-(8-methyl-2-dibenzofuryl)-propionic acid and 2-(2-dibenzofuryl)-butyric acid, m.p.140°–143°, respectively,
are obtained from 2-(2-propenyl)-8-methyldibenzofuran and 2-(1-buten-2-yl)-dibenzofuran, respectively.

EXAMPLE 29

20.8 g. of 2-(2-propenyl)-dibenzofuran is dissolved in 50 ml. of diglyme and mixed with 30 ml. of a 1-molar solution of $NaBH_4$ in diglyme. Under agitation and while introducing $N_2$, a solution of 5.6 g. of freshly distilled $BF_3$ etherate in 12 ml. of diglyme is gradually added dropwise to this solution within 30 minutes. The reaction mixture is then mixed with 7 ml. of water, and 14 ml. of a 3N NaOH solution as well as 14 ml. of 30% $H_2O_2$ are thereafter added dropwise at 80°–100°. The mixture is cooled, mixed with ice water, and worked up as usual, thus producing 2-(2-dibenzofuryl)-propanol, m.p. 48°–50°.

EXAMPLE 30

2.89 g. of 2-(1-bromo-2-propyl)-dibenzofuran is reacted with 0.26 g. of magnesium filings in 100 ml. of ether. The mixture is cooled to −5°, oxygen is introduced for 4 hours, and the mixture is combined with aqueous $NH_4Cl$ solution. The usual working-up step yields 2-(2-dibenzofuryl)-propanol, m.p. 48°–50°.

EXAMPLE 31

26.6 g. of 4-(2-dibenzofuryl)-2-pentenic acid (obtainable by reacting 2-acetyldibenzofuran with acrylonitrile in the presence of triphenylphosphine and subsequent saponification of the thus-produced 4-(2-dibenzofuryl)-2-pentenic acid nitrile) is dissolved in 300 ml. of absolute $CH_2Cl_2$. At −70°, a 3% ozone/oxygen mixture is introduced until a dilute bromine solution is no longer decolorized by the reaction solution. The reaction mixture is gently evaporated, the residue is stirred into 200 ml. of acetic acid with 10 g. of zinc dust and agitated for 4 hours at 25°, then filtered, and the filtrate is worked up as usual, thus obtaining 2-(2-dibenzofuryl)-propanal, m.p. 52°–54°.

EXAMPLE 32 a. One gram of crude 2-(2-dibenzofuryl)-acrylic acid (obtainable by refluxing the ethyl ester thereof with aqueous ethanolic KOH) is dissolved in 25 ml. of dioxane, mixed with 0.1 g. of $PtO_2$ and hydrogenated at 20° and under normal pressure until the absorption of hydrogen is terminated. The reaction product is filtered, evaporated, and 2-(2-dibenzofuryl)-propionic acid is thus obtained, m.p. 139°–140° (ethyl acetate/hexane). Sodium salt (obtainable by dissolving molar amounts of the acid and NaOH in ethanol and evaporation), m.p. 277°–280°.

In place of the dioxane, it is also possible to use ethyl acetate, and in place of $PtO_2$, 5% Pd/C can also be employed.

Analogously, the corresponding acids of Formula I ($R_1$ = COOH) are obtained by the hydrogenation of
2-(2-dibenzothienyl)-acrylic acid
2-(8-methyl-2-dibenzofuryl)-acrylic acid
2-(8-ethyl-2-dibenzofuryl)-acrylic acid
2-(8-n-propyl-2-dibenzofuryl)-acrylic acid
2-(8-isopropyl-2-dibenzofuryl)-acrylic acid
2-(8-n-butyl-2-dibenzofuryl)-acrylic acid  2-(8-isobutyl-2-dibenzofuryl)-acrylic acid
2-(8-sec.-butyl-2-dibenzofuryl)-acrylic acid
2-(8-tert.-butyl-2-dibenzofuryl)-acrylic acid
2-(8-methoxy-2-dibenzofuryl)-acrylic acid
2-(8-ethoxy-2-dibenzofuryl)-acrylic acid
2-(8-n-propoxy-2-dibenzofuryl)-acrylic acid
2-(8-isopropoxy-2-dibenzofuryl)-acrylic acid
2-(8-n-butoxy-2-dibenzofuryl)-acrylic acid
2-(8-isobutoxy-2-dibenzofuryl)-acrylic acid
2-(8-sec.-butoxy-2-dibenzofuryl)-acrylic acid
2-(8-tert.-butoxy-2-dibenzofuryl)-acrylic acid
2-(8-fluoro-2-dibenzofuryl)-acrylic acid
2-(8-chloro-2-dibenzofuryl)-acrylic acid
2-(8-bromo-2-dibenzofuryl)-acrylic acid
2-(8-iodo-2-dibenzofuryl)-acrylic acid 2-(8-hydroxy-2-dibenzofuryl)-acrylic acid
2-(2-dibenzofuryl)-2-butenic acid
2-(2-dibenzofuryl)-2-pentenic acid
2-(2-dibenzofuryl)-3-methyl-2-butenic acid
2-(2-dibenzofuryl)-2-hexenic acid
2-(2-dibenzofuryl)-4-methyl-2-pentenic acid.

b. One gram of 2-(2-dibenzofuryl)-propionic acid is allowed to stand in 15 ml. of methanolic hydrochloric acid for 24 hours at room temperature. The reaction mixture is evaporated, worked up as usual, and the product is the methyl ester of 2-(2-dibenzofuryl)-propionic acid.

Analogously (reaction times of up to 3 days), the products set forth below are obtained from the corresponding acids by reaction with HCl in methanol, ethanol, n-propanol, iso-propanol, n-butanol, isobutanol, sec.-butanol, n-pentanol, iso-pentanol, n-hexanol, n-heptanol, n-octanol, 2-ethylhexanol, n-nonanol, n-decanol, and n-dodecanol, respectively:

the corresponding methyl, ethyl, n-propyl, isopropyl, n-butyl, isobutyl, sec.-butyl, n-pentyl, isopentyl, n-hexyl, n-heptyl, n-octyl, 2-ethylhexyl, n-nonyl, n-decyl, and n-dodecyl esters, respectively, for example the following esters of 2-(2-dibenzofuryl)-propionic acid:
ethyl ester, b.p. 173°–177°/0.2 mm.,
n-propyl ester,
isopropyl ester,
n-butyl ester,
isobutyl ester,
sec.-butyl ester,
n-pentyl ester,
isopentyl ester,
n-hexyl ester,
n-heptyl ester,
n-octyl ester,
2-ethylhexyl ester,
n-nonyl ester,
n-decyl ester, and
n-dodecyl ester, as well as
the following esters of 2-(2-dibenzothienyl)-propionic acid:
n-propyl ester,
isopropyl ester,
n-butyl ester,
isobutyl ester,
sec.-butyl ester,
n-pentyl ester,
isopentyl ester,
n-hexyl ester,
n-heptyl ester,
n-octyl ester,
2-ethylhexyl ester,
n-nonyl ester,
n-decyl ester, and
n-dodecyl ester.

With 2-(2-dibenzofuryl)-propanol in ether/HCl, the [2-(2-dibenzofuryl)-propyl ester] of 2-(2-dibenzofuryl)-propionic acid is analogously obtained.

c. 12 g. of 2-(2-dibenzofuryl)-propionic acid is refluxed with 3 ml. of concentrated $H_2SO_4$ and 100 ml. of n-butanol for 7 hours. The mixture is concentrated by evaporation, taken up in chloroform, washed with $NaHCO_3$ solution, dried, and evaporated, thus obtaining the n-butyl ester of 2-(2-dibenzofuryl)-propionic acid.

d. 2.4 g. of 2-(2-dibenzofuryl)-propionic acid and 0.86 g. of cyclopentanol are dissolved in 15 ml. of absolute THF and mixed with 2.06 g. of dicyclohexylcarbodiimide. The mixture is allowed to stand for 24 hours at 25°, filtered, the filtrate evaporated, and the thus-obtained product is the cyclopentyl ester of 2-(2-dibenzofuryl)-propionic acid.

Analogously, the cyclohexyl ester of 2-(2-dibenzofuryl)propionic acid is produced with cyclohexanol.

e. 2.4 g. of 2-(2-dibenzofuryl)-propionic acid and 0.1 g. of anhydrous $ZnCl_2$ are agitated in 5 ml. of 2,3-dihydropyran for 12 hours at 50°. The mixture is diluted with ether, washed with sodium bicarbonate solution and water, the ether solution is dried and evaporated. The residue is filtered in benzene/acetone 1:1 over silica gel, and the eluate is evaporated, thus obtaining the (2-tetrahydropyranyl ester) of 2-(2-dibenzofuryl)-propionic acid.

Analogously, the (2-tetrahydrofuryl ester) of 2-(2-dibenzofuryl)-propionic acid is produced with 2,3-dihydrofuran.

f. 12 g. of the n-butyl ester of 2-(2-dibenzofuryl)-propionic acid is dissolved in a mixture of 100 ml. of THF and 50 ml. of diglyme and added dropwise to a solution, cooled to 0°, of 3.8 g. of $NaBH_4$ and 14 g. of boron trifluoride etherate in 100 ml. of THF/diglyme (2:1). The mixture is stirred for one hour at 0°, heated to 60° for 45 minutes, mixed with water, and worked up as usual, yielding 2-(2-dibenzofuryl)-propylbutyl ether.

Analogously,
2-(2-dibenzofuryl)-propylethyl ether and
2-(2-dibenzofuryl)-propylisopropyl ether
are obtained by reduction of the corresponding ethyl ester and isopropyl ester, respectively.

EXAMPLE 33 a. 28.2 g. of 2-(2-dibenzofuryl)-2-hydroxypropionic acid ethyl ester (b.p. 195°–200°/0.2 mm.; obtainable by reacting dibenzofuran with ethoxalyl chloride in 1,2-dichloroethane in the presence of $AlCl_3$ at 10°–20° and by reaction of the thus-obtained ethyl ester of 2-dibenzofurylglyoxylic acid (b.p. 196°–200°/0.3 mm.) with $CH_3MgI$ in ether) is dissolved in 500 ml. of xylene; 1 gram of p-toluenesulfonic acid is added thereto, and the mixture is refluxed for 3½ hours with the use of a water trap. After cooling, the mixture is washed with sodium bicarbonate solution and water, separated, dried over sodium sulfate, and evaporated. The thus-produced oily ethyl ester of 2-(2-dibenzofuryl)-acrylic acid is dissolved in 270 ml. of ethanol and hydrogenated on 8 g. of 5% palladium charcoal at 50° and under 6 atmospheres until the absorption of hydrogen is terminated (3 hours). The reaction product is filtered, evaporated, and the final product is the ethyl ester of 2-(2-dibenzofuryl)-propionic acid, b.p. 173°–177°/0.2 mm.

Analogously, with the use of the starting compounds set forth below:
ethyl ester of 2-(2-dibenzothienyl)-acrylic acid [obtainable from dibenzothiophene via the ethyl ester of 2-dibenzothienylglyoxylic acid (m.p. 85°) and the ethyl ester of 2-(2-dibenzothienyl)-2-hydroxypropionic acid (b.p. 198°–201°/0.05 mm.)]
ethyl ester of 2-(8-methyl-2-dibenzofuryl)-acrylic acid
ethyl ester of 2-(8-ethyl-2-dibenzofuryl)-acrylic acid [obtainable from 8-ethyldibenzofuran (b.p.

112°/0.1 mm.) via the ethyl ester of 8-ethyl-2-dibenzofurylglyoxylic acid (b.p. 180°–184°/0.1 mm.) and the ethyl ester of 2-(8-ethyl-2-dibenzofuryl)-2-hydroxypropionic acid]

ethyl ester of 2-(8-n-propyl-2-dibenzofuryl)-acrylic acid
ethyl ester of 2-(8-isopropyl-2-dibenzofuryl)-acrylic acid
ethyl ester of 2-(8-n-butyl-2-dibenzofuryl)-acrylic acid
ethyl ester of 2-(8-isobutyl-2-dibenzofuryl)-acrylic acid
ethyl ester of 2-(8-sec.-butyl-2-dibenzofuryl)-acrylic acid
ethyl ester of 2-(8-tert.-butyl-2-dibenzofuryl)-acrylic acid
ethyl ester of 2-(8-methoxy-2-dibenzofuryl)-acrylic acid
ethyl ester of 2-(8-ethoxy-2-dibenzofuryl)-acrylic acid
ethyl ester of 2-(8-n-propoxy-2-dibenzofuryl)-acrylic acid
ethyl ester of 2-(8-isopropoxy-2-dibenzofuryl)-acrylic acid
ethyl ester of 2-(8-n-butoxy-2-dibenzofuryl)-acrylic acid
ethyl ester of 2-(8-isobutoxy-2-dibenzofuryl)-acrylic acid
ethyl ester of 2-(8-sec.-butoxy-2-dibenzofuryl)-acrylic acid
ethyl ester of 2-(8-tert.-butoxy-2-dibenzofuryl)-acrylic acid
ethyl ester of 2-(8-fluoro-2-dibenzofuryl)-acrylic acid
ethyl ester of 2-(8-chloro-2-dibenzofuryl)-acrylic acid
ethyl ester of 2-(8-bromo-2-dibenzofuryl)-acrylic acid [obtainable from 2-bromodibenzofuran via the ethyl ester of 8-bromo-2-dibenzofurylglyoxylic acid (m.p. 108°–111°) and the ethyl ester of 2-(8-bromo-2-dibenzofuryl)-2-hydroxypropionic acid (m.p. 80°–82°)]
ethyl ester of 2-(8-iodo-2-dibenzofuryl)-acrylic acid
ethyl ester of 2-(8-hydroxy-2-dibenzofuryl)-acrylic acid
ethyl ester of 2-(2-dibenzofuryl)-crotonic acid
ethyl ester of 2-(2-dibenzofuryl)-2-pentenic acid
ethyl ester of 2-(2-dibenzofuryl)-3-methyl-2-butenic acid
ethyl ester of 2-(2-dibenzofuryl)-2-hexenic acid
ethyl ester of 2-(2-dibenzofuryl)-4-methyl-2-pentenic acid
ethyl ester of 2-(2-dibenzothienyl)-crotonic acid
ethyl ester of 2-(2-dibenzothienyl)-2-pentenic acid
ethyl ester of 2-(2-dibenzothienyl)-3-methyl-2-butenic acid
ethyl ester of 2-(2-dibenzothienyl)-2-hexenic acid
ethyl ester of 2-(2-dibenzothienyl)-4-methyl-2-pentenic acid the following final products can be obtained by hydrogenation:

the ethyl ester of each of the following acids:
2-(2-dibenzothienyl)-propionic acid, b.p. of the ethyl ester: 179°–183°/0.5 mm.
2-(8-methyl-2-dibenzofuryl)-propionic acid
2-(8-ethyl-2-dibenzofuryl)-propionic acid, b.p. of the ethyl ester: 170°–174°/0.5 mm.
2-(8-n-propyl-2-dibenzofuryl)-propionic acid
2-(8-isopropyl-2-dibenzofuryl)-propionic acid
2-(8-n-butyl-2-dibenzofuryl)-propionic acid
2-(8-isobutyl-2-dibenzofuryl)-propionic acid
2-(8-sec.-butyl-2-dibenzofuryl)-propionic acid
2-(8-tert.-butyl-2-dibenzofuryl)-propionic acid
2-(8-methoxy-2-dibenzofuryl)-propionic acid
2-(8-ethoxy-2-dibenzofuryl)-propionic acid
2-(8-n-propoxy-2-dibenzofuryl)-propionic acid
2-(8-isopropoxy-2-dibenzofuryl)-propionic acid
2-(8-n-butoxy-2-dibenzofuryl)-propionic acid
2-(8-isobutoxy-2-dibenzofuryl)propionic acid
2-(8-sec.-butoxy-2-dibenzofuryl)-propionic acid
2-(8-tert.-butoxy-2-dibenzofuryl)-propionic acid
2-(8-fluoro-2-dibenzofuryl)-propionic acid
2-(8-chloro-2-dibenzofuryl)-propionic acid
2-(8-bromo-2-dibenzofuryl)-propionic acid, b.p. of the ethyl ester: 203°–206°/0.1 mm.
2-(8-iodo-2-dibenzofuryl)-propionic acid
2-(8-hydroxy-2-dibenzofuryl)-propionic acid
2-(2-dibenzofuryl)-butyric acid
2-(2-dibenzofuryl)-valeric acid
2-(2-dibenzofuryl)-isovaleric acid
2-(2-dibenzofuryl)-caproic acid
2-(2-dibenzofuryl)-isocaproic acid
2-(2-dibenzothienyl)-butyric acid
2-(2-dibenzothienyl)-valeric acid
2-(2-dibenzothienyl)-isovaleric acid
2-(2-dibenzothienyl)-caproic acid
2-(2-dibenzothienyl)-isocaproic acid.

b. 171 g. of the ethyl ester of 2-(2-dibenzofuryl)propionic acid is refluxed with 53 g. of KOH in 1,350 ml. of ethanol for 2 hours. The reaction mixture is concentrated by evaporation, the residue is dissolved in water, washed with ether, acidified to pH 3 with hydrochloric acid, worked up as usual, and the product thus obtained is 2-(2-dibenzofuryl)propionic acid, m.p. 139°–140° (diisopropyl ether). 4-Carbethoxycyclohexylammonium salt, melting point 159°–166°.

In place of KOH, it is also possible to utilize equivalent amounts of NaOH, $Na_2CO_3$, or $K_2CO_3$.

Analogously, the following final products are obtained by saponification of the corresponding esters:
2-(2-dibenzothienyl)-propionic acid, m.p. 182°–184°
2-(8-methyl-2-dibenzofuryl)-propionic acid
2-(8-ethyl-2-dibenzofuryl)-propionic acid, m.p. 89°–91°
2-(8-n-propyl-2-dibenzofuryl)-propionic acid
2-(8-isopropyl-2-dibenzofuryl)-propionic acid
2-(8-n-butyl-2-dibenzofuryl)-propionic acid
2-(8-isobutyl-2-dibenzofuryl)-propionic acid
2-(8-sec.-butyl-2-dibenzofuryl)-propionic acid
2-(8-tert.-butyl-2-dibenzofuryl)-propionic acid
2-(8-methoxy-2-dibenzofuryl)-propionic acid
2-(8-ethoxy-2-dibenzofuryl)-propionic acid
2-(8-propoxy-2-dibenzofuryl)-propionic acid
2-(8-isopropoxy-2-dibenzofuryl)-propionic acid
2-(8-n-butoxy-2-dibenzofuryl)-propionic acid
2-(8-isobutoxy-2-dibenzofuryl)-propionic acid
2-(8-sec.-butoxy-2-dibenzofuryl)-propionic acid
2-(8-tert.-butoxy-2-dibenzofuryl)-propionic acid
2-(8-fluoro-2-dibenzofuryl)-propionic acid, m.p. 118°–120°
2-(8-chloro-2-dibenzofuryl)-propionic acid
2-(8-bromo-2-dibenzofuryl)-propionic acid, m.p. 174°–176°

2-(8-iodo-2-dibenzofuryl)-propionic acid, m.p. 168°–170°
2-(8-hydroxy-2-dibenzofuryl)-propionic acid
2-(2-dibenzofuryl)-butyric acid, m.p. 140°–143°
2-(2-dibenzofuryl)-valeric acid
2-(2-dibenzofuryl)-isovaleric acid
2-(2-dibenzofuryl)-caproic acid
2-(2-dibenzofuryl)-isocaproic acid
2-(2-dibenzothienyl)-butyric acid
2-(2-dibenzothienyl)-valeric acid
2-(2-dibenzothienyl)-isovaleric acid
2-(2-dibenzothienyl)-caproic acid
2-(2-dibenzothienyl)-isocaproic acid.

c. 2.68 g. of the ethyl ester of 2-(2-dibenzofuryl)propionic acid is refluxed for 90 minutes in a mixture of 25 ml. of acetic acid and 25 ml. of 25% hydrochloric acid. After working the reaction mixture up as usual, 2-(2-dibenzofuryl)-propionic acid is obtained, m.p. 139°–140° (ethyl acetate/hexane).

Analogously, the remaining esters of Formula I ($R_1$ = esterified carboxyl group) can be saponified to the corresponding acids.

d. A mixture of 1 g. of the ethyl ester of 2-(2-dibenzofuryl)-propionic acid and 100 ml. of water is heated in an autoclave for 24 hours to 180°. The mixture is then cooled, worked up as usual, and the product is 2-(2-dibenzofuryl)propionic acid, m.p. 139°–140°.

e. 2 g. of 2-(2-dibenzofuryl)-propionic acid is introduced at 0° to +5° into 10 ml. of fuming $HNO_3$ in incremental portions. The reaction mixture is stirred for 15 minutes at 0° to +5°, and then poured into ice water and filtered. The residue is washed with water, dried, purified by chromatography on silica gel (benzene : methanol 8:2), and the thus-obtained product is 2-(8-nitro-2-dibenzofuryl)-propionic acid.

By nitration of the corresponding compounds (I, $R_3$ = H), the following final products are obtained in an analogous manner:
2-(8-nitro-2-dibenzothienyl)-propionic acid
the methyl ester of 2-(8-nitro-2-dibenzofuryl)-propionic acid
the ethyl ester of 2-(8-nitro-2-dibenzofuryl)-propionic acid
the n-butyl ester of 2-(8-nitro-2-dibenzofuryl)-propionic acid
2-(8-nitro-2-dibenzofuryl)-butryic acid
2-(8-nitro-2-dibenzofuryl)-valeric acid
2-(8-nitro-2-dibenzofuryl)-isovaleric acid
2-(8-nitro-2-dibenzofuryl)-caproic acid
2-(8-nitro-2-dibenzofuryl)-isocaproic acid.

f. Under agitation, 9.4 ml. of 65% strength nitric acid is added dropwise within 15 minutes to a suspension, heated to 50°, of 9.5 g. of 2-(2-dibenzofuryl)-propionic acid in 40 ml. of acetic acid. Thereafter, the mixture is heated for 1 hour to 80° and worked up as usual, obtaining 2-(8-nitro-2-dibenzofuryl)-propionic acid.

g. 28.5 g. of 2-(8-nitro-2-dibenzofuryl)-propionic acid is dissolved in 300 ml. of absolute ethanol and hydrogenated on 2 g. of 10% Pd/C until the hydrogen absorption is terminated; this reaction is carried out at 25°. The catalyst is filtered off and the solvent is evaporated, thus obtaining 2-(8-amino-2-dibenzofuryl)-propionic acid.

Analogously, the final products set forth below are obtained by reduction of the corresponding nitro compounds:
2-(8-amino-2-dibenzothienyl)-propionic acid
methyl ester of 2-(8-amino-2-dibenzofuryl)-propionic acid
ethyl ester of 2-(8-amino-2-dibenzofuryl)-propionic acid
n-butyl ester of 2-(8-amino-2-dibenzofuryl)-propionic acid
2-(8-amino-2-dibenzofuryl)-butyric acid
2-(8-amino-2-dibenzofuryl)-valeric acid
2-(8-amino-2-dibenzofuryl)-isovaleric acid
2-(8-amino-2-dibenzofuryl)-caproic acid
2-(8-amino-2-dibenzofuryl)-isocaproic acid h. 90 g. $SnCl_2 \cdot 2H_2O$ is dissolved in 225 ml. of concentrated hydrochloric acid; 21 g. of 2-(8-nitro-2-dibenzofuryl)-propionic acid is added thereto, and the mixture is stirred for a short time and then allowed to stand for 24 hours at 25°. Thereafter, the mixture is filtered; the still moist residue is introduced into 300 ml. of water, neutralized with aqueous ammonia solution, and agitated for 2 hours at 25°. The residue is filtered off, washed with water, dried, and extracted in an extraction apparatus with ethyl acetate. From the extract, 2-(8-amino-2-dibenzofuryl)-propionic acid is obtained.

i. Under agitation, a solution of 10.4 ml. of concentrated hydrochloric acid in 50 ml. of 50% strength ethanol is added dropwise at 80° to a mixture of 28.5 g. of 2-(8-nitro-2-dibenzofuryl)-propionic acid and 255 g. of iron powder in 300 ml. of 50% strength ethanol. The mixture is then refluxed for 2 hours, filtered, washed with ethanol, the filtrate evaporated, and the thus-obtained product is 2-(8-amino-2-dibenzofuryl)-propionic acid hydrochloride.

j. A solution of 6.9 g. of $NaNO_2$ in 20 ml. of water is added dropwise at 0° to a solution of 25.5 g. of 2-(8-amino-2-dibenzofuryl)-propionic acid in 250 ml. of 15% hydrochloric acid. Thereafter, 12 ml. of a 40% $HBF_4$ solution is added dropwise to the reaction mixture; the latter is buffered to pH 5–6, the thus-precipitated diazonium tetrafluoroborate is filtered off, washed with water, dried, and introduced in batches into 200 ml. of boiling xylene. After the decomposition process is terminated, the reaction mixture is evaporated and worked up as usual, yielding 2-(8-fluoro-2-dibenzofuryl)-propionic acid, m.p. 118°–120°.

Analogously, the following products are obtained from the corresponding amino compounds:
2-(8-fluoro-2-dibenzothienyl)-propionic acid
2-(8-fluoro-2-dibenzofuryl)-butyric acid
2-(8-fluoro-2-dibenzofuryl)-valeric acid
2-(8-fluoro-2-dibenzofuryl)-isovaleric acid
2-(8-fluoro-2-dibenzofuryl)-caproic acid
2-(8-fluoro-2-dibenzofuryl)-isocaproic acid.

k. 25.5 g. of 2-(8-amino-2-dibenzofuryl)-propionic acid is dissolved in 200 ml. of water and 70 ml. of concentrated hydrochloric acid, mixed at 0°–5° with 6.9 g. of $NaNO_2$ in 20 ml. of water, gradually added dropwise to a hot $Cu_2Cl_2$ solution (obtained by reducing 21 g. of $CuSO_4$ with $SO_2$ in 130 ml. of water in the presence of 26 g. of NaCl), heated another 30 minutes to 90°–95°, cooled, saturated with $H_2S$, and filtered. The filtrate is worked up as usual, thus producing 2-(8-chloro-2-dibenzofuryl)-propionic acid.

Analogously, the following final products are obtained from the corresponding amino compounds:
2-(8-chloro-2-dibenzothienyl)-propionic acid
2-(8-chloro-2-dibenzofuryl)-butyric acid
2-(8-chloro-2-dibenzofuryl)-valeric acid
2-(8-chloro-2-dibenzofuryl)-isovaleric acid 2-(8-chloro-2-dibenzofuryl)-caproic acid
2-(8-chloro-2-dibenzofuryl)-isocaproic acid.

l. 25.5 g. of 2-(8-amino-2-dibenzofuryl)-propionic acid is dissolved in 120 ml. of water and 12 ml. of concentrated $H_2SO_4$, mixed dropwise at 0°–5° with a solution of 6.9 g. of $NaNO_2$ is 20 ml. of water, added dropwise to a boiling solution of 6.6 g. $CuSO_4 \cdot 5H_2O$, 15.4 g. of NaBr, and 2 g. of copper powder (previously refluxed for 4 hours and then mixed with 0.25 g. of $Na_2SO_3$), heated for 30 minutes to 95°, cooled, saturated with $H_2S$, filtered, and the filtrate worked up as usual, yielding 2-(8-bromo-2-dibenzofuryl)-propionic acid, m.p. 174°–176°.

Analogously, the following final products are obtained from the corresponding amino compounds:
  2-(8-bromo-2-dibenzothienyl)-propionic acid
  2-(8-bromo-2-dibenzofuryl)-butyric acid
  2-(8-bromo-2-dibenzofuryl)-valeric acid
  2-(8-bromo-2-dibenzofuryl)-isovaleric acid
  2-(8-bromo-2-dibenzofuryl)-caproic acid
  2-(8-bromo-2-dibenzofuryl)-isocaproic acid.

m. 25.5 g. of 2-(8-amino-2-dibenzofuryl)-propionic acid is dissolved in 120 ml. of 18% sulfuric acid and diazotized at 0°–5° with 6.9 g. of $NaNO_2$ in 15 ml. of water. This solution is introduced under agitation into a mixture of 25 g. of KI in 50 ml. of 1N $H_2SO_4$. The mixture is stirred overnight, heated for 30 minutes on a steam bath, decolorized with carbon, and worked up as usual, yielding 2-(8-iodo-2-dibenzofuryl)-propionic acid, m.p. 168°–170°.

Analogously, the following final compounds are produced from the corresponding amino compounds:
  2-(8-iodo-2-dibenzothienyl)-propionic acid
  2-(8-iodo-2-dibenzofuryl)-butyric acid
  2-(8-iodo-2-dibenzofuryl)-valeric acid
  2-(8-iodo-2-dibenzofuryl)-isovaleric acid
  2-(8-iodo-2-dibenzofuryl)-caproic acid
  2-(8-iodo-2dibenzofuryl)-isocaproic acid.

n. 25.5 g. of 2-(8-amino-2-dibenzofuryl)-propionic acid is dissolved in 100 ml. of 10% strength sulfuric acid and diazotized at 0°–5° by adding 6.9 g. of $NaNO_2$ in 20 ml. of water. The diazonium salt solution is introduced under agitation into 250 ml. of boiling water. Thereafter, the reaction mixture is refluxed for 30 minutes, cooled, and acidified, thus obtaining 2-(8-hydroxy-2-dibenzofuryl)-propionic acid.

From the corresponding amino compounds, the following final products are analogously obtained:
  2-(8-hydroxy-2-dibenzothienyl)-propionic acid
  2-(8-hydroxy-2-dibenzofuryl)-butyric acid
  2-(8-hydroxy-2-dibenzofuryl)-valeric acid
  2-(8-hydroxy-2-dibenzofuryl)-isovaleric acid
  2-(8-hydroxy-2-dibenzofuryl)-caproic acid
  2-(8-hydroxy-2-dibenzofuryl)-isocaproic acid.

o. The crude 2-(8-hydroxy-2-dibenzofuryl)-propionic acid obtained according to (n) is dissolved, under a nitrogen atmosphere, in 250 ml. of 1N sodium hydroxide solution and is then mixed batchwise under agitation with 26 g. of dimethyl sulfate. The methyl ester of 2-(8-methoxy-2-dibenzofuryl)-propionic acid thus produced is gradually separated in an oily form. After agitating the reaction mixture for one-half, 100 ml. of 2N sodium hydroxide solution is added, the mixture is refluxed under stirring for one-half hour, cooled to 0°, and acidified, thus producing 2-(8-methoxy-2-dibenzofuryl)-propionic acid.

Analogously, the corresponding alkoxy compounds of Formula I are obtained from the corresponding hydroxy compounds by reaction with dimethyl sulfate, diethyl sulfate, di-n-propyl sulfate, and isopropyl bromide, for example:
  2-(8-ethoxy-2-dibenzofuryl)-propionic acid
  2-(8-n-propoxy-2-dibenzofuryl)-propionic acid
  2-(8-isopropoxy-2-dibenzofuryl)-propionic acid
  2-(8-methoxy-2-dibenzothienyl)-propionic acid
  2-(8-ethoxy-2-dibenzothienyl)-propionic acid
  2-(8-n-propoxy-2-dibenzothienyl)-propionic acid
  2-(8-isopropoxy-2-dibenzothienyl)-propionic acid
  2-(8-methoxy-2-dibenzofuryl)-butyric acid
  2-(8-methoxy-2-dibenzofuryl)-valeric acid
  2-(8-methoxy-2-dibenzofuryl)-isovaleric acid
  2-(8-methoxy-2-dibenzofuryl)-caproic acid
  2-(8-methoxy-2-dibenzofuryl)-isocaproic acid.

p. One gram of crude 2-(8-hydroxy-2-dibenzofuryl)-propionic acid is agitated with 10 ml. of DMF, 0.5 g. of $K_2CO_3$, and 10 ml. of $CH_3I$ for 24 hours at about 20°. The reaction mixture is then poured into water, worked up as usual, and the product is the methyl ester of 2-(8-methoxy-2-dibenzofuryl)-propionic acid.

q. At 20°–25°, 26.9 g. of the methyl ester of 2-(8-amino-2-dibenzofuryl)-propionic acid is added to a mixture of 10.6 g. of 30% formaldehyde and 0.1 g. of triethylamine; the mixture is stirred for 10 minutes, the organic phase is separated, decomposed with 20 ml. of methanol, and 1 ml. of triethylamine is added thereto. This mixture is hydrogenated on nickel-kieselguhr at 70°–80° and 10 atmospheres hydrogen pressure. After 1.5 hours, the catalyst is filtered off, the filtrate is evapaorated, and the methyl ester of 2-(8-methylamino-2-dibenzofuryl)-propionic acid is thus obtained.

Analogously, the following final products are obtained from the corresponding amino compounds:
the methyl ester of each of the following acids:
  2-(8-methylamino-2-dibenzothienyl)-propionic acid
  2-(8-methylamino-2-dibenzofuryl)-butyric acid
  2-(8-methylamino-2-dibenzofuryl)-valeric acid
  2-(8-methylamino-2-dibenzofuryl)-isovaleric acid
  2-(8-methylamino-2-dibenzofuryl)-caproic acid
  2-(8-methylamino-2-dibenzofuryl)-isocaproic acid.

r. 2.55 g. of 2-(8-amino-2-dibenzofuryl)-propionic acid is dissolved in 50 ml. of 1N sodium hydroxide solution and mixed dropwise, under vigorous agitation and cooling, with 3 g. of acetic anhydride. The mixture is allowed to stand overnight at 25°, hydrochloric acid is added to pH 3–6, the reaction mixture is separated from the precipitate, and 2-(8-acetamido-2-dibenzofuryl)-propionic acid is thus produced.

Analogously, the corresponding acylamino compounds of Formula I are obtained by the acylation of the corresponding amino compounds with acetic anhydride or propionic acid, butyric acid, or isobutyric acid anhydride, for example:
  2-(8-propionamido-2-dibenzofuryl)-propionic acid
  2-(8-butyramido-2-dibenzofuryl)-propionic acid
  2-(8-isobutyramido-2dibenzofuryl)-propionic acid.

s. 2.9 g. of 2-(8-amino-2-dibenzofuryl)-propionic acid hydrochloride is mixed in 50 ml. of pyridine under agitation and ice cooling with 3.5 g. of acetyl chloride. After 2 hours, 50 ml. of water is added thereto; the mixture is allowed to stand overnight, mixed with another 200 ml. of water, and acidified with hydrochloric acid, thus obtaining 2-(8-acetamido-2-dibenzofuryl)-propionic acid.

Analogously, the corresponding acylamino compounds of Formula I are produced by acylation of the corresponding amino compounds with acetyl, priopionyl, butyryl, or isobutyryl chloride, respectively; for example:

2-(8-acetamido-2-dibenzothienyl)-propionic acid
2(8-propionamido-2-dibenzothienyl)-propionic acid
2-(8-butyramido-2-dibenzothienyl)-propionic acid
2-(8-isobutyramido-2-dibenzothienyl)-propionic acid
2-(8-acetamido-2-dibenzofuryl)-butyric acid
2-(8-acetamido-2-dibenzofuryl)-valeric acid
2-(8-acetamido-2-dibenzofuryl)-isovaleric acid
2-(8-acetamido-2-dibenzofuryl)-caproic acid
2-(8-acetamido-2-dibenzofuryl)-isocaproic acid.

t. 29.7 g. of 2-(8-acetamido-2-dibenzofuryl)-propionic acid is dissolved in 200 ml. of absolute THF and added dropwide to a suspension of 8 g. of $LiAlH_4$ in 160 ml. of absolute THF. The reaction mixture is refluxed for 12 hours, cooled, 20 ml. of 20% NaOH solution is added, and, after working up the reaction mixture as usual, 2-(8-ethylamino-2-dibenzofuryl)-propanol is obtained.

Analogously, the following products are obtained by reduction of the corresponding 2-(8-acylamino-2-dibenzofuryl- and -dibenzothienyl)-propionic acids, respectively:

2-(8-ethylamino-2-dibenzothienyl)-propanol
2-(8-n-propylamino-2-dibenzofuryl)-propanol
2-(8-n-butylamino-2-dibenzofuryl)-propanol
2-(8-isobutylamino-2-dibenzofuryl)-propanol.

u. 2.83 g. of the ethyl ester of 2-(8-amino-2-dibenzofuryl)-propionic acid is heated with 3 g. of 90% formic acid and 2 g. of 39% formaldehyde solution for 10 hours to 90°–95°. The mixture is then diluted with water, made alkaline with sodium hydroxide solution, and worked up at once as usual, thus obtaining the ethyl ester of 2-(8-dimethylamino-2-dibenzofuryl)-propionic acid.

v. 2.55 g. of 2-(8-amino-2-dibenzofuryl)-propionic acid is refluxed for 2 hours in 20 ml. of n-butanol together with 4 g. of $CH_3I$ and 3 g. of powdered $K_2CO_3$. The mixture is combined with a solution of 0.5 g. of KOH in 100 ml. of water, refluxed for 2 hours, cooled, acidified with hydrochloric acid, and worked up as usual, obtaining 2-(8-dimethylamino-2-dibenzofuryl)-propionic acid.

Analogously, the following compounds are produced from the corresponding amino compounds:

2-(8-dimethylamino-2-dibenzothienyl)-propionic acid
2-(8-dimethylamino-2-dibenzofuryl)-butyrid acid
2-(8-dimethylamino-2-dibenzofuryl)-valeric acid
2-(8-dimethylamino-2-dibenzofuryl)-isovaleric acid
2-(8-dimethylamin-2-dibenzofuryl)-caproic acid
2-(8-dimethylamino-2-dibenzofuryl)-isocaproic acid.

With the use of $C_2H_5I$ in place of $CH_3I$, the following products are obtained:

2-(8-diethylamino-2-dibenzothienyl)-propionic acid
2-(8-diethylamino-2-dibenzofuryl)-propionic acid
2-(8-diethylamino-2-dibenzofuryl)-butyric acid
2-(8-diethylamino-2-dibenzofuryl)-valeric acid
2-(8-diethylamino-2-dibenzofuryl)-isovaleric acid
2-(8-diethylamino-2-dibenzofuryl)-caproic acid
2-(8-diethylamino-2-dibenzofuryl)-isocaproic acid.

w. A cold diazonium salt solution, obtained from 2.55 g. of 2-(*-amino-2-dibenzofuryl)-propionic acid, 3 ml. of concentrated hydrochloric acid, 0.7 g. of $NaNO_2$, and 10 ml. of water is added dropwise to a CuCN solution (produced by heating 2.5 g. of copper sulfate in 10 ml. of water with 2.8 g. of KCN), heated to 60°–70°. The mixture is heated for another 20 minutes on a steam bath, cooled, worked up as usual, and the product thus obtained is 2-(8-cyano-2-dibenzofuryl)-propionic acid.

EXAMPLE 34 a. 26.6 g. of the ethyl ester of 2-(2-dibenzofuryl)-acrylic acid is refluxed in 140 ml. of 1N sodium hydroxide solution and 300 ml. of ethanol for 3 hours. To this mixture is added 400 ml. of water and then 550 g. of 2.5% sodium amalgam is added in incremental portions at 25° under agitation and in the course of 5 hours; the mixture is vigorously stirred for another 5 hours, heated on a water bath, decanted from the mercury, and the alcohol is distilled off. The mixture is worked up as usual, thus producing 2-(2-dibenzofuryl)-propionic acid, m.p. 139°–140°.

For the reduction, it is also possible to use the equivalent amount of the free acid in place of the ester, with the same result.

b. 2.4 g. of 2-(2-dibenzofuryl)-propionic acid and 1.72 g. of 2-diethylaminoethyl chloride hydrochloride are refluxed in a solution prepared from 0.46 g. of Na and 30 ml. of isopropanol for 8 hours. The mixture is then concentrated by evaporation and worked up as usual, yielding the (2-diethylaminoethyl ester) of 2-(2-dibenzofuryl)-propionic acid, b.p. 180°–183°/0.1 mm.

Analogously, the (2-diethylaminoethyl ester) of 2-(2-dibenzothienyl)-propionic acid, b.p. 202°–206°/0.1 mm., is obtained from 2-(2-dibenzothienyl)-propionic acid.

In an analogous manner, using the hydrochlorides of
2-dimethylaminoethyl chloride,
2-pyrrolidinoethyl chloride,
2-piperidinoethyl chloride,
2-morpholinoethyl chloride,
3-dimethylaminopropyl chloride,
3-diethylaminopropyl chloride,
3-pyrrolidinopropyl chloride,
3-piperidinopropyl chloride, and
3-morpholinopropyl chloride, respectively,
the following esters of 2-(2-dibenzofuryl)-propionic acid are obtained:
the (2-dimethylaminoethyl ester),
the (2-pyrrolidonoethyl ester),
the (2-piperidinoethyl ester),
the (2-morpholinoethyl ester),
the (3-dimethylaminopropyl ester),
the (3-diethylaminopropyl ester),
the (3-pyrrolidinopropyl ester),
the (3-piperidinopropyl ester), and
the (3-morpholinopropyl ester).

c. 2.7 g. of $CH_3ONa$ is suspended in 100 ml. of DMF; 8.6 g. of 2-diethylaminoethyl chloride hydrochloride is added thereto, and the mixture is agitated for 30 minutes at 20°. Then, 11.3 g. of the sodium salt of 2-(2-dibenzofuryl)-propionic acid is introduced into this reaction mixture. Under agitation, the mixture is heated for 10 hours to 80°, poured onto water, and worked up as usual, thus producing the (2- diethylaminoethyl ester) of 2-(2-dibenzofuryl)-propionic acid.

EXAMPLE 35 a. A solution of 2.1 g. of 2-(2-dibenzofuryl)-2-hydroxy-propionic acid (obtainable by reacting 2-acetyldibenzofuran with sodium cyanide and benzoyl chloride in THF to 2-(2-dibenzofuryl)-2-(benzoyloxy-propionitrile and hydrolysis thereof with HCl/acetic acid) in 30 ml. of acetic acid is hydrogenated on 0.2 g. of 10% Pd/C in the presence of 0.01 ml. of $HClO_4$ at 20° and under normal pressure. The reaction mixture is filtered, diluted with water, and the thus-obtained product is 2-(2-dibenzofuryl)-propionic acid, m.p. 139°–140°.

With the same success, it is also possible to use the following starting substances:
  2-(2-dibenzofuryl)-2-acetoxypropionic acid,
  2-(2-dibenzofuryl)-2-chloropropionic acid,
  2-(2-dibenzofuryl)-2-bromopropionic acid,
  2-(2-dibenzofuryl)-2-iodopropionic acid, or
  2-(2-dibenzofuryl)-2-methoxypropionic acid.

b. One gram of 2-(2-dibenzofuryl)-propionic acid is dissolved in 10 ml. of THF and, under agitation, such an amount of ethereal diazomethane solution in added dropwise thereto that the evolution of nitrogen can no longer be observed. After 20 minutes, the reaction mixture is evaporated, thus obtaining the methyl ester of 2-(2-dibenzofuryl)-propionic acid.

Analogously, with the use of the corresponding acids of Formula I ($R_1$ = COOH), the corresponding methyl esters (I, $R_1$ =$COOCH_3$) are obtained, e.g. the methyl ester of 2-(2-dibenzothienyl)-propionic acid; the methyl ester of 2-(7-fluoro-2-dibenzofuryl)-propionic acid; and the methyl ester of 2-(7-chloro-2-dibenzofuryl)-propionic acid.

c. A solution of 0.5 g. of sodium in 10 ml. of absolute ethanol is added dropwise to a solution of 1.4 g. of hydroxylamine hydrochloride in 35 ml. of absolute ethanol. The thus-precipitated sodium chloride is filtered off; the filtrate is mixed with 5 g. of the methyl ester of 2-(2-dibenzofuryl)-propionic acid and thereafter with a solution of 0.5 g. of sodium in 10 ml. of absolute ethanol. After allowing the mixture to stand overnight at 25°, the alcohol is distilled off, the residue is dissolved in water, and the mixture is worked up as usual, yielding 2-(2-dibenzofuryl)-propionehydroxamic acid.

Analogously, the corresponding hydroxamic acids are obtained from the esters, e.g. the methyl or ethyl esters, of Formula I ($R_1$ = esterified COOH-group) by reaction with hydroxylamine.

EXAMPLE 35a a. A mixture of 30.2 g. of the ethyl ester of 2-(7-fluoro-2-dibenzofuryl)-2-hydroxypropionic acid (oil; obtainable by reacting 3-fluorodibenzofuran with ethoxalyl chloride in 1,2-dichloroethane in the presence of $AlCl_3$ at 10–20° and by reacting the thus-obtained ethyl ester of 7-fluoro-2-dibenzofuryl-glyoxylic acid (m.p. 90–92°) with $CH_3MgI$ in ether), 8.65 g. of KI, 5.07 g. of red phosphorus, 41 ml. of 85% phosphoric acid, and 16.5 ml. of water is heated for 16 hours to 130°–140°. After working the mixture up as usual, the ethyl ester of 2-(7-fluoro-2-dibenzofuryl)-propionic acid is produced, b.p. 177°–182°/0.15 mm.

Analogously, from the following starting compounds: the ethyl ester of each of the following acids:

2-(1-fluoro-2-dibenzofuryl)-
2-(3-fluoro-2-dibenzofuryl)-
2-(4-fluoro-2-dibenzofuryl)-
2-(6-fluoro-2-dibenzofuryl)-
2-(9-fluoro-2-dibenzofuryl)-
2-(1-chloro-2-dibenzofuryl)-
2-(3-chloro-2-dibenzofuryl)-
2-(4-chloro-2dibenzofuryl)-
2-(6-chloro-2-dibenzofuryl)-
2-(7-chloro-2-dibenzofuryl)-
2-(9-chloro-2-dibenzofuryl)-
2-(1-bromo-2-dibenzofuryl)-
2-(3-bromo-2-dibenzofuryl)-
2-(4-bromo-2-dibenzofuryl-
2-(6-bromo-2-dibenzofuryl)-
2-(7-bromo-2-dibenzofuryl)-
2-(9-bromo-2-dibenzofuryl)-
2-(1-iodo-2-dibenzofuryl)-
2-(3-iodo-2-dibenzofuryl)-
2-(4-iodo-2-dibenzofuryl)-
2-(6-iodo-2-dibenzofuryl)-
2-(7-iodo-2-dibenzofuryl)-
2-(9-iodo-2-dibenzofuryl)-
2-(1-methyl-2-dibenzofuryl)-
2-(3-methyl-2-dibenzofuryl)-
2-(4-methyl-2-dibenzofuryl)-
2-(6-methyl-2-dibenzofuryl)-
2-(7-methyl-2-dibenzofuryl)-
2-(9-methyl-2-dibenzofuryl)-
2-(1-ethyl-2-dibenzofuryl)-
2-(3-ethyl-2-dibenzofuryl)-
2-(4-ethyl-2-dibenzofuryl)-
2-(6-ethyl-2-dibenzofuryl)-
2-(7-ethyl-2-dibenzofuryl)-
2-(9-ethyl-2-dibenzofuryl)-
2-(1-methoxy-2-dibenzofuryl)-
2-(3-methoxy-2-dibenzofuryl)-
2-(4-methoxy-2-dibenzofuryl)-
2-(6-methoxy-2-dibenzofuryl)-
2-(7-methoxy-2-dibenzofuryl)-
2-(9-methoxy-2-dibenzofuryl)-
2-(1-hydroxy-2-dibenzofuryl)-
2-(3-hydroxy-2-dibenzofuryl)-
2-(4-hydroxy-2-dibenzofuryl)-
2-(6-hydroxy-2-dibenzofuryl)-
2-(7-hydroxy-2-dibenzofuryl)-
2-(9-hydroxy-2-dibenzofuryl)-
2-(1-amino-2-dibenzofuryl)-
2-(3-amino-2-dibenzofuryl)-
2-(4-amino-2-dibenzofuryl)-
2-(6-amino-2-dibenzofuryl)-
2-(7-amino-2-dibenzofuryl)-
2-(9-amino-2-dibenzofuryl)-
2-(1-trifluoromethyl-2-dibenzofuryl)-
2-(3-trifluoromethyl-2-dibenzofuryl)-
2-(4-trifluoromethyl-2-dibenzofuryl)-
2-(6-trifluoromethyl-2-dibenzofuryl)-
2-(7-trifluoromethyl-2-dibenzofuryl)-
2-(8-trifluoromethyl-2-dibenzofuryl)-
2-(9-trifluoromethyl-2-dibenzofuryl)-2-hydroxypropionic acid, the following final products are obtained by reduction with KI/red phosphorus/$H_3PO_4$:
the ethyl ester of each of the following acids:
  2-(1-fluoro-2-dibenzofuryl)-propionic acid
  2-(3-fluoro-2-dibenzofuryl)-propionic acid
  2-(4-fluoro-2-dibenzofuryl)-propionic acid 2-(6-fluoro-2-dibenzofuryl)-propionic acid
2-(9-fluoro-2-dibenzofuryl)-propionic acid
2-(1-chloro-2-dibenzofuryl)-propionic acid
2-(3-chloro-2-dibenzofuryl)-propionic acid
2-(4-chloro-2-dibenzofuryl)-propionic acid
2-(6-chloro-2-dibenzofuryl)-propionic acid
2-(7-chloro-2-dibenzofuryl)-propionic acid
2-(9-chloro-2-dibenzofuryl)-propionic acid
2-(1-bromo-2-dibenzofuryl)-propionic acid
2-(3-bromo-2-dibenzofuryl)-propionic acid
2-(4-bromo-2-dibenzofuryl)-propionic acid
2-(6-bromo-2-dibenzofuryl)-propionic acid
2-(7-bromo-2-dibenzofuryl)-propionic acid
2-(9-bromo-2-dibenzofuryl)-propionic acid
2-(1-iodo-2-dibenzofuryl)-propionic acid
2-(3-iodo-2-dibenzofuryl)-propionic acid
2-(4-iodo-2-dibenzofuryl)-propionic acid
2-(6-iodo-2-dibenzofuryl)-propionic acid
2-(7-iodo-2-dibenzofuryl)-propionic acid
2-(9-iodo-2-dibenzofuryl)-propionic acid
2-(1-methyl-2-dibenzofuryl)-propionic acid
2-(3-methyl-2-dibenzofuryl)-propionic acid
2-(4-methyl-2-dibenzofuryl)-propionic acid
2-(6-methyl-2-dibenzofuryl)-propionic acid
2-(7-methyl-2-dibenzofuryl)-propionic acid acid
2-(9-methyl-2-dibenzofuryl)-propionic acid
2-(1-ethyl-2-dibenzofuryl)-propionic acid
2-(3-ethyl-2-dibenzofuryl)-propionic acid
2-(4-ethyl-2-dibenzofuryl)-propionic acid
2-(6-ethyl-2-dibenzofuryl)-propionic acid
2-(7-ethyl-2-dibenzofuryl)-propionic acid
2-(9-ethyl-2-dibenzofuryl)-propionic acid
2-(1-methoxy-2-dibenzofuryl)-propionic acid
2-(3-methoxy-2-dibenzofuryl)-propionic acid
2-(4-methoxy-2-dibenzofuryl)-propionic acid
2-(6-methoxy-2-dibenzofuryl)-propionic acid
2-(7-methoxy-2-dibenzofuryl)-propionic acid
2-(9-methoxy-2-dibenzofuryl)-propionic acid
2-(1-hydroxy-2-dibenzofuryl)-propionic acid
2-(3-hydroxy-2-dibenzofuryl)-propionic acid
2-(4-hydroxy-2-dibenzofuryl)-propionic acid
2-(6-hydroxy-2-dibenzofuryl)-propionic acid
2-(7-hydroxy-2-dibenzofuryl)-propionic acid
2-(9-hydroxy-2-dibenzofuryl)-propionic acid
2-(1-amino-2-dibenzofuryl)-propionic acid
2-(3-amino-2-dibenzofuryl)-propionic acid
2-(4-amino-2-dibenzofuryl)-propionic acid
2-(6-amino-2-dibenzofuryl)-propionic acid
2-(7-amino-2-dibenzofuryl)-propionic acid
2-(9-amino-2-dibenzofuryl)-propionic acid
2-(1-trifluoromethyl-2-dibenzofuryl)-2-dibenzofuryl)-propionic acid
2-(3-trifluoromethyl-2-dibenzofuryl)-propionic acid
2-(4-trifluoromethyl-2-dibenzofuryl)-propionic acid
2-(6-trifluoromethyl-2-dibenzofuryl)-propionic acid
2-(7-trifluoromethyl-2-dibenzofuryl)-propionic acid
2-(8-trifluoromethyl-2-dibenzofuryl)-propionic acid
2-(9-trifluoromethyl-2-dibenzofuryl)-propionic acid.

b. Analogously to Example 33(b), the free 2-(7-fluoro-2-dibenzofuryl)-propionic acid, m.p. 133°–135° (ethyl acetate/petroleum ether) is obtained from 2-(7-fluoro-2-dibenzofuryl)-propionic acid ethyl ester by saponification with KOH in ethanol.

In an analogous manner, the following acids are obtained by the saponification of the corresponding esters:

2-(1-fluoro-2-dibenzofuryl)-propionic acid
2-(3-fluoro-2-dibenzofuryl)-propionic acid
2-(4-fluoro-2-dibenzofuryl)-propionic acid
2-(6-fluoro-2-dibenzofuryl)-propionic acid
2-(9-fluoro-2-dibenzofuryl)-propionic acid
2-(1-chloro-2-dibenzofuryl)-propionic acid
2-(3-chloro-2-dibenzofuryl)-propionic acid
2-(4-chloro-2-dibenzofuryl)-propionic acid
2-(6-chloro-2-dibenzofuryl)-propionic acid
2-(7-chloro-2-dibenzofuryl)-propionic acid, m.p. 145°–147°
2-(9-chloro-2-dibenzofuryl)-propionic acid
2-(1-bromo-2-dibenzofuryl)-propionic acid
2-(3-bromo-2-dibenzofuryl)-propionic acid
2-(4-bromo-2-dibenzofuryl)-propionic acid
2-(6-bromo-2-dibenzofuryl)-propionic acid
2-(7-bromo-2-dibenzofuryl)-propionic acid
2-(9-bromo-2-dibenzofuryl)-propionic acid
2-(1-iodo-2-dibenzofuryl)-propionic acid
2-(3-iodo-2-dibenzofuryl)-propionic acid
2-(4-iodo-2-dibenzofuryl)-propionic acid
2-(6-iodo-2-dibenzofuryl)-propionic acid
2-(7-iodo-2-dibenzofuryl)-propionic acid
2-(9-iodo-2-dibenzofuryl)-propionic acid
2-(1-methyl-2-dibenzofuryl)-propionic acid
2-(3-methyl-2-dibenzofuryl)-propionic acid
2-(4-methyl-2-dibenzofuryl)-propionic acid
2-(6-methyl-2-dibenzofuryl)-propionic acid
2-(7-methyl-2-dibenzofuryl)-propionic acid
2-(9-methyl-2-dibenzofuryl)-propionic acid
2-(1-ethyl-2-dibenzofuryl)-propionic acid
2-(3-ethyl-2-dibenzofuryl)-propionic acid
2-(4-ethyl-2-dibenzofuryl)-propionic acid
2-(6-ethyl-2-dibenzofuryl)-propionic acid
2-(7-ethyl-2-dibenzofuryl)-propionic acid
2-(9-ethyl-2-dibenzofuryl)-propionic acid
2-(1-methoxy-2-dibenzofuryl)-propionic acid
2-(3-methoxy-2-dibenzofuryl)-propionic acid
2-(4-methoxy-2-dibenzofuryl)-propionic acid
2-(6-methoxy-2-dibenzofuryl)-propionic acid
2-(7-methoxy-2-dibenzofuryl)-propionic acid
2-(9-methoxy-2-dibenzofuryl)-propionic acid
2-(1-hydroxy-2-dibenzofuryl)-propionic acid
2-(3-hydroxy-2-dibenzofuryl)-propionic acid
2-(4-hydroxy-2-dibenzofuryl)-propionic acid
2-(6-hydroxy-2-dibenzofuryl)-propionic acid
2-(7-hydroxy-2-dibenzofuryl)-propionic acid
2-(9-hydroxy-2-dibenzofuryl)-propionic acid
2-(1-amino-2-dibenzofuryl)-propionic acid
2-(3-amino-2-dibenzofuryl)-propionic acid
2-(4-amino-2-dibenzofuryl)-propionic acid
2-(6-amino-2-dibenzofuryl)-propionic acid
2-(7-amino-2-dibenzofuryl)-propionic acid
2-(9-amino-2-dibenzofuryl)-propionic acid
2-(1-trifluoromethyl-2-dibenzofuryl)-propionic acid
2-(3-trifluoromethyl-2-dibenzofuryl)-propionic acid
2-(4-trifluoromethyl-2-dibenzofuryl)-propionic acid
2-(6-trifluoromethyl-2-dibenzofuryl)-propionic acid
2-(7-trifluoromethyl-2-dibenzofuryl)-propionic acid
2-(8-trifluoromethyl-2-dibenzofuryl)-propionic acid
2-(9-trifluoromethyl-2-dibenzofuryl)-propionic acid.

EXAMPLE 36 a. 2.84 g. of the ethyl ester of 2-(2-dibenzofuryl)-2-hydroxypropionic acid is dissolved in 40 ml. of acetic acid and introduced into a solution of 9 g. of $SnCl_2 \cdot 2H_2O$ in 20 ml. of concentrated hydrochloric acid. The mixture is refluxed for 3 hours; the solution is buffered with dilute sodium hydroxide solution to pH 2, and hydrogen sulfide is introduced until the precipitation of SnS has stopped; the mixture is then filtered and worked up as usual, yielding 2-(2-dibenzofuryl)-propionic acid, m.p. 139°–140°.

b. 5 g. of 2-(2-dibenzofuryl)-propionic acid is refluxed for 10 hours with 30 ml. of acetic anhydride. After the acetic acid and the excess acetic anhydride have been distilled off, 2-(2-dibenzofuryl)-propionic acid anhydride is obtained. a. 140 g. of $SnCl_2 \cdot 2H_2O$ is dissolved in 650 ml. of 96% ethanol; HCl gas is introduced into the solution until saturation, and 69 g. of the ethyl ester of 2-(2-dibenzofuryl)-2-hydroxypropionic acid is added thereto. The reaction mixture is allowed to stand for 18 hours at room temperature, then poured onto water, extracted with ether, and the aqueous phase is washed with dilute sodium hydroxide solution and water, dried, and evaporated, thus producing the ethyl ester of 2-(2-dibenzofuryl)-propionic acid, b.p. 173–177°/0.2 mm.

Analogously, by using as the starting compounds the ethyl esters of each of the following acids:
2-(2-dibenzothienyl)-2-hydroxypropionic acid
2-(8-methyl-2-dibenzofuryl)-2-hydroxypropionic acid
2-(8-ethyl-2-dibenzofuryl)-2-hydroxypropionic acid
2-(8-n-propyl-2-dibenzofuryl)-2-hydroxypropionic acid
2-(8-isopropyl-2-dibenzofuryl)-2-hydroxypropionic acid
2-(8-n-butyl-2-dibenzofuryl)-2-hydroxypropionic acid
2-(8-isobutyl-2-dibenzofuryl)-2-hydroxypropionic acid
2-(8-sec.-butyl-2-dibenzofuryl)-2-hydroxypropionic acid
2-(8-tert.-butyl-2-dibenzofuryl)-2-hydroxypropionic acid
2-(8-methoxy-2-dibenzofuryl)-2-hydroxypropionic acid
2-(8-ethoxy-2-dibenzofuryl)-2-hydroxypropionic acid
2-(8-n-propoxy-2-dibenzofuryl)-2-hydroxypropionic acid
2-(8-isopropoxy-2-dibenzofuryl)-2-hydroxypropionic acid
2-(8-n-butoxy-2-dibenzofuryl)-2-hydroxypropionic acid
2-(8-isobutoxy-2-dibenzofuryl)-2-hydroxypropionic acid
2-(8-sec.-butoxy-2-dibenzofuryl)-2-hydroxypropionic acid
2-(8-tert.-butoxy-2-dibenzofuryl)-2-hydroxypropionic acid
2-(8-fluoro-2-dibenzofuryl)-2-hydroxypropionic acid
2-(8-chloro-2-dibenzofuryl)-2-hydroxypropionic acid
2-(8-bromo-2-dibenzofuryl)-2-hydroxypropionic acid [m.p. of this ethyl ester 80°–82°; obtainable from 8-bromodibenzofuran via the ethyl ester of 8-bromo-2-dibenzofurylglyoxylic acid (m.p. 108°–111°)]
2-(8-iodo-2-dibenzofuryl)-2-hydroxypropionic acid
2-(8-hydroxy-2-dibenzofuryl)-2-hydroxypropionic acid
2-(2-dibenzofuryl)-2-hydroxybutyric acid
2-(2-dibenzofuryl)-2-hydroxyvaleric acid
2-(2-dibenzofuryl)-2-hydroxyisovaleric acid
2-(2-dibenzofuryl)-2-hydroxycaproic acid
2-(2-dibenzofuryl)-2-hydroxyisocaproic acid,
the corresponding des-hydroxy esters are produced by reduction with $SnCl_2$, for example:
the ethyl ester of 2-(2-dibenzothienyl)-propionic acid, b.p. 179°–183°/0.05 mm.,
the ethyl ester of 2-(8-ethyl-2-dibenzofuryl)propionic acid, b.p. 170°–174°/0.05 mm., and
the ethyl ester of 2-(8-bromo-2-dibenzofuryl)-propionic acid, b.p. 203°–206°/0.1 mm.

b. 2.68 g. of the ethyl ester of 2-(2-dibenzofuryl)-propionic acid is dissolved in 20 g. of 2-diethylaminoethanol and heated for 20 hours to 165°. The excess alcohol is distilled off, the residue is mixed with water and ether and worked up as usual, thus obtaining the (2-diethylaminoethyl ester) of 2-(2-dibenzofuryl)-propionic acid. c. 2.5 g. of the ethyl ester of 2-(2-dibenzofuryl)-propionic acid is heated in a sealed tube with 30 ml. of saturated ethanolic $NH_3$ for 16 hours to 100°. The reaction mixture is then concentrated by evaporation, the residue is triturated with diisopropyl ether, and the product is 2-(2-dibenzofuryl)-propionamide, m.p. 180°–182°.

Analogously, the corresponding amides are obtained from the corresponding esters of Formula I ($R_1$ = esterified COOH—group) by reaction with alcoholic $NH_3$, for example:
2-(2-dibenzothienyl)-propionamide
2-(8-methyl-2-dibenzofuryl)-propionamide
2-(8-ethyl-2-dibenzofuryl)-propionamide
2-(8-n-propyl-2-dibenzofuryl)-propionamide
2-(8-isopropyl-2-dibenzofuryl)-propionamide
2-(8-n-butyl-2-dibenzofuryl)-propionamide
2-(8-isobutyl-2-dibenzofuryl)-propionamide
2-(8-sec.-butyl-2-dibenzofuryl)-propionamide
2-(8-tert.-butyl-2-dibenzofuryl)-propionamide
2-(8-methoxy-2-dibenzofuryl)-propionamide
2-(8-ethoxy-2-dibenzofuryl)-propionamide
2-(8-n-propoxy-2-dibenzofuryl)-propionamide
2-(8-isopropoxy-2-dibenzofuryl)-propionamide
2-(8-sec.-butoxy-2-dibenzofuryl)-propionamide
2-(8-tert.-butoxy-2-dibenzofuryl)-propionamide
2-(8-fluoro-2-dibenzofuryl)-propionamide
2-(8-chloro-2-dibenzofuryl)-propionamide
2-(8-bromo-2-dibenzofuryl)-propionamide
2-(8-iodo-2-dibenzofuryl)-propionamide
2-(8-hydroxy-2-dibenzofuryl)-propionamide
2-(7-fluoro-2-dibenzofuryl)-propionamide
2-(7-chloro-2-dibenzofuryl)-propionamide
2-(2-dibenzofuryl)-butyramide
2-(2-dibenzofuryl)-valeric acid amide
2-(2-dibenzofuryl)-isovaleric acid amide
2-(2-dibenzofuryl)-caproic acid amide
2-(2-dibenzofuryl)-isocaproic acid amide.

d. A solution of 40.3 g. of the ethyl ester of 2-(2-dibenzofuryl)-propionic acid in 250 ml. of absolute THF is added dropwise to a suspension of 5.7 g. of $LiAlH_4$ in 250 ml. of THF. The solution is stirred for 30 minutes, and then a mixture of 20 ml. of THF, 5 ml. of water, and 15 ml. of 32% strength sodium hydroxide solution is added dropwise thereto under ice cooling; the reaction mixture is filtered over kieselguhr, dried, and evaporated, thus producing 2-(2-dibenzofuryl)-propanol, m.p. 48°–50°.

In an analogous manner, the following final products are obtained by the reduction of the corresponding esters with LiAlH$_4$:

2-(2-dibenzothienyl)-propanol, b.p. 173°–177°/0.2 mm.
2-(8-methyl-2-dibenzofuryl)-propanol
2-(8-ethyl-2-dibenzofuryl)-propanol
2-(8-n-propyl-2-dibenzofuryl)-propanol
2-(8-isopropyl-2-dibenzofuryl)-propanol
2-(8-n-butyl-2-dibenzofuryl)-propanol
2-(8-sec.butyl-2-dibenzofuryl)-propanol
2-(8-tert.-butyl-2-dibenzofuryl)-propanol
2-(8-methoxy-2-dibenzofuryl)-propanol
2-(8-ethoxy-2-dibenzofuryl)-propanol
2-(8-n-propoxy-2-dibenzofuryl)-propanol
2-(8-isopropoxy-2-dibenzofuryl)-propanol
2-(8-n-butoxy-2-dibenzofuryl)-propanol
2-(8-isobutoxy-2-dibenzofuryl)-propanol
2-(8-sec.-butoxy-2-dibenzofuryl)-propanol
2-(8-tert.-butoxy-2-dibenzofuryl)-propanol
2-(8-fluoro-2-dibenzofuryl)-propanol
2-(8-chloro-2-dibenzofuryl)-propanol
2-(8-bromo-2-dibenzofuryl)-propanol
2-(8-iodo-2-dibenzofuryl)-propanol
2-(8-hydroxy-2-dibenzofuryl)-propanol
2-(7-fluoro-2-dibenzofuryl)-propanol, b.p. 167°–169°/0.1 mm.
2-(7-chloro-2-dibenzofuryl)-propanol
2-(2-dibenzofuryl)-1-butanol
2-(2-dibenzofuryl)-1-pentanol
2-(2-dibenzofuryl)-3-methyl-1-butanol
2-(2-dibenzofuryl)-1-hexanol
2-(2-dibenzofuryl)-4-methyl-1-pentanol.

EXAMPLE 38

15.7 g. of the ethyl ester of 2-(8-ethyl-2-dibenzofuryl)-2-hydroxypropionic acid is dissolved in 50 ml. of dichloromethane, saturated with dry gaseous HCl, and mixed with 5 ml. of SOCl$_2$. The reaction mixture is heated to 50° for 2 hours and the solvent is then removed. The residue consisting of the ethyl ester of 2-(8-ethyl-2-dibenzofuryl)-2-chloropropionic acid is dissolved in 500 ml. of methanol and hydrogenated on 5 g. of platinum oxide under normal pressure and at 25°. The catalyst is filtered off, the filtrate is mixed with a solution of 2.2 g. of NaOH in 5 ml. of water, the mixture is refluxed for 2 hours, evaporated to dryness, and the residue is dissolved in water and worked up as usual, thus producing 2-(8-ethyl-2-dibenzofuryl)-propionic acid, m.p. 89°–91°.

EXAMPLE 39 a. A solution of 8 g. of the ethyl ester of 2-(2-dibenzofuryl)-acrylic acid is gradually added dropwise at 20° to 1.1 g. of LiAlH$_4$ in 100 ml. of absolute THF. The mixture is then refluxed for 18 hours, the excess LiAlH$_4$ is destroyed with ethyl acetate, and the reaction mixture is mixed with 20% NaOH solution. After working up the reaction mixture as usual, 2-(2-dibenzofuryl)-propanol is obtained, m.p. 52°–54°.

b. 0.9 g. of 2-(2-dibenzofuryl)-propanal is cooled in a mixture of 20 ml. of acetic acid and 20 ml. of benzene to 0° and mixed, under agitation and within 10 minutes, with a solution of 0.25 g. of CrO$_3$ in 1 ml. of water and 20 ml. of acetic acid. After agitating the mixture for one hour at 25°, 10 ml. of methanol is added thereto, then water is added for dilution purposes, and the mixture is extracted with ether. The ether phase is extracted with 4% NaOH, and the alkaline extracts are worked up as usual, thus obtaining 2-(2-dibenzofuryl)-propionic acid, m.p. 139°–140°.

c. A mixtue of 2.24 g. of 2-(2-dibenzofuryl)-propanal, 4 g. of pulverized KMnO$_4$, and 50 ml. of pyridine is agitated for 24 hours, filtered, diluted with 2N H$_2$SO$_4$, and worked up as usual, thus producing 2-(2-dibenzofuryl)-propionic acid, m.p. 139°–140°.

d. A solution of 4.48 g. of 2-(2-dibenzofuryl)-propanal in 110 ml. of methanol is added to a solution of 6.7 g. of AgNO$_3$ in 12 ml. of water. Within 2 hours, 120 ml. of 0.5N NaOH is added dropwise thereto under agitation and at 20°; the mixture is then filtered, diluted with water, and worked up as usual, yielding 2-(2-dibenzofuryl)-propionic acid, m.p. 139°–140°.

e. A solution of 2.24 g. of 2-(2-dibenzofuryl)-propanal in 50 ml. of THF is mixed with 4.5 g. of nickel peroxide and 6 ml. of aqueous 10% Na$_2$CO$_3$ solution. The mixture is stirred for 24 hours, acidified with H$_2$SO$_4$, and worked up as usual, thus obtaining 2-(2-dibenzofuryl)-propionic acid, m.p. 139°–140°.

EXAMPLE 40 a. 13.2 g. of the ethyl ester of 2-(2-dibenzofuryl)-acrylic acid is refluxed for 15 hours together with 2 g. of LiAlH$_4$ in 200 ml. of absolute THF. Then, the mixture is combined with 20 ml. of 25% NaOH solution, the THF phase is decanted off, the residue is washed twice with ether, the combined organic phases are dried, and evaporated. The residue is dissolved in 200 ml. of absolute THF, 2 g. of LiAlH$_4$ is added thereto, and the mixture is again refluxed for 8 hours. The usual working-up operation yields 2-(2-dibenzofuryl)-propanol, m.p. 48°–50°.

Analogously, the other alcohols of Formula I (R$_1$ = CH$_2$OH) are obtained by reducing the corresponding esters.

b. One gram of 2-(2-dibenzofuryl)-propanol is allowed to stand in 5 ml. of pyridine and 5 ml. of acetic anhydride for 24 hours. The mixture is then concentrated, worked up as usual, and the product is 2-(2-dibenzofuryl)-propyl acetate.

Analogously, the following final products are obtained from the following corresponding alcohols:

2-(2-dibenzothienyl)-propyl acetate
2-(8-methyl-2-dibenzofuryl)-propyl acetate
2-(8-ethyl-2-dibenzofuryl)-propyl acetate
2-(8-n-propyl-2-dibenzofuryl)-propyl acetate
2-(8-n-butyl-2-dibenzofuryl)-propyl acetate
2-(8-isobutyl-2-dibenzofuryl)-propyl acetate
2-(8-sec.-butyl-2-dibenzofuryl)-propyl acetate
2-(8-tert.-butyl-2-dibenzofuryl)-propyl acetate
2-(8-methoxy-2-dibenzofuryl)-propyl acetate
2-(8-ethoxy-2-dibenzofuryl)-propyl acetate
2-(8-n-propoxy-2-dibenzofuryl)-propyl acetate
2-(8-isopropoxy-2-dibenzofuryl)-propyl acetate
2-(8-n-butoxy-2-dibenzofuryl)-propyl acetate
2-(8-isobutoxy-2-dibenzofuryl)-propyl acetate
2-(8-sec.-butoxy-2-dibenzofuryl)-propyl acetate
2-(8-tert.-butoxy-2-dibenzofuryl)-propyl acetate
2-(7-fluoro-2-dibenzofuryl)-propyl acetate, b.p. 162°–163°/0.1 mm.
2-(8-fluoro-2-dibenzofuryl)-propyl acetate
2-(8-chloro-2-dibenzofuryl)-propyl acetate
2-(8-bromo-2-dibenzofuryl)-propyl acetate
2-(8-iodo-2-dibenzofuryl)-propyl acetate 2-(2-dibenzofuryl)-1-butyl acetate
2-(2-dibenzofuryl)-1-pentyl acetate
2-(2-dibenzofuryl)-3-methyl-1-butyl acetate
2-(2-dibenzofuryl)-1-hexyl acetate
2-(2-dibenzofuryl)-4-methyl-1-pentyl acetate.

c. At 0°, 4.6 g. of 2-(2-dibenzofuryl)-propanol in 20 ml. of DMF is gradually added dropwise under agitation to a suspension of 4.8 g. of NaH in 50 ml. of DMF. The reaction mixture is stirred for 20 minutes, and then 4.2 g. of $CH_3I$ in 10 ml. of DMF is added dropwise thereto. The mixture is agitated overnight at 20° and worked up as usual, yielding 2-(2-dibenzofuryl)propylmethyl ether.

Analogously, the following final products are obtained from the corresponding alcohols with methyl iodide:
2-(2-dibenzothienyl)-propylmethyl ether
2-(8-methyl-2-dibenzofuryl)-propylmethyl ether
2-(8-ethyl-2-dibenzofuryl)-propylmethyl ether
2-(8-n-propyl-2-dibenzofuryl)-propylmethyl ether
2-(8-methoxy-2-dibenzofuryl)-propylmethyl ether
2-(8-ethoxy-2-dibenzofuryl)-propylmethyl ether
2-(8-fluoro-2-dibenzofuryl)-propylmethyl ether
2-(8-chloro-2-dibenzofuryl)-propylmethyl ether
2-(2-dibenzofuryl)-1-butylmethyl ether.

d. 4.5 g. of 2-(2-dibenzofuryl)-propanol is dissolved in 30 ml. of pyridine. At 0°, a solution of 3.8 g. of p-toluenesulfonyl chloride in 10 ml. of pyridine is gradually added to the reaction mixture, the latter is stirred for 3 hours at 20°, and worked up as usual, yielding 2-(2-dibenzofuryl)-propyl p-toluenesulfonate.

Analogously, 2-(2-dibenzofuryl)-propyl methanesulfonate is obtained by reaction with methanesulfonyl chloride.

e. The nitration of 2-(2-dibenzofuryl)-propyl acetate analogously to Example 33(f) yields 2-(8-nitro-2-dibenzofuryl)propyl acetate which is saponified, analogously to Example 33(b), to 2-(8-nitro-2-dibenzofuryl)-propanol.

The reduction of these substances analogously to Example 33(g) yields:
2-(8-amino-2-dibenzofuryl)-propyl acetate or
2-(8-amino-2-dibenzofuryl)-propanol.

From these compounds the following final products can be produced analogously to:
Example 33(n): 2-(8-hydroxy-2-dibenzofuryl)-propanol
Example 33(q): 2-(8-methylamino-2-dibenzofuryl)-propanol
Example 33(r): 2-(8-acetamido-2-dibenzofuryl)-propanol
2-(8-propionamido-2-dibenzofuryl)-propanol
2-(8-butyramido-2-dibenzofuryl)-propanol
2-(8-isobutyramido-2-dibenzofuryl)-propanol
Example 33(v): 2-(8-dimethylamino-2-dibenzofuryl)-propanol
2-(8diethylamino-2-dibenzofuryl)-propanol.

Reduction of the aforementioned 2-(8-acylamino-2-dibenzofuryl)-propanols analogously to Example 33(t) results in:
2-(8-ethylamino-2-dibenzofuryl)-propanol
2-(8-n-propylamino-2-dibenzofuryl)-propanol
2-(8-n-butylamino-2-dibenzofuryl)-propanol
2-(8-isobutylamino-2-dibenzofuryl)-propanol.

f. The oxidation of the aforementioned alcohols in accordance with the method described in Example 3(c) yields:
2-(8-nitro-2-dibenzofuryl)-propanal
2-(8-amino-2-dibenzofuryl)-propanal
2-(8-hydroxy-2-dibenzofuryl)-propanal
2-(8-methylamino-2-dibenzofuryl)-propanal
2-(8-acetamido-2-dibenzofuryl)-propanal
2-(8-propionamido-2-dibenzofuryl)-propanal
2-(8-butyramido-2-dibenzofuryl)-propanal
2-(8-isobutyramido-2-dibenzofuryl)-propanal
2-(8-dimethylamino-2-dibenzofuryl)-propanal
2-(8-diethylamino-2-dibenzofuryl)-propanal
2-(8-ethylamino-2-dibenzofuryl)-propanal
2-(8-n-propylamino-2-dibenzofuryl)-propanal
2-(8-n-butylamino-2-dibenzofuryl)-propanal
2-(8-isobutylamino-2-dibenzofuryl)-propanal.

EXAMPLE 41

One gram of 2-(2-dibenzofuryl)-3-methoxy-1-propene (obtainable by reacting 2-acetyldibenzofuran with $CH_3MgBr$ and then splitting off water with polyphosphoric acid, or by reaction of 2-methoxyacetyldibenzofuran with triphenylmethylphosphonium bromide) is dissolved in 15 ml. of ethanol and hydrogenated on 100 mg. of 5% Pd/C at 20° and under normal pressure until the hydrogen absorption is terminated. The reaction product is then filtered and concentrated by evaporation, yielding 2-(2-dibenzofuryl)propylmethyl ether.

Analogously, by hydrogenating
2-(2-dibenzofuryl)-2-propen-1-ol
2-(2-dibenzofuryl)-2-buten-1-ol,
the corresponding alcohols of Formula I ($R_1 = CH_2OH$) are produced, and by the hydrogenation of
2-(2-dibenzofuryl)-1-ethoxy-2-propene
2-(2-dibenzofuryl)-1-methoxy-2-butene,
the corresponding ethers of Formula I ($R_1 = CH_2OCH_3$ or $CH_2 OC_2H_5$) are obtained.

EXAMPLE 42

One gram of 1-methoxy-2-(2-dibenzofuryl)-1-propene (obtainable from 2-acetyldibenzofuran and methoxymethyltriphenylphosphonium chloride) is dissolved in 20 ml. of methanol and hydrogenated on 5% Pd/C until the hydrogen absorption is ended. The catalyst is filtered off, and the reaction product is concentrated by evaporation, thus obtaining 2-(2-dibenzofuryl)-propylmethyl ether.

EXAMPLE 43 a. 26.6 g. of 2-(2-dibenzofuryl)-acroleinethylene acetal (obtainable by oxidizing 2-(2-dibenzofuryl)-2-propen-1-ol to the aldehyde and acetalization with ethylene glycol) is hydrogenated in 200 ml. of absolute methanol with 7 g. of 5 % Pd/C until the absorption of hydrogen is terminated. The reaction product is evaporated after removing the catalyst by filtration, thus obtaining 2-(2-dibenzofuryl)-propanal ethylene acetal.

b. One gram of 2-(2-dibenzofuryl)-propanal ethylene acetal is heated for 30 minutes to 60° with 5 ml. of 10% hydrochloric acid in 15 ml. of THF. After the usual working-up operation, 2-(2-dibenzofuryl)-propanal is obtained, m.p. 52°–54°.

EXAMPLE 44

7.6 g. of the ethyl ester of 2-chloro-2-(2-dibenzofuryl)propionic acid is dissolved in 70 ml. of absolute ether and gradually added dropwise to a suspension of 2.2 g. of $LiAlH_4$ in 100 ml. of ether. The mixture is refluxed for several hours; methanol is added thereto, and the mixture is worked up as usual, thus obtaining 2-(2-dibenzofuryl)-propanol, m.p. 48°–50°.

EXAMPLE 45

18 ml. of a 1-molar ether LiAlH$_4$ solution is added to a suspension of 10.7 g. of anhydrous AlCl$_3$ in 50 ml. of absolute ether. Within one hour, a solution of 4.46 g. of 1-methyl-1-(2-dibenzofuryl)-ethylene oxide (obtainable by reacting 2-isopropenyldibenzofuran with N-bromosuccinimide in the aqueous phase to the corresponding bromohydrin and splitting off HBr witih solution of sodium hydroxide) in 70 ml. of absolute ether is added dropwise to the reaction mixture within 1 hour. The mixture is refluxed for 2 hours, hydrolyzed by adding 10 ml. of water and 100 ml. of 10% sulfuric acid, and worked up as usual, yielding 2-(2-dibenzofuryl)-propanol, m.p. 48°–50°.

EXAMPLE 46

Under agitation, 25.65 g. of 2-(2-dibenzofuryl)-acryloyl chloride (obtainable from the acid with SOCl$_2$ in benzene) is added dropwise at 20° to a suspension of 4 g. of LiAlH$_4$ in 300 ml. of ether. The mixture is stirred for 3 hours at 20°; methanol is added thereto, and the reaction mixture is worked up as usual, thus producing 2-(2-dibenzofuryl)-propanol, m.p. 48°–50°.

EXAMPLE 47

24.2 g. of 2-(2-dibenzofuryl)-propane-1,2-diol (obtainable by the reduction of the ethyl ester of 2-hydroxy-2-(2-dibenzofuryl)-propionic acid with LiAlH$_4$) is hydrogenated in 500 ml. of methanol on 2 g. of CuCr$_2$O$_4$ catalyst at 100 atmospheres and 140°. The reaction mixture is cooled, filtered, and evaporated, yielding 2-(2-dibenzofuryl)-propanol, m.p. 48°–50°.

EXAMPLE 48

20 g. of the diethyl ester of 2-(2-dibenzofuryl)-2-methylmalonic acid (obtainable by reacting the ethyl ester of 2-dibenzofurylacetic acid with the diethyl ester of oxalic acid to the diethyl ester of 2-(2-dibenzofuryl)-3-oxosuccinic acid, decarbonylation to the diethyl ester of 2-dibenzofurylmalonic acid, and methylation with methyl iodide) is refluxed for 3 hours with 300 ml. of 10% ethanolic KOH solution. The ethanol is distilled off, the residue is introduced into 600 ml. of water and acidified to pH 4 with hydrochloric acid. The thus-precipitated 2-(2-dibenzofuryl)-2-methylmalonic acid is filtered off, dried, dissolved in acetone, and the solution is filtered and evaporated. The residue is heated to 100°–120°/20 mm. until the end of the liberation of CO$_2$, thus obtaining 2-(2-dibenzofuryl)-propionic acid, m.p. 139°–140°.

EXAMPLE 49 a. A solution of crude 2-(2-dibenzofuryl)-2-methylmalonic acid (obtainable by the saponification of 20 g. of the diethyl ester of 2-(2-dibenzofuryl)-2-methylmalonic acid with ethanolic KOH under N$_2$) in 200 ml. of acetic acid and 200 ml. of 15% HCl is refluxed under a nitrogen atmosphere until the evolution of CO$_2$ has ceased. After cooling the reaction mixture and working up as usual, 2-(2-dibenzofuryl)-propionic acid is obtained, m.p. 139°–140°.

b. 4.8 g. of 2-(2-dibenzofuryl)-propionic acid and 15 g. of vinyl acetate are shaken with 0.15 g. of mercury acetate for 40 minutes. Then, the mixture is heated to the boiling point, 1 drop of H$_2$SO$_4$ is added thereto, the mixture is refluxed for 8 hours, and 200 mg. of sodium acetate is then added. The reaction mixture is concentrated by evaporation and worked up as usual, yielding the vinyl ester of 2-(2-dibenzofuryl)-propionic acid.

c. 1.5 g. of NaH is added to a solution of 4.8 g. of 2-(2-dibenzofuryl)-propionic acid in 100 ml. of absolute THF. The mixture is agitated for 30 minutes at 25°, cooled off, and at 5° a solution of 3.6 g. of allyl bromide in 25 ml. of absolute THF is added thereto and the mixture is again stirred for 24 hours at 25°. After evaporation and working up as usual, the allyl ester of 2-(2-dibenzofuryl)-propionic acid is obtained.

EXAMPLE 50

One gram of the monoethyl ester of 2-(2-dibenzofuryl)-2-methylmalonic acid (obtainable by partial saponification of the diethyl ester with 1 mole of KOH in ethanol, and acidification) is gradually heated under 18 torr [mm. Hg] to 100°–130° until the evolution of CO$_2$ has ceased, thus obtaining the ethyl ester of 2-(2-dibenzofuryl)-propionic acid, b.p. 173°–177°/0.2 mm.

EXAMPLE 51

One gram of the ethyl ester of 2-(2-dibenzofuryl)-2-methylbutan-3-onic acid (obtainable by condensation of the ethyl ester of 2-dibenzofurylacetic acid with ethyl acetate to the ethyl ester of 2-(2-dibenzofuryl)-butan-3-onic methylation and emethylation with methyl iodide) is agitated with 15 ml. of 50% KOH for 45 minutes at 90° under N$_2$. The reaction mixture is cooled, water and HCl are added to pH 10, the mixture is washed with ether, and worked up as usual, thus producing 2-(2-dibenzofuryl)-propionic acid, m.p. 139°–140°.

EXAMPLE 52

2.68 g. of 2-oxo-3-(2-dibenzofuryl)-butyric acid is heated in 10 ml. of aniline to 140° until the liberation of CO$_2$ has ended. After cooling, the reaction mixture is combined with 30 ml. of water, acidified with hydrochloric acid, and heated on a water bath for 10 minutes in order to split the anil which was formed as an intermediate. The reaction mixture is then extracted with ether and worked up as usual, yielding 2-(2-dibenzofuryl)-propanal, m.p. 52°–54°.

EXAMPLE 53 a. A mixture of 27.5 g. of 2-(1-bromoethyl)-dibenzofuran, 400 ml. of tert.-butanol, 23 g. of potassium tert.-butylate, and 100 g. of nickel carbonyl is heated for 24 hours to 50° and then evaporated to dryness. To this mixture is added 400 ml. of 6N hydrochloric acid, the mixture is refluxed for 12 hours, and worked up as usual, thus obtaining 2-(2-dibenzofuryl)-propionic acid, m.p. 139°–140°.

24 g. of 2-(2-dibenzofuryl)-propionic acid is heated for 1.5 hours to 170° with 75 g. of acethydroxamic acid in 300 ml. of polyphosphoric acid. Thereafter, the reaction mixture is poured into water and worked up as usual, producing 2-(8-acetamido-2-dibenzofuryl)-propionic acid.

c. One gram of 2-(8-acetamido-2-dibenzofuryl)-propionic acid is refluxed with 10 ml. of 25% hydrochloric acid for 1 hour under agitation. A portion of the hydrochloric acid is distilled off, the mixture is neutralized with sodium hydroxide solution and worked up as usual, yoekding 2-(8-amino-2-dibenzofuryl)propionic acid.

EXAMPLE 54

With 20 minutes, 4 ml. of formic acid is added to a solution of 1.94 g. of 2-vinyldibenzofuran (obtainable by splitting off water from 2-(1-hydroxyethyl)-dibenzofuran with polyphosphoric acid) in a mixture of 12 ml. of sulfuric acid and 8 ml. of trifluoroacetic acid. After another 20 minutes, the mixture is poured into water, thus obtaining 2-(2-dibenzofuryl)propionic acid, m.p. 139°–140°.

EXAMPLE 55

21.2 g. of 2-(1-hydroxyethyl)-dibenzofuran (or 19.4 g. of 2-vinyldibenzofuran) is dissolved in 100 ml. of 3% ethanolic hydrochloric acid; 0.2 g. of $[(C_6H_5)_3P]_2PdCl_2$ is added thereto and the mixture is heated under CO at 500 atmospheres in an autoclave for 5 hours to 85°. After cooling and working up the reaction mixture as usual, the ethyll ester of 2-(2-dibenzofuryl)propionic acid is obtained, b.p. 173°–177°/0.2 mm.

EXAMPLE 56

A mixture of 19.4 g. of 2-vinyldibenzofuran (or 21.2 g. of 2-(1-hydroxyethyl)-dibenzofuran), 20 ml. of nickel carbonyl, 20 ml. of concentrated hydrochloric acid, and 200 ml. of acetone is heated for 12 hours to 50° under irradiation by a mercury vapor lamp. The mixture is evaporated to dryness, the residue is extracted with ether and worked up as usual, and the product is 2-(2-dibenzofuryl)-propionic acid, m.p. 139°–140°.

EXAMPLE 57 a. A mixture of 19.4 g. of 2-vinyldibenzofuran and 15 g. of dicobalt octacarbonyl in 250 ml. of ether is shaken in an autoclave with a mixture of carbon monoxide and hydrogen (1:1) at 140 atmospheres and 120° for 8 hours. After cooling, filtration, and evaporation, 2-(2-dibenzofuryl)-propanal is obtained, m.p. 52°–54°.

b. 11.2 g. of 2-(2-dibenzofuryl)-propanal is dissolved in 50 ml. of ethanol and added dropwise to a solution of 3 g. of $NaBH_4$ in 75 ml. of ethanol. The mixture is agitated for 2 hours at 20° and worked up as usual, obtaining 2-(2-dibenzofuryl)propanol, m.p. 48°–50°.

c. A solution of 2.24 g. of 2-(2-dibenzofuryl)-propanal in 20 ml. of anhydrous THF is treated at –75° with a solution of 0.6 g. of $LiAlH_4$ in 20 ml. of anhydrous THF. The mixture is allowed to warm up to 20°, decomposed with ethyl acetate, and worked up as usual, thus producing 2-(2-dibenzofuryl)-propanol, m.p. 48–50°.

EXAMPLE 58 a. A mixture of 25.85 g. of 2-(2-chloropropionyl)-dibenzofuran (obtanable by reacting dibenzofuran with 2-chloropropionyl chloride in the presence of $AlCl_3$), 8 g. of extremely finely pulverized NaOH, and 500 ml. of toluene is refluxed under agitation for 30 hours. The mixture is then cooled, water is added, and the mixture worked up as usual, thus obtaining 2-(2-dibenzofuryl)-propionic acid, m.p. 139°–140°.

b. A solution of 12 g. of 2-(2-dibenzofuryl-propionic acid in 80 ml. of absolute THF is added dropwise to a mixture of 2.84 g. of $LiAlH_4$ in 100 ml. of absolute THF. The mixture is refluxed for 8 hours, 10 ml. of water in 15 ml. of THF and 20 ml. of 25% sodium hydroxide solution are added thereto, the mixture is decanted, and the residue is wahsed with ether. After drying, filtration, and evaporation of the combined organic phases, 2-(2-dibenzofuryl)-propanol is produced, m.p. 48°–50°.

Analogously, the corresponding alcohols (I, $R_1 = CH_2OH$) are obrained by reduction of the corresponding acids (I, $R_1 = COOH$) with $LiAlH_4$.

EXAMPLE 59

25.3 g. of 3-(2-dibenzofuryl)-2-butanone oxime (obtainable by reacting 2-(2-dibenzofuryl-propionitrile with $CH_3MgI$ to 3-(2-dibenzofuryl)-2-butanone and oximation) is introduced into 600 g. of polyphosphoric acid. The reaction mixture is heated under agitation to 130° for 25 minutes, poured into water, and worked up as usual. Chromatograpy on silica gel yields 2-(2-dibenzofuryl)-propionic acid N-methylamide.

EXAMPLE 60

A solution of 23.8 g. of 3-(2-dibenzofuryl)-2-butanone and 5 g. of $HN_3$ in 200 ml. of benzene is aded dropwise under agitation and cooling to a mixture of 25 ml. of $H_2SO_4$ and 50 ml. of benzene. Thereafter, the mixture is agitated for 30 minutes, crushed ice is added thereto, and the mixture is worked up as usual. Chromatography on silica gel yields 2-(2-dibenzofuryl)propionic acid N-methylamide.

EXAMPLE 61

22.4 g. of 2-(2-dibenzofuryl)-2-methylethylene oxide (Obtainable by reacting 2-isopropenyldibenzofuran with m-chloroperbenzoic acid) is heated with 100 ml. of THF and 300 ml. of 10% hydrochloric acid for 1 hour to 50°. After the usual workingup operation, 2-(2-dibenzofuryl)-propanal is produced, m.p. 52°–54°.

EXAMPLE 62 a. 22.4 g. of 2-(2-dibenzofuryl)-2-methylethylene oxide is heated with 50 ml. of THF and 100 ml. of saturated aqueous $NaHSO_3$ solution for 1 hour to 100° under agitation. Water is then added to the mixture, the latter is filtered, and the bisulfite compound of 2-(2-dibenzofuryl)-propanal is thus obtained.

b. 8 g. of the sodium bisulfite addition product of 2-(2-dibenzofuryl)-propanal is suspended in 150 ml. of 1N hydrochloric acid and heated on a water bath for 30 minutes. After working up the mixture as usual, 2-(2-dibenzofuryl)-propanal is obtained, m.p. 52°–54°.

Analogously, the remaining sodium bisulfite addition products of Formula I ($R_1 = CHOH-SO_3Na$) can be converted into the free aldehydes (I, $R_1 = CHO$).

c. 5.5 g. of 2-(2-dibenzofuryl)-propanal is heated on a water bath for 1.5 hours in 20 ml. of ethanol together with 1.75 g. of hydroxylamine hydrochloride and 2.1 g. of anhydrous sodium acetate. After removing the ethanol and working up the mixture as usual, 2-(2-dibenzofuryl)-propanal oxime is obtained.

EXAMPLE 63

2.5 g. of sodium is dissolved in 75 ml. of absolute ethanol, under agitation and under a nitrogen atmosphere, at 20°–25°, 29.6 g. of the ethyl ester of 2,3-epoxy-3-(2-dibenzofuryl)-butyric acid (obtainable by reacting 2-acetyldibenzofuran with ethyl chloroformate in tert.-butanol in the presence of potassium tert.-butylate at 10°–15°) is gradually added thereto. The reaction mixture is cooled in an ice bath. After adding 2 ml. of water dropwise to the mixture, the latter is allowed to stand overnight, then filtered, washed with ether dissolved in 60 ml. of water and 10 ml. of concentrated HCl, and gently heated on a steam bath until the evolution of $CO_2$ is terminated. The usual working-up steps yield 2-(2-dibenzofuryl)-propanal, m.p. 52°–54°.

EXAMPLE 64 a. 18.2 g. of 2-(2-dibenzofuryl)-propane-1,2-diol (m.p. 95°–97°; obtainable by refluxing the ethyl ester of 2-hydroxy-2-(2-dibenzofuryl)-propionic acid for 2 hours with $LiAlH_4$ in absolute THF and subsequent decomposition with sodium hydroxide solution) is dissolved in 400 ml. of toluene and refluxed with the use of a water trap for 30 minutes in the presence of 0.9 g. of p-toluenesulfonic acid. The mixture is then cooled, washed with sodium bicarbonate solution, dried, and evaporated, thus obtaining 2-(2-dibenzofuryl)-propanal, m.p. 52°–54°.

In place of p-toluenesulfonic acid, it is also possible to employ benzenesulfonic acid, sulfuric acid, or phosphoric acid.

Analogously, by using the following starting compounds:

2-(2-dibenzothienyl)-propane-1,2-diol
2-(8-methyl-2-dibenzofuryl)-propane-1,2-diol
2-(8-ethyl-2-dibenzofuryl)-propane-1,2-diol
2-(8-n-propyl-2-dibenzofuryl)-propane-1,2-diol
2-(8-isopropyl-2-dibenzofuryl)-propane-1,2-diol
2-(8-n-butyl-2-dibenzofuryl)-propane-1,2-diol
2-(8-isobutyl-2-dibenzofuryl)-propane-1,2-diol
2-(8-sec.-butyl-2-dibenzofuryl)-propane-1,2-diol
2-(8-tert.-butyl-2-dibenzofuryl)-propane-1,2-diol
2-(8-methoxy-2-dibenzofuryl)-propane-1,2-diol
2-(8-ethoxy-2-dibenzofuryl)-propane-1,2-diol
2-(8-n-propoxy-2-dibenzofuryl)-propane-1,2-diol
2-(8-isopropoxy-2-dibenzofuryl)-propane-1,2-diol
2-(8-n-butoxy-2-dibenzofuryl)-propane-1,2-diol
2-(8-isobutoxy-2-dibenzofuryl)-propane-1,2-diol
2-(8-sec.-butoxy-2-dibenzofuryl)-propane-1,2-diol
2-(8-tert.-butoxy-2-dibenzofuryl)-propane-1,2-diol
2-(8-fluoro-2-dibenzofuryl)-propane-1,2-diol
2-(8-chloro-2-dibenzofuryl)-propane-1,2-diol
2-(8-bromo-2-dibenzofuryl)-propane-1,2-diol
2-(8-iodo-2-dibenzofuryl)-propane-1,2-diol
2-(8-hydroxy-2-dibenzofuryl)-propane-1,2-diol
2-(7-fluoro-2-dibenzofuryl)-propane-1,2-diol
2-(7-chloro-2-dibenzofuryl)-propane-1,2-diol
2-(2-dibenzofuryl)-butane-1,2-diol
2-(2-dibenzofuryl)-pentane-1,2-diol
2-(2-dibenzofuryl)-2-methylbutane-1,2-diol
2-(2-dibenzofuryl)-hexane-1,2-diol
2-(2-dibenzofuryl)-4-methylpentane-1,2-diol, the following final products are obtained by treatment with p-toluenesulfonic acid:

2-(2-dibenzothienyl)-propanal
2-(8-methyl-2-dibenzofuryl)-propanal
2-(8-ethyl-2-dibenzofuryl)-propanal
2-(8-n-propyl-2-dibenzofuryl)-propanal
2-(8-isopropyl-2-dibenzofuryl)-propanal
2-(8-n-butyl-2-dibenzofuryl)-propanal
2-(8-isobutyl-2-dibenzofuryl)-propanal
2-(8-sec.-butyl-2-dibenzofuryl)-propanal
2-(8-tert.-butyl-2-dibenzofuryl)-propanal
2-(8-methoxy-2-dibenzofuryl)-propanal
2-(8-ethoxy-2-dibenzofuryl)-propanal
2-(8-n-propoxy-2-dibenzofuryl)-propanal
2-(8-isopropoxy-2-dibenzofuryl)-propanal
2-(8-n-butoxy-2-dibenzofuryl)-propanal
2-(8-isobutoxy-2-dibenzofuryl)-propanal
2-(8-sec.-butoxy-2-dibenzofuryl)-propanal
2-(8-tert.-butoxy-2-dibenzofuryl)-propanal
2-(8-fluoro-2-dibenzofuryl)-propanal
2-(8-chloro-2-dibenzofuryl)-propanal
2-(8-bromo-2-dibenzofuryl)-propanal
2-(8-iodo-2-dibenzofuryl)-propanal
2-(8-hydroxy-2-dibenzofuryl)-propanal
2-(7-fluoro-2-dibenzofuryl)-propanal
2-(7-chloro-2-dibenzofuryl)-propanal
2-(2-dibenzofuryl)-butanal
2-(2-dibenzofuryl)-pentanal
2-(2-dibenzofuryl)-3-methylbutanal
2-(2-dibenzofuryl)-hexanal
2-(2-dibenzofuryl)-3-methylpentanal.

b. 4.48 g. of 2-(2-dibenzofuryl)-propanal is refluxed with the use of a water trap with 100 ml. of absolute benzene, 2.5 g, of ethylene glycol, and 0.2 g. of p-toluenesulfonic acid for 6 hours. After cooling the benzene phase is washed neutral with 1N sodium hydroxide solution and water, dried, and evaporated. The residue is chromatographed on silica gel with benzene/petroleum ether 9:1. The first fractions are concentrated by evaporation. The thus-obtained product is 2-(2-dibenzofuryl)-propanal ethylene acetal.

Analogously, the corresponding ethylene acetals are produced from the corresponding aldehydes, e.g. the above-mentioned aldehydes, by acetalization with ethylene glycol, for example:

2-(2-dibenzothienyl)-propanal ethylene acetal,
2-(8-methyl-2-dibenzofuryl)-propanal ethylene acetal, etc.

c. 8.96 g. of 2-(2-dibenzofuryl)-propanal is dissolved in a mixture of 150 ml. of absolute benzene and 150 ml. of methanol together with 500 mg. of p-toluenesulfonic acid and refluxed with the use of a water trap for 10 hours, thus separating a mixture of water/methanol/benzene. The amount of benzene/methanol withdrawn from the water trap is replaced by equal amounts of an absolute solvent mixture. The usual working-up operation yields 2-(2-dibenzofuryl)-propanal dimethylacetal.

Analogously, the corresponding dimethylacetals are obtained from the corresponding aldehydes, e.g. the aldehydes mentioned above, by acetalization with methanol, for example:

2-(8-methyl-2-dibenzofuryl)-propanal dimethylacetal, etc.

d. 13.5 g. of 2-(2-dibenzofuryl)-propanal dimethylacetal is refluxed together with 6.2 g. of ethylene glycol and 1 g. of p-toluenesulfonic acid in 150 ml. of absolute toluene. During this step, a portion of the toluene is distilled off together with the methanol produced during the trans-acetalization; the amount of toluene removed by distillation is replaced by absolute toluene. As soon as the distilled-off toluene contains no methanol any more, the mixture is worked up as usual, thus producing 2-(2-dibenzofuryl)-propanal ethylene acetal.

e. 11.2 g. of 2-(2-dibenzofuryl)-propanal is refluxed in 200 ml. of acetone dimethyl ketal with 2 g. of p-toluenesulfonic acid for 8 hours; the thus-liberated acetone is removed from the reaction mixture by way of a column. After the usual working-up operation, 2-(2-dibenzofuryl)-propanal dimethylacetal is obtained.

f. 22.4 g. of 2-(2-dibenzofuryl)-propanal is refluxed together with 25 g. of triethyl orthoformate, 1 g. of ammonium nitrate, and 10 ml. of absolute ethanol for 20 minutes. The reaction mixture is cooled, filtered, diluted with ether, washed with dilute aqueous ammonia solution, dried, and evaporated, thus obtaining 2-(2-dibenzofuryl)-propanal diethylacetal.

Analogously, the corresponding diethylacetals are obtained from the corresponding aldehydes, e.g. those mentioned above, by reaction with triethyl orthoformate, for example:

2-(8-methyl-2-dibenzofuryl)-propanal diethylacetal, etc.

g. 22.4 g. of 2-(2-dibenzofuryl)-propanal is refluxed with a water trap in 300 ml. of absolute benzene together with 14 g. of 1,2-ethanedithiol and 2 g. of p-toluenesulfonic acid for 12 hours. After cooling and working up the mixture as usual, 2-(2-dibenzofuryl)-propanal ethylenethioacetal is produced.

In an aldehydes, manner, the corresponding thioacetals are obtained from the corresponding aldehyddes, e.g. those set forth above, by reaction with 1,2-ethanedithiol, 1,3-propanedithiol, methylmercaptan, or ethylmercaptan, for example:

2-(2-dibenzofuryl)-propanal 1,3-propylenethioacetal
2-(2-dibenzofuryl)-propanal dimethylmercaptal,
2-(2-dibenzofuryl)-propanal diethylmercaptal, etc.

h. 22.4 g. of 2-(2-dibenzofuryl)-propanal is shaken in 200 ml. of 5% aqueous sulfurous acid for 30 minutes. Thereafter, the solution is neutralized by adding 240 ml. of 1N NaOH solution, and the thus-formed bisulfite compound is precipitated by the addition of a small amount of ethanol. The mixture is allowed to stand overnight, thus obtaining the sodium bisulfite compound of 2-(2-dibenzofuryl)-propanal.

Analogously, the bisulfite compounds of the corresponding aldehydes, e.g. those mentioned above, are produced.

EXAMPLE 65

24.2 g. of 2-(2-dibenzofuryl)-propane-1,2-diol is dissolved in 200 ml. of formic acid and agitated for 30 minutes at 25°. The formic acid is distilled off, the residue is mixed with 300 ml. of water and 30 ml. of concentrated $H_2SO_4$, agitated for 1 hour at 25°, and worked up as usual, yielding 2-(2-dibenzofuryl)-propanal, m.p. 52°–54°.

EXAMPLE 66

(a) 26.8 g. of crude 1-ethoxy-2-(2-dibenzofuryl)-propan-2-ol (obtainable by reacting 2-acetyldibenzofuran with ethoxymethylmagnesium chloride in THF and subsequent hydrolysis) is refluxed for 1 hour with 400 ml. of formic acid. After cooling, the mixture is combined with 250 ml. of 15% sulfuric acid, agitated for 3 hours at 50°, and worked up as usual, thus obtaining 2-(2-dibenzofuryl)-propanal, m.p. 52°–54°.

Analogously, the corresponding aldehydes are produced by the acid treatment of:
1-ethoxy-2-(8-methyl-2-dibenzofuryl)-propan-2-ol
1-ethoxy-2-(8-ethyl-2-dibenzofuryl)-propan-2-ol
1-ethoxy-2-(8-methoxy-2-dibenzofuryl)-propan-2-ol
1-ethoxy-2-(8-hydroxy-2-dibenzofuryl)-propan-2-ol
1-ethoxy-2-(2-dibenzofuryl)-butan-2-ol.

In place of the ethoxy compounds, other lower alkyl ethers can also be employed, such as the methyl ethers; for example, 1-methoxy-2-(2-dibenzofuryl)-propan-2-ol can be used as the starting compound. b. 22.4 g. of 2-(2-dibenzofuryl)-propanal is heated on a water bath for 1 hour with 50 ml. of acetic anhydride and 4 g. of anhydrous sodium acetate, and then allowed to stand for 24 hours at 25°. The reaction mixture is then mixed with benzene, washed twice with water, dried, and the residue is evaporated twice with respectively 150 ml. of absolute benzene and under reduced pressure, in order to remove the excess acetic anhydride. From the residue, 2-(2-dibenzofuryl)-propanal diacetate is obtained.

Analogously, the corresponding diacetates are obtained by the acylation of the corresponding aldehydes, e.g. those set forth above.

EXAMPLE 67 a. 2.68 g. of 1-ethoxy-2-(2-dibenzofuryl)-propan-2-ol is refluxed for 1.5 hours after being dissolved in 30 ml. of absolute toluene and after the addition of 100 mg. of p-toluene-sulfonic acid. The mixture is then cooled, washed with aqueous $NaHCO_3$ solution, dried, evaporated, and the product thus obtained is 1-ethoxy-2-(2-dibenzofuryl)-propene (the ethylenol ether of 2-(2-dibenzofuryl)-propanal).

b. One gram of 1-ethoxy-2-(2-dibenzofuryl)-propene is refluxed for 2 hours with 10 ml. of 10% aqueous hydrochloric acid and 10 of ethanol. After working up the mixture as usual, 2-(2-dibenzofuryl)-propanal is obtained, m.p. 52°–54°.

EXAMPLE 68

2.98 g. of 1,2-diethoxy-2-(2-dibenzofuryl)-propane (obtainable by reacting 2-dibenzofurylmagnesium bromide with ethoxyacetone diethylacetal) is refluxed for 3 hours in 50 ml. of THF and 10 ml. of 15% $H_2SO_4$. The reaction mixture is worked up as usual, yielding 2-(2-dibenzofuryl)-propanal, m.p. 52°–54°.

EXAMPLE 69

8 g. of 1-ethoxy-2-bromo-2-(2-dibenzofuryl)-propane (obtainable by reacting dibenzofuran with ethoxyacetyl chloride in the presence of $AlCl_3$, reacting the thus-obtained 2-ethoxyacetyldibenzofuran with methylmagnesium iodide, and reacting the thusproduced 1-ethoxy-2-(2-dibenzofuryl)-propan-2-ol with $PBr_3$ in ether) is dissolved in 100 ml. of absolute benzene and mixed dropwise with 12.4 g. of 1,5-diazabicyclo[3,4,0]nonene-(5) at 0°–5°. Thereafter, the mixture is heated for 30 minutes to 60°, poured on ice, and worked up as usual, thus producing 1-ethoxy-2-(2-dibenzofuryl)-propene.

EXAMPLE 70 a. A solution of 0.1 mole of phenyllithium in 200 ml. of absolute ether is gradually added to a suspension of 34.25 g. of methoxymethyltriphenylphosphonium chloride in 500 ml. of absolute ether. After 15 minutes, a solution of 21 g. of 2-acetyldibenzofuran in 240 ml. of absolute ether is added dropwise under stirring to the reaction mixture. The latter is agitated for 2 hours at 25°, filtered off, the ether solution is washed with water, dried, and evaporated, thus obtaining 1-methoxy-2-(2-dibenzofuryl)-propene.

Analogously, 1-p-tolyloxy-2-(2-dibenzofuryl)-propene is obtained with triphenylphosphine p-tolyloxymethylene (obtainable in situ from triphenylphosphine and p-tolyloxymethyl chloride).

In an analogous manner, using the following starting compounds:
  2-acetyldibenzothiophene
  2-acetyl-8-methyldibenzofuran
  2-acetyl-8-ethyldibenzofuran
  2-acetyl-8-methoxydibenzofuran
  2-propionyldibenzofuran
  2-butyryldibenzofuran
the following final products are obtained with triphenylphosphine methyxomethylene:
  1-methoxy-2-(2-dibenzothienyl)-propene
  1-methoxy-2-(8-methyl-2-dibenzofuryl)-propene
  1-methoxy-2-(8-ethyl-2-dibenzofuryl)-propene
  1-methoxy-2-(8-methoxy-2-dibenzofuryl)-propene
  1-methoxy-2-(2-dibenzofuryl)-1-butene
  1-methoxy-2-(2-dibenzofuryl)-1-pentene.

b. 2.38 g. of 1-methoxy-2-(2-dibenzofuryl)-propene is heated in 30 ml. of acetic acid and 10 ml. of 10% $H_2SO_4$ for 10 hours to 80°. The usual working-up operation yields 2-(2-dibenzofuryl)-propanol, m.p. 52°–54°.

EXAMPLE 71

2.25 g. of 2-(2-dibenzofuryl)-propylamine (obtainable from 2-(2-dibenzofuryl)-propionamide with $LiAlH_4$) is dissolved in 50 ml. of 15% aqueous acetic acid and mixed, under ice cooling, with a solution of 1 g. of $NaNO_2$ in 5 ml. of water. The mixture is heated for 1 hour to 80°, and worked up as usual. After purification by chromatography on silica gel, 2-(2-dibenzofuryl)-propanol is produced, m.p. 48°–50°.

EXAMPLE 72

2.89 g. of 1-bromo-(2-dibenzofuryl)-propane is dissolved in 20 ml. of DMF, mixed with 3 g. of anhydrous potassium acetate, and agitated for 3 hours at 60°. The mixture is worked up as usual, thus obtaining 2-(2-dibenzofuryl)-propyl acetate. In addition, a small amount of 2-(2-dibenzofuryl)-propene is produced.

EXAMPLE 73 a. A solution of 2.89 g. of 1-bromo-2-(2-dibenzofuryl)-propane in 10 ml. of DMF is added dropwise to a suspension of 0.4 g. of NaH and 2 g. of benzyl alcohol in 5 ml. of DMF at 0° under agitation. The mixture is stirred for 24 hours at 20° and then worked up as usual, yielding 2-(2-dibenzofuryl)-propylbenzyl ether.

b. 2 g. of 2-(2-dibenzofuryl)-propylbenzyl ether is dissolved in 25 ml. of methanol and hydrogenated on 0.2 g. of 5% Pd/C catalyst at 20° until the hydrogen absorption has ceased. The reaction mixture is filtered off, evaporated, and the product thus obtained is 2-(2-dibenzofuryl-propanol, m.p. 48°–50°.

EXAMPLE 74 a. A mixture of 22.8 g. of 2-acetyl-7-fluorodibenzofuran, 5 g. of sulfur, and 13 g. of morpholine is heated until the evolution of $H_2S$ has ended; then, the mixture is refluxed for 12 hours and cooled. After the usual working-up operation, 7-fluoro-2-dibenzofurylthioacetomorpholide is produced, m.p. 150°–154°.

Analogously, with the use of the following starting compounds:
  1-, 3-, 4-, 6-, 8-, or 9-fluoro-2-acetyldibenzofuran,
  1-, 3-, 4-, 6-, 7-, 8-, or 9-chloro-2-acetyldibenzofuran,
  1-, 3-, 4-, 6-, 7-, 8-, or 9-bromo-2-acetyldibenzofuran,
  1-, 3-, 4-, 6-, 7-, 8-, or 9-iodo-2-acetyldibenzofuran,
  1-, 31, 4-, 6-, 7-, 8-, or 9-methyl-2-acetyldibenzofuran,
  1-, 3-, 4-, 6-, 7-, 8-, or 9-ethyl-2-acetyldibenzofuran,
  1-, 3-, 4-, 6-, 7-, 8-, or 9-methoxy-2-acetyldibenzofuran,
  1-, 3-, 4-, 6-, 7-, 8-, or 9-hydroxy-2-acetyldibenzofuran,
  1-, 3-, 4-, 6-, 7-, 8-, or 9-amino-2-acetyldibenzofuran,
  1-, 3-, 4-, 6-, 7-, 8-, or 9-trifluoromethyl-2-acetyldibenzofuran,
the following final products are obtained with morpholine/sulfur:
  1-fluoro-2-dibenzofurylthioacetomorpholide
  3-fluoro-2-dibenzofurylthioacetomorpholide
  4-fluoro-2-dibenzofurylthioacetomorpholide
  6-fluoro-2-dibenzofurylthioacetomorpholide
  8-fluoro-2-dibenzofurylthioacetomorpholide
  9-fluoro-2-dibenzofurylthioacetomorpholide
  1-chloro-2-dibenzofurylthioacetomorpholide
  3-chloro-2-dibenzofurylthioacetomorpholide
  4-chloro-2-dibenzofurylthioacetomorpholide
  6-chloro-2-dibenzofurylthioacetomorpholide
  7-chloro-2-dibenzofurylthioacetomorpholide
  8-chloro-2-dibenzofurylthioacetomorpholide
  9-chloro-2-dibenzofurylthioacetomorpholide
  1-bromo-2-dibenzofurylthioacetomorpholide
  3-bromo-2-dibenzofurylthioacetomorpholide
  4-bromo-2-dibenzofurylthioacetomorpholide
  6-bromo-2-dibenzofurylthioacetomorpholide
  7-bromo-2-dibenzofurylthioacetomorpholide
  8-bromo-2-dibenzofurylthioacetomorpholide
  9-bromo-2-dibenzofurylthioacetomorpholide
  1-iodo-2-dibenzofurylthioacetomorpholide
  3-iodo-2-dibenzofurylthioacetomorpholide
  4-iodo-2-dibenzofurylthioacetomorpholide
  6-iodo-2-dibenzofurylthioacetomorpholide
  7-iodo-2-dibenzofurylthioacetomorpholide
  8-iodo-2-dibenzofurylthioacetomorpholide
  9-iodo-2-dibenzofurylthioacetomorpholide
  1-methyl-2-dibenzofurylthioacetomorpholide
  3-methyl-2-dibenzofurylthioacetomorpholide
  4-methyl-2-dibenzofurylthioacetomorpholide
  6-methyl-2-dibenzofurylthioacetomorpholide
  7-methyl-2-dibenzofurylthioacetomorpholide
  8-methyl-2-dibenzofurylthioacetomorpholide
  9-methyl-2-dibenzofurylthioacetomorpholide
  1-ethyl-2-dibenzofurylthioacetomorpholide
  3-ethyl-2-dibenzofurylthioacetomorpholide
  4-ethyl-2-dibenzofurylthioacetomorpholide
  6-ethyl-2-dibenzofurylthioacetomorpholide
  7-ethyl-2-dibenzofurylthioacetomorpholide
  8-ethyl-2-dibenzofurylthioacetomorpholide
  9-ethyl-2-dibenzofurylthioacetomorpholide
  1-methoxy-2-dibenzofurylthioacetomorpholide
  3-methoxy-2-dibenzofurylthioacetomorpholide
  4-methoxy-2-dibenzofurylthioacetomorpholide 6-methoxy-2-dibenzofurylthioacetomorpholide
7-methoxy-2-dibenzofurylthioacetomorpholide
8-methoxy-2-dibenzofurylthioacetomorpholide
9-methoxy-2-dibenzofurylthioacetomorpholide
1-hydroxy-2-dibenzofurylthioacetomorpholide
3-hydroxy-2-dibenzofurylthioacetomorpholide
4-hydroxy-2-dibenzofurylthioacetomorpholide
6-hydroxy-2-dibenzofurylthioacetomorpholide
7-hydroxy-2-dibenzofurylthioacetomorpholide
8-hydroxy-2-dibenzofurylthioacetomorpholide
9-hydroxy-2-dibenzofurylthioacetomorpholide
1-amino-2-dibenzofurylthioacetomorpholide
3-amino-2-dibenzofurylthioacetomorpholide
4-amino-2-dibenzofurylthioacetomorpholide
6-amino-2-dibenzofurylthioacetomorpholide
7-amino-2-dibenzofurylthioacetomorpholide
8-amino-2-dibenzofurylthioacetomorpholide
9-amino-2-dibenzofurylthioacetomorpholide
1-trifluoromethyl-2-dibenzofurylthioacetomorpholide
3-trifluoromethyl-2-dibenzofurylthioacetomorpholide
4-trifluoromethyl-2-dibenzofurylthioacetomorpholide
6-trifluoromethyl-2-dibenzofurylthioacetomorpholide
7-trifluoromethyl-2-dibenzofurylthioacetomorpholide
8-trifluoromethyl-2-dibenzofurylthioacetomorpholide
9-trifluoromethyl-2-dibenzofurylthioacetomorpholide.

b. One gram of 7-fluoro-2-dibenzofurylthioacetomorpholide is refluxed for 4 hours with 0.3 g. of KOH in 15 ml. of ethanol. After working up the mixture is usual, 7-fluoro-2-dibenzofurylacetic acid is obtained, m.p. 160°–162°.

Analogously, the following compounds are produced by hydrolysis of the corresponding thioacetomorpholides:

1-fluoro-2-dibenzofurylacetic acid
3-fluoro-2-dibenzofurylacetic acid
4-fluoro-2-dibenzofurylacetic acid
6-fluoro-2-dibenzofurylacetic acid
8-fluoro-2-dibenzofurylacetic acid
9-fluoro-2-dibenzofurylacetic acid
1-chloro-2-dibenzofurylacetic acid
3-chloro-2-dibenzofurylacetic acid
4-chloro-2-dibenzofurylacetic acid
6-chloro-2-dibenzofurylacetic acid
7-chloro-2-dibenzofurylacetic acid
8-chloro-2-dibenzofurylacetic acid
9-chloro-2-dibenzofurylacetic acid
1-bromo-2-dibenzofurylacetic acid
3-bromo-2-dibenzofurylacetic acid
4-bromo-2-dibenzofurylacetic acid
6-bromo-2-dibenzofurylacetic acid
7-bromo-2-dibenzofurylacetic acid
8-bromo-2-dibenzofurylacetic acid
9-bromo-2-dibenzofurylacetic acid
1-iodo-2-dibenzofurylacetic acid
3-iodo-2-dibenzofurylacetic acid
4-iodo-2-dibenzofurylacetic acid
6-iodo-2-dibenzofurylacetic acid
7-iodo-2-dibenzofurylacetic acid
8-iodo-2-dibenzofurylacetic acid
9-iodo-2-dibenzofurylacetic acid
1-methyl-2-dibenzofurylacetic acid
3-methyl-2-dibenzofurylacetic acid
4-methyl-2-dibenzofurylacetic acid
6-methyl-2-dibenzofurylacetic acid
7-methyl-2-dibenzofurylacetic acid
8-methyl-2-dibenzofurylacetic acid
9-methyl-2-dibenzofurylacetic acid
1-ethyl-2-dibenzofurylacetic acid
3-ethyl-2-dibenzofurylacetic acid
4-ethyl-2-dibenzofurylacetic acid
6-ethyl-2-dibenzofurylacetic acid
7-ethyl-2-dibenzofurylacetic acid
8-ethyl-2-dibenzofurylacetic acid
9-ethyl-2-dibenzofurylacetic acid
1-methoxy-2-dibenzofurylacetic acid
3-methoxy-2-dibenzofurylacetic acid
4-methoxy-2-dibenzofurylacetic acid
6-methoxy-2-dibenzofurylacetic acid
7-methoxy-2-dibenzofurylacetic acid
8-methoxy-2-dibenzofurylacetic acid
9-methoxy-2-dibenzofurylacetic acid
1-hydroxy-2-dibenzofurylacetic acid
3-hydroxy-2-dibenzofurylacetic acid
4-hydroxy-2-dibenzofurylacetic acid
6-hydroxy-2-dibenzofurylacetic acid
7-hydroxy-2-dibenzofurylacetic acid
8-hydroxy-2-dibenzofurylacetic acid
9-hydroxy-2-dibenzofurylacetic acid
1-amino-2-dibenzofurylacetic acid
3-amino-2-dibenzofurylacetic acid
4-amino-2-dibenzofurylacetic acid
6-amino-2-dibenzofurylacetic acid
7-amino-2-dibenzofurylacetic acid
8-amino-2-dibenzofurylacetic acid
9-amino-2-dibenzofurylacetic acid
1-trifluoromethyl-2-dibenzofurylacetic acid
3-trifluoromethyl-2-dibenzofurylacetic acid
4-trifluoromethyl-2-dibenzofurylacetic acid
6-trifluoromethyl-2-dibenzofurylacetic acid
7-trifluoromethyl-2-dibenzofurylacetic acid
8-trifluoromethyl-2-dibenzofurylacetic acid
9-trifluoromethyl-2-dibenzofurylacetic acid.

c. The procedure of paragraph (a) is followed, with the exception that, after cooling, 130 ml. of concentrated hydrochloric acid and 100 ml. of water are added to the reaction mixture, and the latter is again refluxed for 24 hours, cooled, and worked up as usual, thus obtaining 7-fluoro-2-dibenzofurylacetic acid. Analogously, the further 2-dibenzofurylacetic acids set forth under (b) are produced.

d. The acetylation of the amino acids obtained according to (b) in analogy to Example 33(r) or 33(s) results in:

1-acetamido-2-dibenzofurylacetic acid
3-acetamido-2-dibenzofurylacetic acid
4-acetamido-2-dibenzofurylacetic acid
6-acetamido-2-dibenzofurylacetic acid
7-acetamido-2-dibenzofurylacetic acid
8-acetamido-2-dibenzofurylacetic acid
9-acetamido-2-dibenzofurylacetic acid.

EXAMPLE 75

2.86 g. of the ethyl ester of 2-[3-(o-hydroxyphenyl)-4-hydroxyphenyl]-propionic acid is heated with 0.7 g. of $ZnCl_2$ for 2 hours to 170°. After working up the reaction mixture as usual, the ethyl ester of 2-(2-dibenzofuryl)-propionic acid is obtained, b.p. 173°–177°/0.2 mm.

EXAMPLE 76

2.56 g. of 2-[3-(o-aminophenyl)-4-aminophenyl]-propionic acid is diazotized in dilute hydrochloric acid with 1.4 g. of $NaNO_2$. The mixture is allowed to stand for 15 minutes and then heated on a water bath until the evolution of nitrogen has ceased. As an intermediate product, 2-[3-(o-hydroxyphenyl)-4-hydroxyphenyl]-propionic acid is obtained, which is not isolated. Working up as usual yields 2-(2-dibenzofuryl)-propionic acid, m.p. 139°–140°.

EXAMPLE 77

A mixture of 3 g. of pyrocatechol and 4 g. of 2-(p-hydroxyphenyl)-propionic acid is heated in a bomb tube for 30 hours to 220°. As an intermediate product, 2-[3-(o-hydroxyphenyl)-4-hydroxyphenyl]-propionic acid or 2-[4-(2-hydroxyphenoxy-phenyl]-propionic acid is probably produced. After cooling and working up the mixture as usual, 2-(2-dibenzofuryl)-propionic acid is obtained, m.p. 139°–140°.

EXAMPLE 78

A mixture of 27.65 g. of 2-[3-(o-hydroxyphenyl)-4-chlorophenyl]-propionic acid, 5.6 g. of KOH, and 1 g. of powdered Cu is heated for 5 hours to 190°. After cooling and working up as usual, 2-(2-dibenzofuryl)-propionic acid is produced, m.p. 139°–140°.

Analogously, 2-[3-(o-chlorophenyl)-4-hydroxyphenyl]-propionic acid can be employed to achieve the same result.

EXAMPLE 79

A mixture of 22.6 g. of 2-(3-diphenylyl)-propionic acid [3-(1-carboxyethyl)-diphenyl], 6.4 g. of sulfur, and 1.2 g. of $AlCl_3$ is heated for 10 hours to 200°. After the mixture has been worked up as usual, 2-(2-dibenzothienyl)-propionic acid is obtained, m.p. 182°–184°.

EXAMPLE 80

15.3 g. of 2-[4-(2-aminophenoxy-phenyl]-propionic acid is dissolved in 120 ml. of water and 40 ml. of concentrated hydrochloric acid and diazotized at 0°–5° and 4.2 g. of $NaNO_2$ in 15 ml. of water. The thus-obtained diazonium salt solution is poured into 200 ml. of hot 50% $H_2SO_4$, and the mixture is further heated until the liberation of nitrogen has ceased. After the usual working-up operation, 2-(2-dibenzofuryl)-propionic acid is obtained, m.p. 139°–140°.

EXAMPLE 81

A solution of 2.3 g. of 2-[4-(2-aminophenylmercapto)-phenyl]-propionic acid in 25 ml. of hot 2N $H_2SO_4$ is rapidly cooled. The sulfate, precipitated in finely divided form, is diazotized at 0° with a solution of 0.65 g. of $NaNO_2$ in 5 ml. of water, and the mixture is stirred for 2 hours. Thereafter, the mixture is poured into 120 ml. of 50% $H_2SO_4$, refluxed for 6 hours, worked up as usual, the product being 2-(2-dibenzothienyl)-propionic acid, m.p. 182°–184°.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A compound of the formula

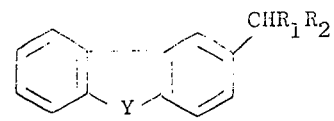

substituted in the 1-, 3-, 4-, 6-, 7-, 8-, or 9-position by $R_3$ wherein $R_1$ is $COOR_5$ in which R5 is hydrogen, alkyl of 1 to 20 carbon atoms or aminoalkyl, alkylaminoalkyl, or dialkylaminoalkyl wherein alkyl in each instance is of up to 8 carbon atoms; $R_2$ is H or alkyl of 1–4 carbon atoms; $R_3$ is H, alkyl, alkoxy, alkanoyl, monoalkylamino, dialkylamino, or alkanoylamino, each of up to 4 carbon atoms, F, Cl, Br, I, OH, $NH_2$, $NO_2$, CN, or $CF_3$; and Y is O or S; with the proviso that at least one of $R_2$ and $R_3$ are other than H; and the physiologically acceptable salts thereof.

2. A compound of claim 1, wherein $R_1$ is $COOR_6$ in which $R_6$ is H, alkyl of 1–8 carbon atoms or dialkylaminoalkyl of up to 10 carbon atoms.

3. A compound of claim 1, wherein $R_1$ is COOH, $COOCH_3$ or $COOC_2H_5$.

4. A compound of claim 1, wherein $R_2$ is $CH_3$ or $C_2H_5$.

5. A compound of claim 4, wherein $R_2$ is $CH_3$.

6. A compound of claim 1, wherein $R_3$ is H, $CH_3$, $C_2H_5$, $CH_3O$, $CH_3CO$, F, Cl, Br, I, OH, $NH_2$ or $NO_2$.

7. A compound of claim 6, wherein $R_3$ is H.

8. A compound of claim 1, wherein $R_1$ is COOH or COOAlkyl wherein alkyl is of 1–8 carbon atoms, $R_2$ is $CH_3$ and $R_3$ is H, $C_2H_5$, F, Cl, Br or I.

9. A compound of claim 8, wherein $R_3$ is H or F.

10. A compound of claim 8, wherein $R_3$ is H or 7—F.

11. A compound of claim 1, 2-(2-dibenzofuryl)-propionic acid.

12. A compound of claim 1, the ethyl ester of 2-(2-dibenzofuryl)-propionic acid.

13. A compound of claim 1, the 2-diethylaminoethyl ester of 2-(2-dibenzofuryl)-propionic acid.

14. A compound of claim 1, the 2-(2-dibenzofuryl)-butyric acid.

15. A compound of claim 1, the 2-(2-dibenzothienyl)-propionic acid.

16. A compound of claim 1, the ethyl ester of 2-(2-dibenzothienyl)-propionic acid.

17. A compound of claim 1, the 2-diethylaminoethyl ester of 2-(2-dibenzothienyl)-propionic acid.

18. A compound of claim 1, the 2-(8-ethyl-2-dibenzofuryl)-propionic acid.

19. A compound of claim 1, the ethyl ester of 2-(8-ethyl-2-dibenzofuryl)-propionic acid.

20. A compound of claim 1, the 2-(7-fluoro-2-dibenzofuryl)-propionic acid.

21. A compound of claim 1, the ethyl ester of 2-(7-fluoro-2-dibenzofuryl)-propionic acid.

22. A compound of claim 1, the 2-(8-fluoro-2-dibenzofuryl)-propionic acid.

23. A compound of claim 1, the 2-(7-chloro-2-dibenzofuryl)-propionic acid.

24. A compound of claim 1, the 2-(8-bromo-2-dibenzofuryl)-propionic acid.

25. A compound of claim 1, the ethyl ester of 2-(8-bromo-2-dibenzofuryl)-propionic acid.

26. A compound of claim 1, the 2-(8-iodo-2-dibenzofuryl)-propionic acid.

27. A compound of claim 1, the 4-carbethoxycyclohexyl-ammonium salt of 2-(2-dibenzofuryl)-propionic acid.

* * * * *